US012741858B2

(12) United States Patent
Comunale

(10) Patent No.: US 12,741,858 B2
(45) **Date of Patent: *Sep. 22, 2026**

(54) SCALABLE MODULAR SYSTEM AND METHOD FOR VALVE CONTROL AND SELECTIVELY DISPENSING BEVERAGES

(71) Applicant: Versabev, Inc., Harrison, NY (US)

(72) Inventor: Sal Comunale, Harrison, NY (US)

(73) Assignee: Versabev, Inc., Harrison, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,798

(22) Filed: Jul. 31, 2024

(65) Prior Publication Data

US 2025/0033949 A1 Jan. 30, 2025

Related U.S. Application Data

(63) Continuation of application No. 17/823,895, filed on Aug. 31, 2022, now Pat. No. 12,122,659.

(Continued)

(51) Int. Cl.

*B67D 1/00* (2006.01)
*B67D 1/04* (2006.01)

(Continued)

(52) U.S. Cl.

CPC ......... *B67D 1/1204* (2013.01); *B67D 1/0004* (2013.01); *B67D 1/0034* (2013.01);

(Continued)

(58) Field of Classification Search

CPC .. B67D 1/1204; B67D 1/0462; B67D 1/0888; B67D 1/1279

See application file for complete search history.

(56) References Cited

U.S. PATENT DOCUMENTS

| | | | |
|---|---|---|---|
| 4,148,334 | A | 4/1979 | Richards |
| RE32,179 | E | 6/1986 | Sedam |

(Continued)

FOREIGN PATENT DOCUMENTS

| | | | |
|---|---|---|---|
| EP | 2154103 B1 | 2/2010 | |
| GB | 2146705 A | 4/1985 | |
| WO | 2015127470 A1 | 8/2015 | |

OTHER PUBLICATIONS

Sequence Definition & Meaning—Merriam-Webster.pdf; obtained on Sep. 12, 2025 from: https://www.merriam-webster.com/dictionary/sequence.*

(Continued)

*Primary Examiner* — Paul R Durand
*Assistant Examiner* — Randall A Gruby
(74) *Attorney, Agent, or Firm* — Ahmann Kloke LLP

(57) ABSTRACT

An example method comprises receiving a control signal to open a first valve of a compressible liquid container within an airtight pressurized container, retrieving a first dispensing profile, each dispensing profile indicating at least one valve and, for each valve, a predetermined period of time for keeping a particular valve open, each of the valves controlling transport of contents a different compressible liquid container contained within the airtight pressurized container to a dispensing system, for each of the one or more valves identified in the first dispensing profile: opening the particular valve identified in the first dispensing profile for the particular predetermined period of time to transport contents over a first liquid transport conduit that is coupled to a particular releasable coupling and the particular valve, and closing the particular valve after the particular predetermined period of time to dispense an amount of contents of the particular compressible liquid container.

18 Claims, 19 Drawing Sheets

Related U.S. Application Data

(60) Provisional application No. 63/239,894, filed on Sep. 1, 2021, provisional application No. 63/239,898, filed on Sep. 1, 2021, provisional application No. 63/239,397, filed on Aug. 31, 2021, provisional application No. 63/239,395, filed on Aug. 31, 2021, provisional application No. 63/239,393, filed on Aug. 31, 2021.

(51) Int. Cl.
*B67D 1/08* (2006.01)
*B67D 1/12* (2006.01)

(52) U.S. Cl.
CPC ......... *B67D 1/0036* (2013.01); *B67D 1/0046* (2013.01); *B67D 1/04* (2013.01); *B67D 1/0462* (2013.01); *B67D 1/0857* (2013.01); *B67D 1/0888* (2013.01); *B67D 1/1279* (2013.01); *B67D 1/1281* (2013.01); *B67D 2001/0096* (2013.01); *B67D 2001/0822* (2013.01); *B67D 2001/0828* (2013.01)

(56) References Cited

U.S. PATENT DOCUMENTS

| | | | | |
|---|---|---|---|---|
| 4,903,862 | A | 2/1990 | Shannon et al. | |
| 5,730,323 | A | 3/1998 | Osborne | |
| 5,806,550 | A | 9/1998 | Frank | |
| 5,871,121 | A | 2/1999 | Hashimoto et al. | |
| 6,360,923 | B1 | 3/2002 | Mooswijk | |
| 7,241,464 | B2 | 7/2007 | Scullion et al. | |
| 8,340,815 | B2 * | 12/2012 | Peters | G06Q 50/06 700/239 |
| 8,459,176 | B2 * | 6/2013 | Nevarez | B67D 1/07 99/290 |
| 8,610,536 | B2 * | 12/2013 | Libby | B67D 1/0888 340/541 |
| 8,744,618 | B2 * | 6/2014 | Peters | B67D 1/0015 700/242 |
| 8,755,932 | B2 * | 6/2014 | Peters | G07F 13/065 700/239 |
| 9,242,845 | B2 | 1/2016 | Otto | |
| 9,447,536 | B2 | 9/2016 | Tincher et al. | |
| 9,739,272 | B2 * | 8/2017 | Dobbins | F04B 43/1292 |
| 9,896,320 | B2 * | 2/2018 | Otto | F16L 37/0927 |
| 10,231,567 | B2 * | 3/2019 | Perrelli | B67D 1/0871 |
| 10,301,159 | B2 * | 5/2019 | Feola | G06Q 20/327 |
| 10,336,597 | B2 * | 7/2019 | Griscik | B67D 1/0872 |
| 10,399,838 | B2 * | 9/2019 | Green | F25D 31/002 |
| 10,625,283 | B2 | 4/2020 | Rayner | |
| 10,752,486 | B2 | 8/2020 | Chao et al. | |
| 10,858,233 | B2 | 12/2020 | Dryzun | |
| 10,870,565 | B2 | 12/2020 | Otto | |
| 10,899,596 | B2 | 1/2021 | Renzi | |
| 10,913,647 | B2 * | 2/2021 | Lyons | B65D 81/3227 |
| 10,961,106 | B2 | 3/2021 | Lawler et al. | |
| 11,161,729 | B2 * | 11/2021 | Volftsun | B67D 1/0878 |
| 11,472,694 | B2 * | 10/2022 | Volftsun | B67D 1/1272 |
| 11,542,149 | B2 * | 1/2023 | Comunale | B67D 1/1204 |
| 11,827,508 | B2 | 11/2023 | Comunale | |
| 11,905,155 | B2 * | 2/2024 | Otto | B67D 1/0462 |
| 11,975,960 | B2 * | 5/2024 | Beavis | B67D 1/104 |
| 11,982,560 | B2 * | 5/2024 | Williams | B33Y 80/00 |
| 12,043,536 | B2 | 7/2024 | Schucker | |
| 12,082,738 | B2 | 9/2024 | Hobden et al. | |
| 12,122,654 | B2 * | 10/2024 | Fantappie | B67D 1/0017 |
| 12,122,655 | B2 * | 10/2024 | Mills | B67D 1/1252 |
| 12,122,659 | B2 * | 10/2024 | Comunale | B67D 1/1204 |
| 12,129,163 | B2 * | 10/2024 | Cuppari | H04W 76/11 |
| 12,145,834 | B2 * | 11/2024 | Jesse, Jr. | B67D 3/0093 |
| 12,157,660 | B2 | 12/2024 | Algül et al. | |
| 12,157,661 | B2 | 12/2024 | Chang et al. | |
| 12,162,744 | B2 * | 12/2024 | Comunale | B67D 1/0052 |
| 12,180,056 | B2 * | 12/2024 | Danielson | B67D 1/0855 |
| 12,227,404 | B2 * | 2/2025 | Witte | B67D 1/0835 |
| 12,264,056 | B2 * | 4/2025 | Otto | B67D 1/124 |
| 12,269,728 | B2 * | 4/2025 | Kline | G07F 13/00 |
| 12,281,000 | B2 * | 4/2025 | Venkatakrishnan | B67D 1/0882 |
| 12,319,556 | B2 * | 6/2025 | Venkatakrishnan | B67D 1/0882 |
| 12,459,802 | B2 * | 11/2025 | Levey | B67D 1/0888 |
| 2003/0080142 | A1 | 5/2003 | Meheen | |
| 2004/0159240 | A1 * | 8/2004 | Lyall, III | A47J 31/505 99/275 |
| 2006/0231574 | A1 * | 10/2006 | Bilskie | B67D 1/0004 222/129.1 |
| 2006/0283879 | A1 | 12/2006 | Rasmussen et al. | |
| 2008/0041233 | A1 | 2/2008 | Bunn | |
| 2009/0188938 | A1 | 7/2009 | Farris et al. | |
| 2010/0116842 | A1 * | 5/2010 | Hecht | A47J 31/52 222/144.5 |
| 2010/0269535 | A1 | 10/2010 | Guadalupi | |
| 2012/0325845 | A1 * | 12/2012 | Newman | B67D 1/127 222/1 |
| 2014/0097201 | A1 * | 4/2014 | Otto | B67D 1/0001 222/394 |
| 2014/0166694 | A1 * | 6/2014 | Otto | B67D 1/0888 222/95 |
| 2015/0239725 | A1 | 8/2015 | Watts et al. | |
| 2016/0016776 | A1 | 1/2016 | Orita | |
| 2016/0016777 | A1 | 1/2016 | Orita | |
| 2016/0031694 | A1 | 2/2016 | Orita | |
| 2016/0257549 | A1 | 9/2016 | Volftsun | |
| 2017/0240409 | A1 | 8/2017 | Valles et al. | |
| 2019/0185311 | A1 | 6/2019 | Karol et al. | |
| 2020/0095108 | A1 | 3/2020 | Cook | |
| 2020/0369505 | A1 * | 11/2020 | Mckay | B67D 1/10 |
| 2021/0024339 | A1 | 1/2021 | Eaton et al. | |
| 2021/0070599 | A1 | 3/2021 | Otto | |
| 2021/0179412 | A1 * | 6/2021 | Chang | G07F 9/002 |
| 2022/0073335 | A1 * | 3/2022 | Cuppari | B67D 1/0027 |
| 2022/0144619 | A1 | 5/2022 | Otto et al. | |
| 2022/0183499 | A1 * | 6/2022 | Brothers | B67D 1/0037 |
| 2022/0274822 | A1 | 9/2022 | Chang et al. | |
| 2022/0371877 | A1 * | 11/2022 | Tatera | B67D 1/0888 |
| 2023/0063855 | A1 | 3/2023 | Comunale | |
| 2023/0068775 | A1 | 3/2023 | Mills et al. | |
| 2023/0069257 | A1 | 3/2023 | Mills et al. | |
| 2023/0069727 | A1 | 3/2023 | Comunale | |
| 2023/0166960 | A1 | 6/2023 | Danielson et al. | |
| 2023/0294973 | A1 | 9/2023 | Comunale | |
| 2023/0303383 | A1 * | 9/2023 | Callaghan | B67D 1/124 |
| 2023/0332933 | A1 | 10/2023 | Shmilovich et al. | |
| 2024/0400365 | A1 * | 12/2024 | Comunale | B67D 1/0406 |
| 2025/0011153 | A1 * | 1/2025 | Dirik | B67D 1/0888 |
| 2025/0033948 | A1 * | 1/2025 | Tatera | B67D 1/0052 |
| 2025/0136424 | A1 * | 5/2025 | Woodrow | G01M 3/2876 |
| 2025/0340424 | A1 * | 11/2025 | Eichel | B67D 7/32 |
| 2025/0352006 | A1 * | 11/2025 | Quan | A47K 5/18 |
| 2025/0368496 | A1 * | 12/2025 | Hatfield | B67D 1/1275 |
| 2025/0388448 | A1 * | 12/2025 | Kuo | B67D 1/0021 |
| 2026/0042653 | A1 * | 2/2026 | Kuo | B67D 1/0017 |

OTHER PUBLICATIONS

Succession Definition & Meaning—Merriam-Webster.pdf; obtained on Sep. 12, 2025 from: https://www.merriam-webster.com/dictionary/succession/.*

Incompressible definition and meaning, Collins English Dictionary.pdf; obtained on Jan. 22, 2025 from: https://www.collinsdictionary.com/dictionary/english/incompressible.

International Application No. PCT/US2022/042276, International Search Report and the Written Opinion, dated Dec. 13, 2022, 15 pages.

International Application No. PCT/US2022/042277, International Search Report and the Written Opinion, dated Dec. 6, 2022, 14 pages.

(56) References Cited

OTHER PUBLICATIONS

International Application No. PCT/US2022/042278, International Search Report and the Written Opinion, dated Dec. 6, 2022, 11 pages.
European Patent application No. 22865535.3, Extended European Search Report dated May 23, 2025, 9 pages.
European Patent application No. 22865537, Extended European Search Report dated Jun. 2, 2025, 11 pages.

* cited by examiner

Cross-section View

SCALABLE MODULAR SYSTEM AND METHOD FOR VALVE CONTROL AND SELECTIVELY DISPENSING BEVERAGES

CROSS-REFERENCE TO RELATED APPLICATIONS

This application is a continuation of and seeks the benefit of U.S. patent application Ser. No. 17/823,895, filed Aug. 31, 2022, entitled "Scalable Modular System and Method for Valve Control and Selectively Dispensing Beverages," which claims priority to and seeks the benefit of U.S. Provisional Patent Application No. 63/239,894, filed Sep. 1, 2021, entitled "Scalable Modular System and Method for Compressible Container Management for Storing, Preserving, Managing, and Selectively Dispensing Beverages," and claims priority to and seeks the benefit of U.S. Provisional Patent Application No. 63/239,393, filed Aug. 31, 2021, entitled "Scalable Modular System and Method for Storing, Preserving, Managing, and Selectively Dispensing Beverages," and claims priority to and seeks the benefit of U.S. Provisional Patent Application No. 63/239,395, filed Aug. 31, 2021, entitled "Scalable Modular System and Method for Valve Control and Selectively Dispensing Beverages," and claims priority to and seeks the benefit of U.S. Provisional Patent Application No. 63/239,397, filed Aug. 31, 2021, entitled "Scalable Modular System and Method for Storing, Preserving, Managing, and Selectively Dispensing Foods," and claims priority to and seeks the benefit of U.S. Provisional Patent Application No. 63/239,898, filed Sep. 1, 2021, entitled "Scalable Modular System and Method for Temperature Control for Storing, Preserving, Managing, and Selectively Dispensing Beverages," all of which are incorporated herein by reference.

FIELD OF THE INVENTION(S)

The present invention(s) generally relates to systems and methods for storing and dispensing liquids, and more particularly to systems and methods for selectively dispensing liquids (such as wine or similar beverages) stored in a pressurized compressible container utilizing a controlled source of pressure force to apply sufficient pressure to the pressurized environment to dispense a portion of the stored liquid in accordance with a desired dispensing regime.

BACKGROUND

The ever-increasing consumption of wine and similar beverages, both in various commercial establishments (e.g., restaurants, bars, lounges, etc.), and in consumers' homes, coupled with growth in consumer perception of wine as an "experience" meant to be paired with proper food or enjoyed though "tastings," has resulted not only in a growing consumer demand for a wider selection of wines made available in commercial establishments (leading to proliferation of dedicated "wine bar" establishments) but also fueled the desire of many consumers to be able to bring the "wine bar" or equivalent experience to their home.

While restaurants have traditionally relied on bottle purchases by their patrons, leaving only a few low-end wines available for "by the glass" pours from bottles that may remain in use for several days after being opened, due in large part to the inherent changes (e.g., oxidation) in wine over time when exposed to air, eventually leading to deterioration and spoilage. However, in view of the above-noted market trends, many establishments have nevertheless been forced to expand their "by-the-glass" (hereinafter "BTG") selections to meet consumer demand, but at a greatly increased cost (both due to rapid deterioration of unsealed wine bottles and due to increased costs in labor in managing a wide-range of BTG pours). Stand-alone bars and lounges have traditionally offered limited wine selections, but in view of the aforementioned trends, they were likewise faced with the same obstacles as the restaurants. Finally, wine bars were forced to deal with the challenge of keeping a sufficiently wide-ranging BTG selection by their very nature.

Virtually all attempted solutions to the above challenges involved devices and systems for preservation and/or dispensation of bottled wines, and thus were quite limited in their success due to inherent disadvantages of utilization of bottled wine in a commercial establishment environment. Moreover, due to the fact that virtually all bottle-based wine preservation systems are sized and configured only for use with standard 750 ml bottles which requires very frequent and time-consuming replacement of bottles when the establishment is busy (e.g., precisely at a time when the establishment staff is under the greatest pressure to maintain an appropriately high level of speedy service to the customers). Moreover, because higher-end conventional wine preservation/dispensing systems comprise a separate chamber for each bottle, systems that comprise a sufficient number of wine bottle chambers for larger establishments are too expensive to be practical To address disadvantages of the use of bottled wine in commercial establishments, various companies propose utilization of larger volume/less expensive "wine bags" (often offered in a "wine-in-bag"/"bag-in-box" format hereinafter "WinB products"). WinB products, however, have their own challenges when considering: the difficulties in preserving and pouring wine from WinB product containers, the amount of space taken up by WinB products and their containers when space is a premium in a serving establishment, the challenge posed in commercial environments by the necessity of metering wine pours of specific volume, the difficulty in tracking such pours automatically, and the aesthetic appearance of WinB products and their containers in consumer environments.

SUMMARY

An example method comprises receiving a control signal to dispense contents from at least one first compressible liquid container, the at least one first compressible liquid container being within an airtight pressurized container, the airtight pressurized container including an access component configured to enable a pressurized environment within the airtight pressurized container to be maintained within the airtight pressurized container when sealed, the access component being further configured to allow the at least one first compressible liquid container to be placed within the airtight pressurized container, in response to receiving the control signal, retrieving a first dispensing profile of a plurality of dispensing profiles, each profile of the plurality of dispensing profiles indicating one or more controllable valves and, for each of the one or more valves, a predetermined period of time for keeping a particular controllable valve open, each of the one or more controllable valves controlling transport of contents a different compressible liquid container contained within the airtight pressurized container to a dispensing system, for each of the one or more controllable valves identified in the first dispensing profile: opening the particular controllable valve of the one or more valves identified in the first dispensing profile for the particular predetermined period of time to transport contents over a first liquid transport conduit that is coupled to a particular releasable coupling and the particular controllable valve, the particular releasable coupling being configured to releasably couple to a particular volume interface of the particular compressible liquid container within the pressurized environment and closing the particular valve of the one or more valves identified in the first dispensing profile after the particular predetermined period of time to dispense an amount of contents of the particular compressible liquid container.

In some embodiments, the first dispensing profile indicates a first controllable valve and a second controllable valve as well as a first predetermined period of time associated with the first controllable valve and a second predetermined period of time associated with the second controllable valve, wherein in response to receiving the control signal, opening the first controllable valve for the first predetermined period of time and opening the second controllable valve for the second predetermined period of time, and closing the first controllable valve when the first predetermined period of time elapses and closing the second controllable valve when the second predetermined period of time elapses, when the first controllable valve is open, pressure from within the airtight pressurized container forcing contents from a first compressible liquid container over the first liquid transport conduit through the first controllable valve towards the dispensing system, the first liquid transport conduit including to a first releasable coupling coupled to a first volume interface of the first compressible liquid container to enable the first contents of the first compressible liquid container to flow through the first liquid transport conduit, and when the second controllable valve is open, pressure from within the airtight pressurized container forcing contents from a second compressible liquid container over the second liquid transport conduit through the second controllable valve towards the dispensing system, the second liquid transport conduit including to a second releasable coupling coupled to a second volume interface of the first compressible liquid container to enable the second contents of the second compressible liquid container to flow through the second liquid transport conduit.

In various embodiments, opening the first controllable valve and the second controllable valve occur simultaneously. In some embodiments, the second liquid container is within the pressurized environment, the second liquid container being a second compressible liquid container. In other embodiments, the second liquid container is outside the airtight pressurized container. In one example, the second liquid container is a keg. In some embodiments, the second predetermined period of time is determined based on a viscosity of the contents of the second liquid container, and a diameter of the second liquid transport conduit.

Further, in some embodiments, after the contents of the first compressible liquid container pass through the first controllable valve and the contents of the second compressible liquid container pass through the second controllable valve, blending the contents from the first compressible liquid container and the contents from the second compressible liquid container in a mixing chamber prior to dispensing. In various embodiments, after the contents of the first compressible liquid container pass through the first controllable valve and the contents of the second compressible liquid container pass through the second controllable valve, allowing the contents from the first compressible liquid container and the contents from the second compressible liquid container to mix in a container after dispensing.

The method may further comprise generating the first dispensing profile (the first dispensing profile being associate with a particular beverage). The first dispensing profile may be generated by: identifying each compressible liquid container containing at least one ingredient for the particular beverage, for each compressible liquid container containing at least one ingredient: identifying a particular controllable valve, the particular controllable valve enabling contents of the particular compressible liquid container to flow from the particular compressible liquid container in the airtight pressurized container to a dispensing system, and determining a particular predetermined period of time for the particular valve to be open to dispense contents of that particular compressible liquid container, the particular predetermined period of time for the particular valve to be open being based on viscosity of the particular ingredient contained within the particular compressible liquid container.

The first predetermined period of time may be determined based on a viscosity of the contents of the first compressible liquid container within the pressurized environment and a diameter of the first liquid transport conduit. In some embodiments, the control signal is received from a mobile computing device in response to a selection of the one or more dispensing profiles on an interface, the control signal indicating the first dispensing profile.

An example system comprises an airtight pressurized container for storing a first compressible liquid container, a controllable pressure system, a first liquid transport conduit, a dispensing system, and a control system. The airtight pressurized container may include an access component configured to enable a pressurized environment within the airtight pressurized container to be maintained within the airtight pressurized container when sealed, the access component being further configured to allow the at least one first compressible liquid container to be placed within the airtight pressurized container. The controllable pressure system may be coupled to the airtight pressurized container through a pressure delivery conduit to generate the pressurized environment within the airtight pressurized container. The first liquid transport conduit may be coupled to a first releasable coupling, the first releasable coupling may be configured to releasably couple with a first volume interface of the first compressible liquid container within the pressurized environment, the first liquid transport conduit may be further coupled to a first controllable valve. The dispensing system may be configured to dispense content from the first compressible liquid container received through the first controllable valve. The control system may comprise a first electromechanical control component, the first electromechanical control component configured to control the first controllable valve. The control system may be configured to: receive a control signal to dispense contents from the first compressible liquid container, in response to receiving the control signal, retrieve a first dispensing profile of a plurality of dispensing profiles, each profile of the plurality of dispensing profiles indicating one or more controllable valves and, for each of the one or more controllable valves, a predetermined period of time for keeping a particular controllable valve open, each of the one or more controllable valves controlling transport of contents a different compressible liquid container contained within the airtight pressurized container to the dispensing system, for each of the one or more controllable valves identified in the first dispensing profile: open the particular controllable valve of the one or more valves identified in the first dispensing profile for the particular predetermined period of time to transport contents over a first liquid transport conduit that is coupled to a particular releasable coupling and the particular controllable valve, the particular releasable coupling being configured to releasably couple to a particular volume interface of the particular compressible liquid container within the pressurized environment, and close the particular valve of the one or more valves identified in the first dispensing profile after the particular predetermined period of time to dispense an amount of contents of the particular compressible liquid container.

An example method comprising, receiving a control signal to open a first valve of an airtight pressurized container, the airtight pressurized container including a first compressible liquid container, an access component, the access component being configured to enable a pressurized environment to be maintained within the airtight pressurized container when sealed and in response to receiving the control signal, retrieve a first profile of a plurality of blending profiles, each profile of the plurality of blending profiles indicating one or more ingredients required for one of the plurality of blending profiles and an amount for each of the one or more ingredients required for the one of the plurality of blending profiles, open a first controllable valve for a first predetermined period of time, a first liquid transport conduit being coupled to a first releasable coupling and the first controllable valve, the first releasable coupling being configured to releasably coupled to a first volume interface of the first compressible liquid container within the pressurized environment, the first controllable valve being capable of enabling or disabling a flow of liquid from the first compressible liquid container to a dispensing interface, a second liquid transport conduit being coupled to the first controllable valve and the dispensing interface, open a second controllable valve for a second predetermined period of time, a third liquid transport conduit being coupled to a second releasable coupling and the second controllable valve, the second releasable coupling being configured to releasably coupled to a second volume interface of a second liquid container, the second controllable valve being capable of enabling or disabling a flow of liquid from the second liquid container, a fourth liquid transport conduit being coupled to the second controllable valve and the dispensing interface.

In some embodiments, the second liquid container is within the pressurized environment, the second liquid container being a second compressible liquid container. In one example, the second liquid container is outside the airtight pressurized container. The second liquid container is a keg. In various embodiments, the first predetermined period of time is determined based on the viscosity of a liquid in the first compressible liquid container within the pressurized environment, a diameter of the first liquid transport conduit, a diameter of the second liquid transport conduit, and a pressure rating of the first controllable valve. The second predetermined period of time is determined based on a viscosity of a liquid in the second liquid container, a diameter of the third liquid transport conduit, a diameter of the fourth liquid transport conduit, and a pressure rating of the second controllable valve. In one example, the example method includes blending liquid from the third liquid transport conduit and the fourth liquid transport conduit in a mixing component and may include a venturi. In some embodiments, the control signal is received from a mobile computing device to dispense liquid from the first compressible liquid volume and the second liquid volume according to the first profile.

An example system comprising, an airtight pressurized container for storing a first compressible liquid container, the airtight pressurized container further comprising an access component to enable installation and removal of the first compressible liquid container within the airtight pressurized container, the access component being configured such that, when sealed, enables a pressurized environment to be maintained within the airtight pressurized container, a controllable pressure system coupled to the airtight pressurized container through a pressure delivery conduit to generate the pressurized environment within the airtight pressurized container, a first liquid transport conduit coupled to a first releasable coupling, the first releasable coupling being configured to releasably couple with a first volume interface of the first compressible liquid container within the pressurized environment, the first liquid transport conduit being further coupled to a first controllable valve, a second liquid transport conduit coupled to a second releasable coupling, the second releasable coupling being configured to releasably couple with a second volume interface of a second liquid container, the second liquid transport conduit being further coupled to a second controllable valve, a control system comprising a first electromechanical control component and a second electromechanical control component, the first electromechanical control component configured to control the first controllable valve, the second electromechanical control component configured to control the second controllable valve, and a dispensing system comprising a third liquid transport conduit and a fourth liquid transport conduit, the third liquid transport conduit being coupled to the first controllable valve and a dispensing interface to dispense fluid through the first controllable valve to at least one spout in response to the control system, the fourth liquid transport conduit coupled to the second controllable valve and the dispensing interface.

BRIEF DESCRIPTION OF THE DRAWINGS

In the drawings, wherein like reference characters denote corresponding or similar elements throughout the various figures.

DETAILED DESCRIPTION

Systems and methods for storing, preserving, managing, and selectively dispensing beverages, in various embodiments thereof, remedies the flaws and drawbacks of previously known wine storage and dispensing solutions (and especially larger-scale commercial solutions) by storing a plurality of beverages such as various wines, beverages, foods, chemicals, and the like) in a pressurized environment. The pressurized environment may also be environmentally controlled to ensure that the stored contents (e.g., beverages, foods, chemicals, and/or the like) do not come into contact with air.

The pressurized environment may be remotely located from a dispensing system. The dispensing system may be controlled locally, remotely, and/or via a computerized system. The control system may control a source of pressure to the pressurized environment to apply a sufficient degree pressure to expel a desired volume of the stored contents to a remote dispensing/pouring interface (for example located in a desired area of a bar, restaurant, or other hospitality establishment) through a liquid delivery system (which may comprise one or more separate systems, for example directed to different areas of a commercial establishment).

Figure 2:
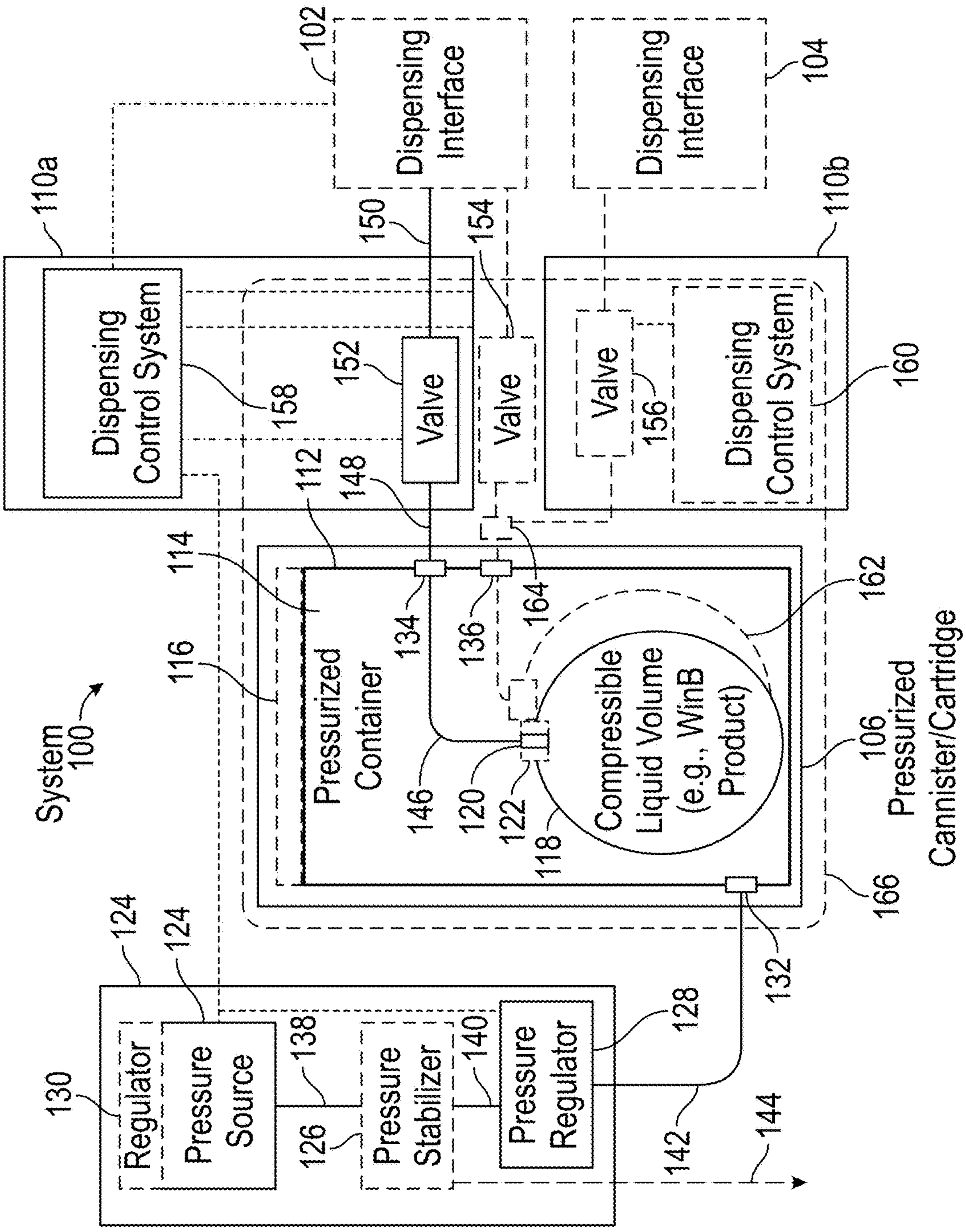
FIG. 2 is an illustrative diagram of a dispensing system capable of storing and selectively dispensing beverages or food-like substances in some embodiments.

In some embodiments, one or more compressible wine-in-bag ("WinB") product containers (i.e., compressible containers) may be placed into at least one pressurized chamber (serving as the pressurized environment) and interfaced with a liquid delivery system connected to one or more dispensing components such as those shown in the pressurization-based liquid dispensing technology disclosed in the above-incorporated '876 application as a Pressurized Liquid Storage and Dispensing system (which is hereby referred to as the "PLSMPD system"). The system may be scalable by utilizing any number of WinB products (for example, implemented with a simplified embodiment of the PLSMPD system, such as is shown in FIG. 2, and described in greater detail below in connection therewith).

The system may be deployed as a flexible multi-area electronically-controlled beverage dispensing infrastructure, operable to interface with various hospitality (e.g., restaurant) management systems. For example, the system may be implemented with one or more embodiments and optional features of a PLSMPD system, such as is shown in FIG. 2 and described in greater detail below in connection therewith.

Some embodiments described herein resolve one or more of the disadvantages of previously known WinB products and their dispensing containers in commercial environments. Various embodiments include systems and methods for preserved storage and selective controlled dispensation of beverages, such as wine, beer, vodka, smoothies, coffees, beer syrup, soft serve, and/or the like, that is configurable for use with a variety of WinB products, and their equivalents. The system may be modular and readily scalable for advantageous utilization in environments ranging from consumer homes to large commercial/hospitality establishments.

It should be noted that while various descriptions of the system and method describe the utilization with wine, one skilled in the art will appreciate that various embodiments of the can be readily utilized in conjunction with storage and selective dispensation of any beverage, liquid substance, food substance, chemical, or the like as a matter of design choice or necessity. Similarly, while embodiments of system and method are described as being operable for use with WinB products, virtually any anaerobic compressible container 118 can be readily substituted or even integrated into the pressurized chamber (e.g., as a lining or the like).

Figure 1:
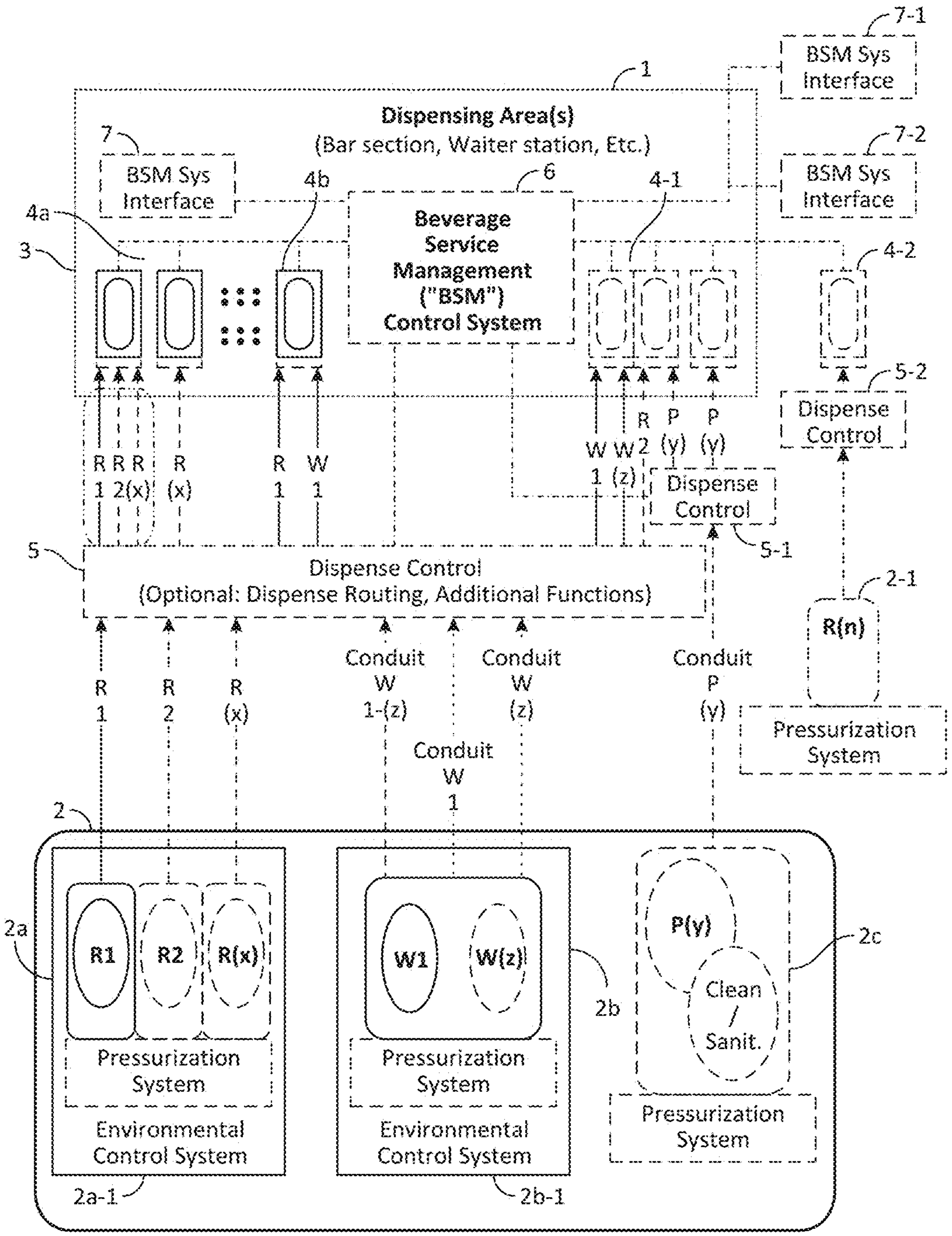
FIG. 1 is an illustrative diagram of a dispensing system capable of storing, preserving, managing, and selectively dispensing beverages or food-like substances in some embodiments.

Referring now to FIG. 1, the system and method for storing, preserving, managing, and selectively dispensing beverages are shown as a storage, preservation, management, and metered pour dispensing ("SPMMPD") to system 1 (for the sake of convenience only, and not by way of any limitation, referred to as the "System 100"). It should be noted that the term "Wine Cannon" is used herein for ease of reference only and does not in any way restrict or limit the various system embodiments and components thereof.

The system 1 may be configured for use with one or more pressurized storage/preservation ("PSP") systems. The that are each operable to store one or more WinB (or equivalent) products therein in a pressurized environment and that are also operable to launch, in response to control signals, predetermined amounts of the stored wines to one or more remote dispensing pour units (as hereinafter described), through corresponding dispensing conduits, to enable each dispensing pour unit to rapidly serve precisely metered pours.

An example of the system for storing and dispensing beverages (e.g., utilizing elements equivalent to or including 2, 2*a*, 2*b*, 2*a*-1, 2*b*-1, and 2*c*) may be found in system 100 of FIG. 2.

In various embodiments, the system 1 may include one or more of the following components, elements, and/or features:

A. A plurality of dispensing pour units that are provided for connection to plural PSP systems, such that each dispensing pour unit can be connected to, and initiate dispensing from, one or more plural PSP systems and/or from multiple beverages that may be available from any individual PSP system configured to dispense multiple beverages therefrom.

B. Plural PSP systems connected via dispensing conduits to various plural dispensing pour units enable not just "metered pours" (see below), but may serve each pour to a corresponding dispensing pour unit by utilizing a sudden rapid increase in pressure exerted on a selected compressible beverage volume stored therein, to eject each dispensed beverage from its volume and propelling it through the dispensing conduit to a corresponding dispensing pour unit (together forming a sealed system), with sufficient velocity to generate a vacuum effect and ensure that little, if any, of the poured beverage remains in the dispensing conduit.

C. Optionally, one or more dispensing conduits may comprise one or more check valves, with optional cooling of the portion of the dispensing conduit positioned between the PSP system and the check valve.

D. One or more of the plural PSP systems may be advantageously automated at a predetermined desired "automation level," ranging from a "lowest automation level" to a "highest automation level" (and which may be configured at any desired automation level therebetween):

1. at the lowest "automation" level, the plural PSP systems may be controlled from the dispensing pour units (to initiate pours) and may provide minimum needed feedback such as alarms (e.g., wine running low or empty, pressurization problem(s), temperature variance in the system beverage storage component being outside safe range), without the need for the use of a centralized control, system; and
2. at the highest "automation" level, the plural PSP systems may be controlled from a centralized control system (such as a BMS control system 6, described below regarding FIG. 1) that may optionally still utilize local controls at the dispensing pour units to initiate pours, and/or utilize local PSP system control units) that can, in addition to providing a centralized alarm/system information dashboard, also manage and automatically address various system issues. The centralized system may, in some embodiments, perform one or more of the following: monitoring pour volumes, making automatic adjustments of pressure parameters in individual PSP systems to maintain predetermined "metered pour" volumes, controlling temperature, automatically initiating and conducting cleaning processes (for example if dispensing system cleaning/sanitizing components and features are utilized), and the like. The centralized system mays also monitor beverage sales, perform inventory management, track beverage conditions, perform auto-reorders, tracking each pour by the person who initiated it, and/or collecting and utilizing related data.

While the entire system 1 may be operated from local controls positioned at various locations where the beverages stores in the PSP systems are dispensed, the system may be controlled, configured, and operated through a centralized Beverage Service Management ("BMS") control system 6 in FIG. 1. In one example, the BMS control system 6 may include at least one data processing system and related applicable components that are operable to execute one or more configurable application programs and/or program modules.

The BMS control system 6 may be a standalone system or it may be integrated with an existing hospitality management system (for example in a large restaurant and/or in hotel or other sufficiently large venue facility). While certain operations and back-office functions may be restricted to a secure local or a secure web-accessible control interface, the day-to-day dispensing functions and related tasks may be operated (and optionally configured) from one or more control system interfaces (shown in FIG. 1 as BMS system interfaces 7 to 7-2). BMS system interfaces 7 to 7-2 may include one or more data processing systems (e.g., touch screen panels, computer stations or the like). One or more data processing system(s) may be located at waiter stations, at a bar, or the like. The one or more data processing systems may include or be in communication with conventional mobile data processing/communication devices (e.g., smart phones, tablets, etc.) supplied with appropriate software application programs ("Apps").

In some embodiments, the Beverage Service Management ("BMS") System (as discussed in various examples herein) may be or include a centralized or a distributed data processing system. The data processing system may include one or more of the following: communication, data interchange, and data acquisition features. The data processing system may be or may be in communication with a computer (e.g., digital device). The data processing system may include any number of controllers for interfacing and/or communicating with the Wine Cannon SPMMPD system (such as that shown in FIG. 2 or different examples of similar systems discussed herein). The data processing system may include one or more controllers for interfacing with and managing various components of the system 1 (e.g., the plural PSP systems, the dispensing pour units).

The BMS system may be a hybrid platform in which a mobile data processing device (such as a smart phone or a tablet) may be utilized as the control and user interface, with the remainder of the functions being managed and implemented through one or more secondary data processing systems, and/or controllers.

The BMS control system 6 may perform one or more of the following features/functions:

A. Providing operational monitoring, control and regulation functionality to all or part of the system 1 and its components, ranging from monitoring one or more of the plural PSP system's parameters (such as pressure level, temperature, or the like), monitoring pour volume accuracy via one or more means at the dispensing pour units, initiating adjustments in pressurization parameters to minimize pour volume variances, and providing alarms and system information (e.g., using a dashboard) to the applicable system administrator.

B. Providing information, reporting, and related system management functions, to automate, and reduce the cost of, system 1 operations. These systems may include one or more of the following:

1. Tracking individual beverage inventories.
2. Providing re-order alerts, or automatically placing re-orders when particular beverage inventories drop below specified levels.
3. Initiating automatic cleaning/sanitization of system 1 (e.g., system 100 of FIG. 2).
4. Tracking of system 100 of FIG. 2 utilization through a range of parameters, and providing reports on beverage sales by beverage, price level date, time of day, by personnel initiating the pours, by individual dispensing pour units, and/or the like.
5. Providing beverage sales projections and related information.

C. Providing access management for individual dispensing pour units (via "token" type or Biometric ID verification such as at the dispensing pour unit level), so that only specific authorized personnel may access the system and/or dispense beverages. In one example, a particular employee or a classification of employees may be restricted from initiating pours of wines over a particular dollar value (e.g., over $20 a glass) or from dispensing certain beverages (e.g., restricted to non-alcoholic beverages, restricted from dispensing any particular beverage that may be too rare, or the like). The system may track the ID of each person initiating a pour along with all related information (pour time, beverage poured, and the like).

D. Providing optional functionality to enable "extended" features, such as control and management of "self-service" stationary or mobile dispensing pour units, where individual customers can be pre-authenticated and pre-authorized to operate the self-service dispensing pour units (for example, biometrically or via being provided a "token" such as a magnetic, NFC, or RFID device) or an electronic token storable on their mobile device thereby enabling such pre-authorized customers to freely use self-service dispensing pour units. In some embodiments the system may allow customers to use self-service dispensing pour units and charge their pours to their room in a hotel, to a previously provided credit card, or to a pre-authorized "allowance" (for example during an event). Such authentication can also serve to verify the customer's age.

E. The system may provide optional physical inventory tracking features, including one or more of the following:

1. Tracking and monitoring the acquisition, installation, and removal of each individual compressible container (e.g., wine-in-bag), through compressible container IDs. The compressible container identifiers (IDs) may be identified on a label. The compressible container IDs may, for example, be a scannable code such as a barcode or QR code. The compressible container IDs may be RFID tags (or equivalents). It will be appreciated that compressible containers may be tracked and/or monitoring through any other inventory tracking and management means.

2. Allocating incoming inventory items (e.g., compressible containers) to corresponding designated dispensing systems. For example, the system may direct installation of incoming Pinot Nair and Chardonnay wine bags in a specific dispensing system equipped with blended pour and carbonation functionality (e.g., operable to dispense blended carbonated "champagne-style" pours).

Thus, for example, as described in greater detail below, each of the PSP systems may comprise the pressurized container 112 coupled to a controllable pressure system 108 of the PLSMPD system 100 of FIG. 2, with or without the dispensing interface 102.

In some embodiments, PSP systems 100 may include and utilize compressible liquid containers 118 (such as WinB products) of a variety of different types, styles, varietals, and brands of beverages, such as different red wines R1-R(x), white wines W1-W(z), Ports or other cordials P (y). Optionally, one or more of the PSP systems (such as PSP systems 2*a*, 2*b*) may be provided with temperature and/or other environmental (e.g., humidity) control systems (e.g., environmental control systems 2*a*-1, 2*b*-1) for proper maintenance of the stored beverages.

The system 100 may comprise and utilize PSP systems of various configurations. Some embodiments of PSP systems 100 may include, but are not limited to, at least one of the following:

A. One or more pressurized containers each operable to store and dispense a single WinB product, through a corresponding dispensing conduit.

Optionally, each pressurized container may be configured as a cartridge (e.g., a canister/cartridge 106), having various pressurized container interfaces positioned, sized, and configured to align with and "plug in," or otherwise securely couple to corresponding pressurization source and liquid dispensing conduits when placed into a correspondingly configured docking station or equivalent (not shown).

For example, PSP system 100 may comprise a single pressurized container with a single WinB product positioned therein, or it may comprise multiple pressurized container, each comprising a single corresponding WinB product.

B. At least one pressurized container may be operable to store multiple WinB products therein. Each WinB product (e.g., compressible container) may have an identification/tracking element that enables personnel responsible for management thereof, to ensure that correct WinB products are positioned in correct PSP systems and connected to correct dispensing conduits.

C. When the PSP system is configured with a plurality of outgoing dispensing conduits (e.g., one for each stored WinB product), the system, 100 may dispense each WinB product through a corresponding plural dispensing conduit connected thereto.

D. When the PSP system is configured with a single outgoing dispensing conduit (e.g., shared by all stored WinB products), dispense each particular WinB product through a single shared dispensing conduit connected thereto.

E. One of the WinB product(s) may be replaced with a compressible liquid container comprising a cleaning/sanitizing solution that may be selectively "dispensed" through one or more corresponding dispensing conduits to clean and sanitize the conduit internals and the downstream dispensing pour units (e.g., such as compressible cleaning/sanitizing solution volume 322 in PLSMPD system 100 of FIG. 2).

Optionally, rather than requiring the various PSP systems to utilize local pressure sources, the system 100 may include a centralized stabilized pressure source (for example positioned in a remote location) enabling portable and/or mobile PSP systems to be deployed proximally to such outlets without the need for portable pressure sources, so that when connected thereto, the PSP systems may share and utilize the centralized stabilized pressure source, and provide dispensing functionality through local dispensing pour units (which for example may be configured as simplified "guntype" pour components).

The system 100 may be used with PSP systems located in a remote area such as a basement, cellar, or location where there is room that is not being used for consumers or operations.

The system 100 may include a plurality of dispensing pour units located in one or more locations. Each dispensing pour unit may be operable to:

A. enable selection of a specific desired wine (or other beverage) from one or more available options.

B. deliver the selected beverage. The beverage may be optionally aerated, carbonated, and/or blended (e.g., with one or more different wines, mixers, or the like), and/or otherwise pre-processed during the dispensing process. These options may include:

1. manual actuation by operating a local control manually (e.g., by a switch), by selection of a proper menu option at a BMS system interface.
2. automatic actuation by positioning a container (e.g., glass) in a designated portion of the dispensing pour unit to receive a pour. The system 100 may trigger dispensing the beverage in response to pressure on a plate caused by weight of the container, optical sensor (e.g., breaking a light beam in the dispensing unit), equivalent switch, or by other means.
3. a combination of manual and automatic actuation.

The dispensing pour units may range from simple gun-type hand-operated dispensers positioned at the end of one or more liquid delivery conduits connected to the remote PSP systems to a more robust and full-featured dispensing pour unit. An example of a more advanced dispenser pour system is illustrated as a dispensing pour unit in FIG. 4C along with various components thereof.

The delivery/dispense control/and optional routing of the various beverages from the PSP systems to the various corresponding dispensing pour units may be accomplished by a dispensing control system 110*a* (see FIG. 2). The dispensing control system 110*a* may be configured to perform PSP system control functions (and thus eliminate the need for individual control local systems at each PSP system). The dispensing control system 110*a* may be configured to communicate with and selectively operate one or more control systems local to one or more corresponding PSP systems. Examples of configurations and operations of such systems are provided below.

Optionally, the dispensing control system 110*a* may comprise one or more "enhancement" components, each operable to selectively apply one or more predefined enhancements to one or more dispensing conduits selectively connectable therewith. Examples of enhancement components that may be provided and utilized in accordance with some embodiments include, but are not limited to:

A. A cooling component, operable to lower the temperature of the beverage in a dispensing conduit passing therethrough by a predefined amount.

B. An aeration component, operable to selectively inject oxygen or nitrogen into a dispensing conduit to provide a desired level of aeration.

C. A carbonator component, operable to selectively add carbonation to any beverage being dispensed, thus providing an operating establishment with the option of selectively convert standard wine pours into sparkling wine pours. For example, a carbonator component may include a liquid transport coupled to a source of carbonation as well as a nozzle at the dispensing unit. By adding carbonation, the system 100 may allow for syrups to be used for beverages (e.g., soft drinks or beer may be carbonized). In another example, wines may be carbonated to Champagne-type pours from applicable varietals (e.g., pinot noir, chardonnay, or the like), as well as to create Prosecco or Durello inspired pours, or carbonated pours of any other varietal (Shiraz, etc.).

1. Carbonation may be accomplished by injecting a carbonation medium (for example, CO2 from a carbonation source, such as a CO2 tank connected to a PSP system dispensing conduit through a remotely controllable valve). In some embodiments, the BMS control system 6 is operable, directly or through the dispensing control system or a local PSP system controller to adjust carbonation pressure levels (and optionally other carbonation-related settings) in response to a control signal (which may be received either programmatically for a specific predefined "blended drink recipe"), or which may be selected from a BMS system interface such as at the unit, a bar, a kiosk, and/or a mobile device App.
2. "Carbonation-related" settings may be controlled by a user, server, owner, and/or administrator. Carbonation-related settings may include, for example, the option of adding a small amount of carbonic acid to be used in a mixer (such as for a Bellini). The addition of carbonic acid for such purposes may improve the end product and permit the operating establishment to add more ice to the end product, increasing their per-product served revenue.
3. Carbonation functionality may be advantageously operable from a dispensing pour unit control interface and/or from a BMS system interface 7, 7-1, 7-2 (e.g., by a server or bartender), or, if such access is permitted, from a mobile device App.
4. In dispensing pour units having a blended pour capability, the carbonation function may be utilized in combination to produce blended carbonated pours in accordance with one or mere pre-configured Blended Carbonated Pour Profiles, or on an ad hoc basis.

In various embodiments, a wine, liquids, fluids, soft serve, chemicals, food-like substances, or the like may be stored in a pressurized environment under regulated pressure sufficient to maintain the wine, liquids, fluids, soft serve, chemicals, food-like substances, or the like in an airtight (e.g., anaerobic) state. For example, the liquid may be stored in a compressible bag disposed inside a sealed pressurized chamber.

The wine, liquids, fluids, soft serve, chemicals, food-like substances, or the like may be selectively dispensed through a normally locked dispensing conduit connected to the pressurized environment, while maintaining the anaerobic status of the remaining liquid, maintaining a predetermined level of pressure on the stored liquid, that is sufficient to expel the stored liquid in response to the dispensing conduit being selectively unlocked for as long as the conduit is open, in accordance with one or more predetermined dispensing profiles. Each such profile may comprise dispensing parameters that include time to open valves of conduit(s) to allow the contents of the compressible container(s) to be dispensed in the desired amount. The time to open valves (and keep the valves open) may be based on the volume of liquid to be dispensed, the distance the dispensed liquid will need to travel along the conduit to a dispensing system/interface to be poured, viscosity of the contents to be dispensed, and/or the like.

In various embodiments thereof, the pressurization system component of the PLSMPD system compensates for the gradual decrease in the volume of the stored liquid such that system performance is maintained after multiple dispensations.

The majority of liquid transport system utilize mechanical pumps with a separate pump being required for each liquid dispensing conduit. The utilization of a pump for each conduit is inefficient, may lead to costly maintenance, and greatly increasing the cost of any implementation that requires delivery of multiple liquids. Moreover, pumps generate heat during their operation, which has a significant negative impact on temperature-sensitive liquids such as wines. Additionally, a mechanical pump requires that a liquid-filled bag (e.g., a WinB product) be placed in a holding vessel with the nozzle positioned on the bottom of the bag. Further a mechanical pump cannot fully empty the contents of the bag because the mechanical pump does not pull the liquid (e.g., the wine) from its container (e.g., the bag). As a result, mechanical pumps result in ongoing losses of valuable products and creating additional difficulties in depleted bag disposal. Furthermore, as dispensing WinB products is a very intermittent process, subjecting the pump to constant starts/stops greatly increases wear and tear of the pump and leads to a sizable reduction in the pump's useful life.

Other liquid transport solutions eschew the use of mechanical pumps and instead rely on a "gravity feed" approach coupled with utilization of regulation flow-meters. However, because any liquid transport system based on such a solution will not be able to transport any liquid from its container to a dispensing location that is at the same level as, or elevated above, the portion of a bag from which the liquid exits. Moreover, the performance of any gravity feed solution suffers when the dispensing target, to which the liquid must be transported, is not positioned significantly below the bag from which the liquid is being dispensed.

Further, both pump and "gravity feed" approaches cannot quickly deliver metered (e.g., automatic) pours on demand. Not only does this flaw increases costs due to over-dispensing expensive wines, but there are significant operational costs in commercial beverage service environments incurred when establishment staff must spend sufficient time to ensure an accurate pour. When referring to "metered" pour herein, it will be appreciated that the phrase "metered pours" refer to the system measuring output of dispensing to assure an amount is dispensed or the system automatically dispensing wine, liquids, fluids, soft serve, chemicals, food-like substances, or the like based on a recipe that automatically opens and closes a valve to dispense the wine, liquids, fluids, soft serve, chemicals, food-like substances, or the like (e.g., dispensing an amount of container contents based on the time used to maintain the valve in an open state to allow the contents to flow to the dispensing system).

In some embodiments, the PLSMPD system is capable of transporting/dispensing wine locally, or to significantly remote dispensing locations at extremely high speed and with a great deal of accuracy without spillage. Moreover, the system may rapidly transport wine across a suitable distance.

In some embodiments, when serving wine, the system may control oxygenation to the product that, when properly administered, is widely considered to enhance the positive attributes of most wines. This optional feature of the PLSMPD system is particularly advantageous in view of the fact that in many wine bars/fine dining establishments, quite a bit of time and effort is spent to "aerate" the wine prior to serving.

In some embodiments, the PLSMPD system is configurable to ensure rapid highly accurate pours over a wide range of distances through the use of recipes that control opening and closing of valves (e.g., valve 152 of FIG. 2) to dispense product. The recipe or timings for valve control may be based on pressure vs. time algorithms to automatically manage pour rate accuracy for one or more predetermined pour sizes. Control and tuning of such algorithms may be stored as a recipe in a plurality of recipes for different beverages, product processing instructions, manual control of a user at a dispensing system (e.g., at the BMS control system 6 and/or BMS system interfaces 7, 7-1, and 7-2 of FIG. 1), and/or the like.

Referring to FIG. 2, the system 100 includes a pressurized container 112 (e.g., an airtight high-pressure seal rated tank, vessel or equivalent) for storing a compressible container 118 (e.g., a flexible WinB product) within a pressurized environment 114), a controllable pressure system 108 (e.g., a compressor, a compressed air tank, gas tank, or an air pump connected to an air pressure stabilizer and an air pressure regulator) that is connected to the pressurized container 112 through a pressure delivery conduit (e.g., tubing or piping). It should be noted that the controllable pressure system 108 may be readily selected from a variety of devices/systems operable to generate and maintain the pressurized container 112 within the desired parameters. For example, the controllable pressure system 108 can utilize non-air, gas, or another fluid. Alternately the pressure force for the controllable pressure system 108, may be generated through gravity, preconfigured compressed air/gas container, or through other non-pumping means.

In some embodiments, a dispensing conduit (which may be plastic or metal tubing, or equivalent) may be directly connected to the pressurized container 112 (as opposed to being connected to the liquid volume interface), while the controllable pressure system 108 may be selected and configured to provide direct pressurization to the compressible container 118 for example by volumetric compression of the internal region of the pressurized container 112 (e.g., by hydraulic/piston-like compression thereof) to generate and maintain the pressurized container 112 within the necessary/desired parameters. The dispensing conduit to dispense product through the dispensing interface 102 may optionally include one or more in-line 1-way check valves to minimize the amount of liquid that remains therein after each time the system 100 dispenses the liquid therethrough.

The system 100 may include a local dispensing control system 110A top control a valve 152 (e.g., a solenoid valve coupled to a dispensing controller which may range from a solid-state electronic control to a computerized system operable to independently control multiple solenoid valves). The valve 152 may be connected to the compressible container 118 via the liquid transport conduit 148. The local dispensing control system 110A may also include or control a dispensing pour unit of a dispensing interface 102.

Optionally, the local dispensing control system 110A may be connected to the controllable pressure system 108, such that it may be operable to provide any necessary control functions, such as pressure maintenance/regulation. In some embodiments when activated (for example, from the BMS control system 6 through a link therewith), the local dispensing control system 110A may instruct the controllable pressure system 108 to briefly increase the level of pressure of the pressurized container 112 for all or a portion of the duration of a dispensing period to provide additional force and velocity to the liquid being expelled from the compressible container 118 (for example if a corresponding dispensing pour unit is particularly distant from the pressurized container 112).

As noted above, the system 100 is operable through selective activation of the local dispensing control system 110A (through a remote signal from an external controller such as the BMS control system 6) and/or via an activation signal from a dispensing pour unit connected thereto (e.g., by a button, pressure, IR or equivalent switch). In accordance with one or more predefined dispensing profiles, the local dispensing control system 110A may open one or more valves causing the pressurized liquid to be immediately expelled from the compressible container 118 to be poured at the corresponding dispensing pour unit (e.g., such as dispensing pour unit 4*a* of FIG. 1).

A dispensing profile may be as simple as a predetermined group of settings fully or partially locked into the system 100, that control pressurization, duration of the dispensing period, and other parameters. In some embodiments, a particular dispensing profile may be modified by or at the BMS control system 6. In one example, the BMS control system 6 may regulate the volume of each dispensed pour based on valve timings based on a customer order, and/or that may provide instructions for additional operations.

The implementation of deployment profiles in the system 100 may be supported by at least one predefined pressure vs. time algorithm that may be executed by the local dispensing control system 110A to automatically manage pour rate accuracy for one or more predetermined pour sizes, at a corresponding dispensing pour unit. In some embodiments, the remote controller may include a mobile device with corresponding software application comprising a graphical user interface, installed thereon.

In some embodiments, the pressurized container 112, the conduits, and/or the local dispensing control system 110A may be positioned in a temperature-controlled environment that is suitable for temperature stable storage of the liquid being dispensed from the compressible container 118. The temperature-controlled environment may be passive (such as a cellar/basement), active (such as a refrigerated housing, refrigerated jacketing, or coils positioned around the pressurized container 112), a cold plate (or equivalent), ice environment, or equivalent freezable cold elements. In some embodiments, the temperature control elements (e.g., housing, jacketing, coils, cold plate, ice, or the like) may be, for example, positioned proximally to (or within) the pressurized container 112, or a combination of one or more of the above (such as a climate-controlled wine cellar). Additionally, a temperature control component may be positioned surrounding the compressible container 118 (such as a cooling jacket around a wine bag) or one or more conduits.

In some embodiments, the system 100 may be positioned on a mobile cart (not shown) or on an equivalent mobile platform. In one example, the controllable pressure system 108 may include one or more air tanks, the corresponding dispensing pour unit may include a dispensing gun, and the dispensing control system may include a mobile device supplied with a corresponding user-controlled application.

The Pressurized Liquid Storage and Dispensing ("PLSMPD") system 100 of FIG. 2 may include a pressurized container 112 (e.g., an airtight high-pressure seal rated tank, vessel or equivalent) for storing a compressible container 118 (e.g., a flexible WinB product) within a pressurized environment 114. The compressible container 118 includes a volume interface 122 (e.g., a nozzle or equivalent) for accessing the liquid stored therein which may be configured for a sealed/airtight connection to a releasable coupling 120 (such as a connector/compression filling), that in turn connects the compressible container 118 to a liquid transport conduit 146.

In some embodiments, the pressurized container 112 may be configured as a pressurized canister/cartridge 106, having the various pressurized container interfaces 132, 134 (and optionally pressurized container interface 136), positioned, sized, and configured to align with and "plug in", or otherwise securely couple to the corresponding pressurization and liquid delivery conduits when placed into a correspondingly configured "docking station" or equivalent.

While the volume interface 122 and the releasable coupling 120 may be preconfigured to readily form a releasable sealed connection, in some embodiments, the releasable coupling 120 may include a "universal adapter" component, operable to enable the adaptive releasable coupling 120 to form a secure sealed (but releasable) connection with virtually many variations of the volume interface 122.

In some embodiments, the releasable coupling 120 also comprises a releasable sealed connector element operable to form a releasable connection with the conduit 146 so that it the conduit 146 can be readily disconnected if replacement or either component is necessary. The sealed connector element of the releasable coupling 120 may include a releasable adaptive pressurized filling that increases in strength and reliability in response to an increase in the pressure that is exerted in the PLSMPD system 100 (e.g., such as a pressurized "O-Ring" fitting).

Similarly, the use of such releasable adaptive pressurized fillings may be utilized in many components of the PLSMPD system 100 in which connections with various conduits are made such as pressure container interfaces 132 and 134 (and in optional pressure container interface 136), in an optional splitter 164 (e.g., a 1-way diverter valve), and in numerous other connections (not specifically identified in FIG. 2) involving the various pressurization conduits 138, 140, 142, and 144, and the various liquid transport conduits 146, 148, and 150.

In some embodiments, the pressure container interface 134 and the optional pressure container interface 136 comprise 1-way check valves (or combination control and 1-way check valves). While the liquid transport conduits 146, 148, and 150 may be of any sterile materials, they may be composed of flexible material that enable the PLSMPD system 100 to take advantage of the "hammer effect" to increase the speed of the liquid being dispensed therethrough.

The various conduits utilized in connection with the PLSMPD system 100 may comprise reliable, flexible tubing or equivalent, which may be composed of plastic (and related materials such as polymers, etc.), or from suitable metal.

In some embodiments, many or all conduits utilized in the PLSMPD system 100 may have uniform characteristics, whether employed for pressurization or for liquid transport functions (in which case when used for beverage dispensing, the conduits are composed from non-reactive food-safe materials)—thus simplifying the PLSMPD system 100 maintenance and upkeep. In various embodiments, replacement conduits may be readily cut and deployed as needed.

In various embodiments, conduits utilized in the PLSMPD system 100 may have different characteristics, depending on whether they are employed for pressurization (e.g., conduits 138, 140, 142, and 144), or for liquid transport functions (e.g., conduits 146, 148, and 150). It will be appreciated that the pressurization conduits may not need to be food-safe and may be more robust (such as through use of metal tubing), while the liquid transport conduits may be composed from non-reactive food-safe materials. Utilizing flexible materials for the liquid transport conduits 146, 148, and 150 enables the PLSMPD system 100 to take advantage of the "hammer effect" to increase the speed of the liquid being dispensed therethrough. Depending on their length, the liquid transport conduits 148 and 150 may also each include one or more corresponding controllable valves 152, or 154, 156, respectively, which may be controllable 1-way valves (e.g., 1-way solenoid valves), conventional 1-way check valves, or a combination thereof. Optionally, one or more diverter valves may be included in one or more of the liquid transport conduits 148 and 150 to minimize the amount of liquid that can remain therein following each time the PLSMPD system 100 dispenses the liquid.

In some embodiments, one or more additional compressible liquid containers 162 may be stored inside the pressurized container 112, and also subjected to the pressurized environment 114 during PLSMPD system 100 operation. The different compressible liquid containers 162 may be of any size or shape and may differ in size in shape from each other.

In some embodiments, one of the at least one additional compressible liquid containers 162, may be filled with a cleaning solution operable for cleaning and sanitizing the liquid transport conduits 148 and 150 as well as the controllable valve 152. In one example, the system 100 may operate a one-way diverter valve (e.g., controllable by system 100) that couples the cleaning liquid to any number of transport conduits to enable one container with cleaning fluid to clean any number of different transport conduits. The protocol for activation of the cleaning function can be configured and issued by the BMS control system 6 of FIG. 1 and can occur automatically in accordance with a predefined schedule, and/or automatically after a certain number of dispensing cycles and can also be activated manually.

The pressurized container 112 may include an access component 116 (such as an airtight portal, lid, or hatch) that when opened, enables installation, removal, and/or replacement of the compressible container 118 (and/or of the additional compressible liquid container(s) 162), and that when sealed, enables a controllable pressure system 108 to generate and maintain the desired pressurized environment 114 during PLSMPD system 100 operation.

The utilization of the controllable pressure system 108 by the PLSMPD system 100 may not only operate to manage the pressurized environment 114 in the pressurized container 112 within desired parameters (especially as the compressible liquid containers are depleted during PLSMPD system 100 operation), but may also support deployment and utilization of the above-described dispensing profiles by one or more dispensing systems (e.g., by a local control system 158 of a dispensing control system 110*a*, and/or by an optional local control system 160 of an optional dispensing control system 110*a*).

In some embodiments, the controllable pressure system 108 includes a pressure source 124 (such as a compressor, an air pump, or equivalent) connected, via pressurization conduit(s) 138, 140, to a pressure regulator 128, that is operable to control the operation of the pressure source 124 to adjust the pressurized environment 114, as needed, via a pressurization conduit 142 that forms a pressurized seal with the pressure container interface 132.

After the configuration of the desired settings and parameters, the pressure regulator 128 may operate automatically in accordance with its settings and parameters. In some embodiments, a pressure regulator 130 (having equivalent functionality to the pressure regulator 128) or its features may be integrated into the pressure source 124 instead of using the pressure regulator 128 (or in addition thereto, for example, for enabling backup/failsafe system operation, e.g., in case the pressure regulator 128 fails).

The controllable pressure system 108 may also include a pressure stabilizer 126 positioned between pressurization conduits 138 and 140, operable to "store" pressurization generated by the pressure source 124, and thereby to support the operation of the pressure regulator 128 by serving as an interim "on-demand" source of pressure for the pressure regulator 128 without needing to intermittently activate/engage the pressure source 124. Optionally, the pressure stabilizer 126 may serve as an interim pressure source for another pressure regulator of another PLSMPD system (not shown) via the pressurization conduit 144, such that the other PLSMPD system may share the pressure source 124 and the pressure stabilizer 126 with the PLSMPD system 100.

As was noted above, in connection with the description of the controllable pressure system 108, the controllable pressure system 108 may be readily selected from a variety of devices/systems operable to generate and maintain the pressurized environment 114 within the desired parameters. For example, the controllable pressure system 108 can utilize non-air gas or another fluid, such as compressed air and/or compressed $CO_2$ tanks. Alternately, the pressure force for the controllable pressure system 108 may be generated through gravity, via one or more preconfigured compressed air/gas containers, or through other non-pumping means, and/or through the introduction of $CO_2$ into the pressure regulator 128.

The PLSMPD system 100 also includes the dispensing control system 110*a*, which may comprise:

A. a controllable valve 152 (e.g., a solenoid or other electromechanical valve) coupled to the compressible container 118 via the liquid transport conduit 148, the container interface 134, and the liquid transport conduit 146 (e.g., with a way check valve capability); and/or B. an optional local control system 158 that comprises:

1. an electronic data processing system operable to execute program/control instructions which may be implemented in virtually any configuration ranging from a solid-state electronic controller to a computerized system that is operable to independently control multiple electromechanical devices and to optionally interface with a more comprehensive liquid dispensing management system,
2. one or more suitable electromechanical control components operable, in response to the electronic data processing system, to control electromechanical valves such as the controllable valve 152 and optionally one or more additional controllable valve(s) 154, 156 (e.g., if the optional additional compressible container 162 is employed), and optionally to control other electromechanical devices (for example, such as one or more components of the controllable pressure system 108, a dispensing interface 102, etc.), and/or
3. optionally a remote controller component, which may include a mobile device with a corresponding software application comprising a graphical user interface, installed thereon.

The dispensing control system 110*a* is also connected to a dispensing interface 102 via the liquid transport conduit 150.

If one or more optional additional compressible liquid container(s) 162 are employed, the PLSMPD system 100 may include one or more optional dispensing control system(s), having a local control system 160 and a controllable valve 156 each of which may be provided in any of a variety of configurations described above in connection with the local control system 158, and the controllable valve 152. In this example, the optional dispensing control system 160 is connected to a dispensing interface 104 (for example, a dispensing pour unit of the system 100), and is operable to dispense the liquid from the compressible liquid container(s) 162 therethrough.

Optionally, one or more stand-alone controllable valve(s) 154 may be provided that are controllable by the dispensing control system 110*a* (and/or by the dispensing control system 160, if present), without need for a dedicated control system thereof. As is shown in FIG. 2, by way of example, the stand-alone controllable valve 154 may be used in conjunction with the additional compressible container 162 and the optional splitter 164 to execute pours from the compressible container 162 to the dispensing interface 102, while the dispensing control system 160 is operable to simultaneously execute rapid metered pours from the compressible container 162 to the dispensing interface 104. Optionally, the above functions can be implemented utilizing a Y-adapter manifold.

Optionally, the dispensing control system 110*a* may be connected to the controllable pressure system 108 (or to individual components thereof) to perform pressure maintenance/regulation. In some embodiments, when activated (for example, from the dispensing interface 102 through a link therewith), the dispensing control system 110*a* may instruct the controllable pressure system 108 to briefly increase the level of pressure in the pressurized environment 114 to provide additional force and velocity to liquid being expelled from the compressible container 118 (for example if the dispensing interface 102 is particularly distant from the pressurized container 112).

In an alternate embodiment of the PLSMPD system 100, the pressurized container 112 may be positioned in a temperature-controlled environment 166 that is suitable for temperature-stable storage of the liquid being dispensed from the compressible container 118 (and/or from the compressible container 162). The temperature-controlled environment 166 may be passive (such as a cellar/basement) or active (e.g., including gas, liquids, or the like to cool or heat product). Examples of active elements include a refrigerated housing (or refrigerated jacketing), coils (e.g., positioned around the pressurized container 112), a cold plate (or equivalent), ice, or equivalent freezable cold elements, positioned proximally to the pressurized container 112 (such under the bottom thereof), or a combination of one or more of the above (such as a climate-controlled wine cellar). Additionally, or alternatively, an individual temperature control component (such as a cooling jacket around a wine bag) may be positioned surrounding any liquid volume stored in the pressurized container 112 that requires lower temperatures for optimal storage (e.g., the compressible container 118 and/or 162). In various embodiments, the active components may surround conduits to cool or heat product within the conduits.

Figure 3:
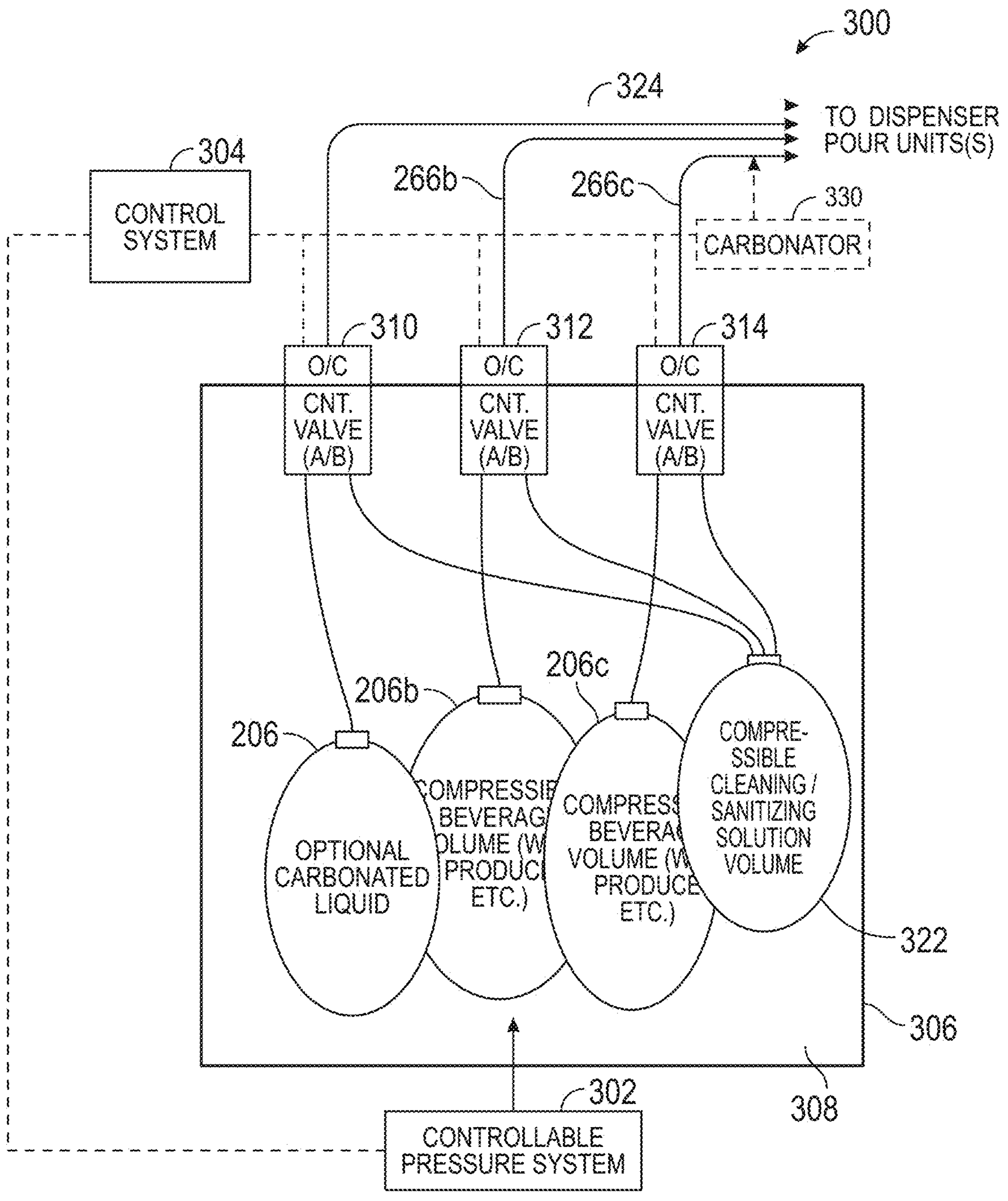
FIG. 3 is an illustrative diagram of a dispensing system capable of storing and selectively dispensing beverages or food-like substances in some embodiments.

Referring now to FIG. 3, another example system and method for storing and selectively dispensing liquids is shown as a Pressurized Liquid Storage and Dispensing ("PLSMPD") system 100. By way of example, the PLSMPD system 300 may comprise a system cleaning/sanitizing feature, implemented as a compressible cleaning/sanitizing solution volume 322 that can be utilized to clean any of the dispensing conduits 324, 326, and 328, when the control system 304 selectively activates each individual A/B—Open/Close solenoid 310, 312, and 314, one at a time, to dose off a corresponding stored to connect the compressible cleaning/sanitizing solution volume 62 to each corresponding dispensing conduit 324, 326, and 328, and to perform cleaning/sanitization by running a cleaning cycle therethrough. At the conclusion of the cleaning process, the control system 304 causes A/B—Open/Close solenoids 310, 312, and 314 to select the connections to the compressible liquid containers (WinB product) 316, 318, and 320).

Optionally, a local carbonator component 330 operable through the control system 304 (or remotely from the BMS control system 6) may be provided with selective connectivity to one or more of the dispensing conduits 324, 326, and 328, having the functionality described above in connection with the dispensing control system 5 of FIG. 1.

Figure 4A:
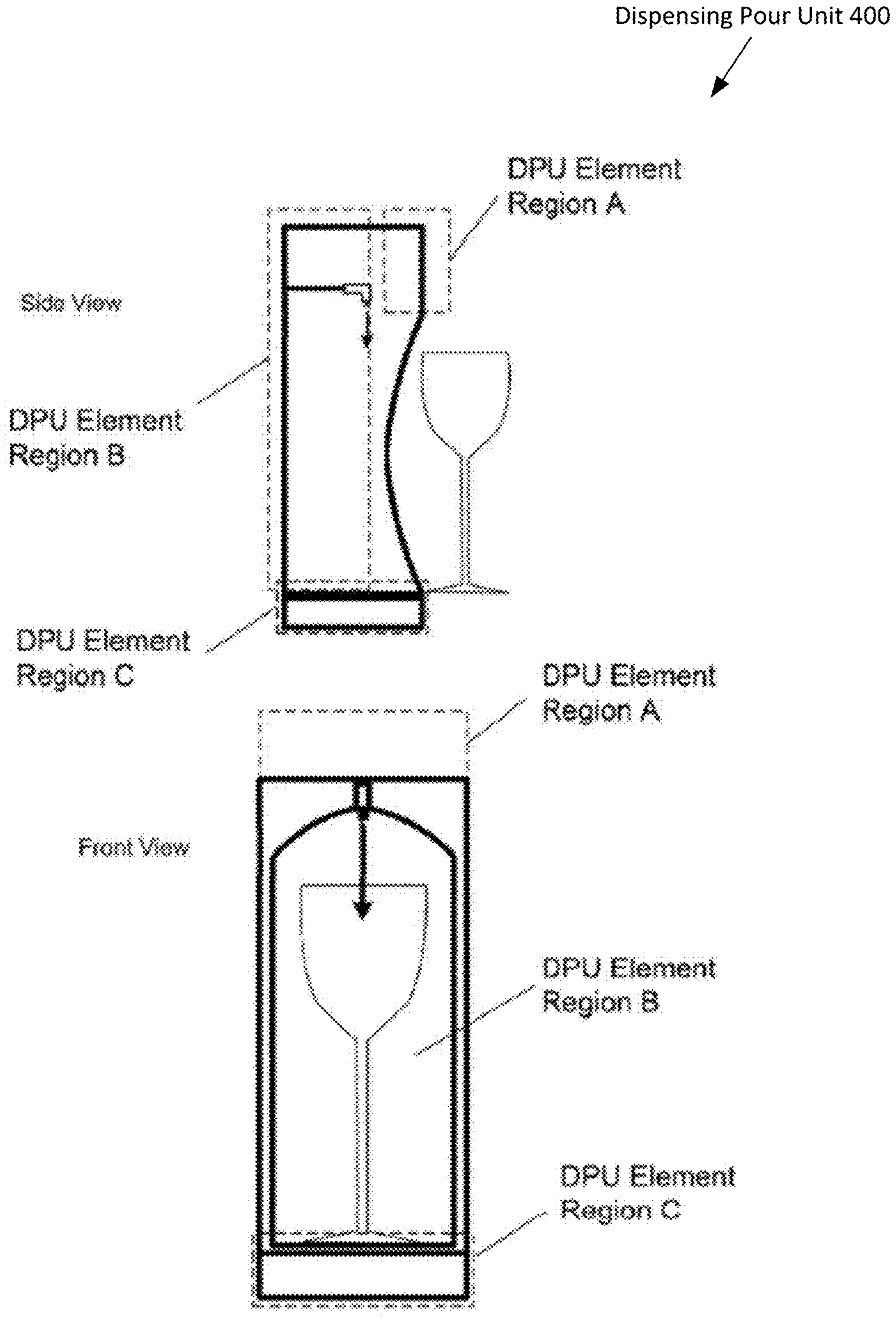
FIG. 4A is an illustrative diagram of a dispensing interface according to some embodiments.
Figure 4B:
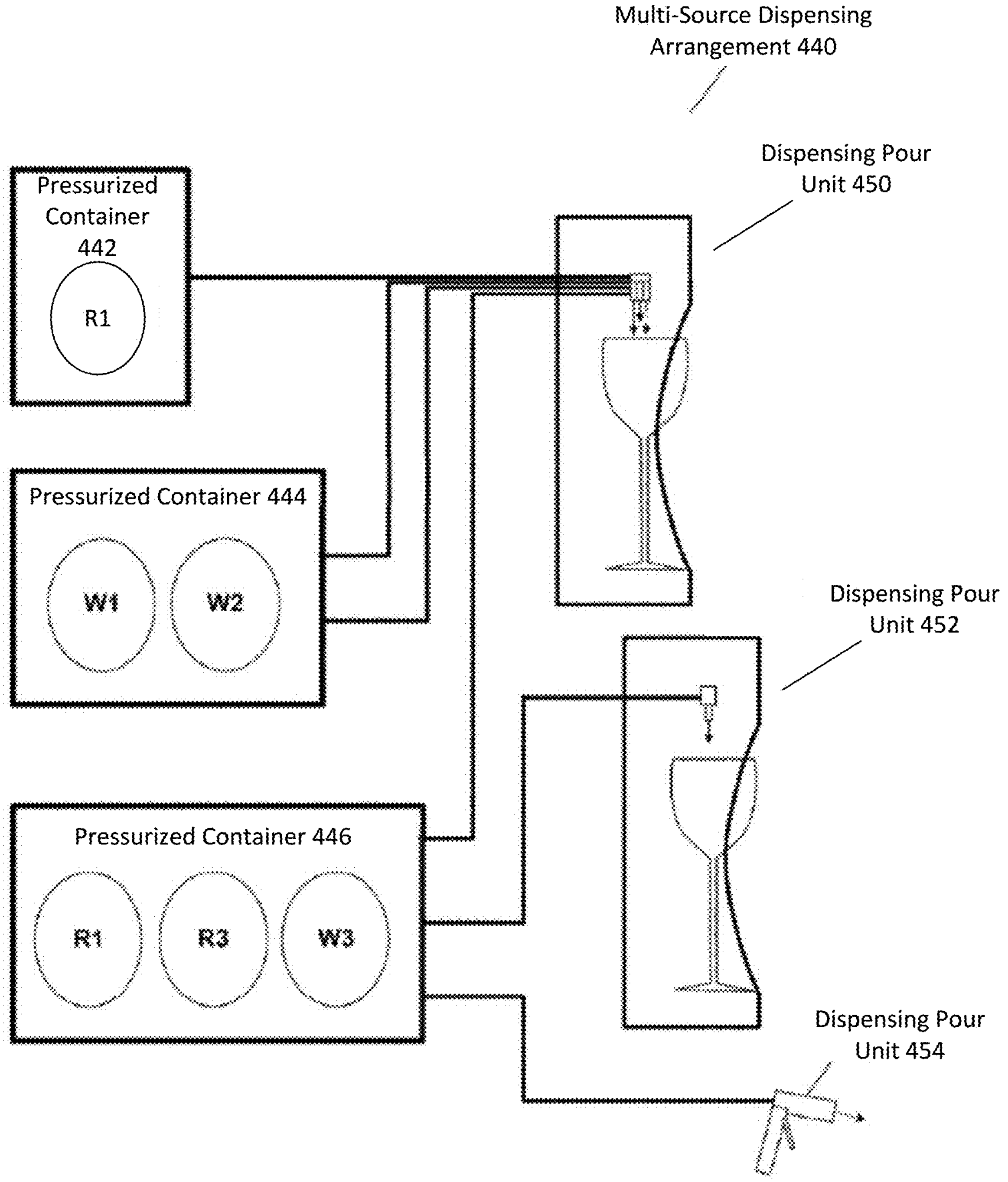
FIG. 4B is an illustrative diagram of a dispensing interface that includes multiple dispensing pour unit components according to some embodiments.
Figure 4C:
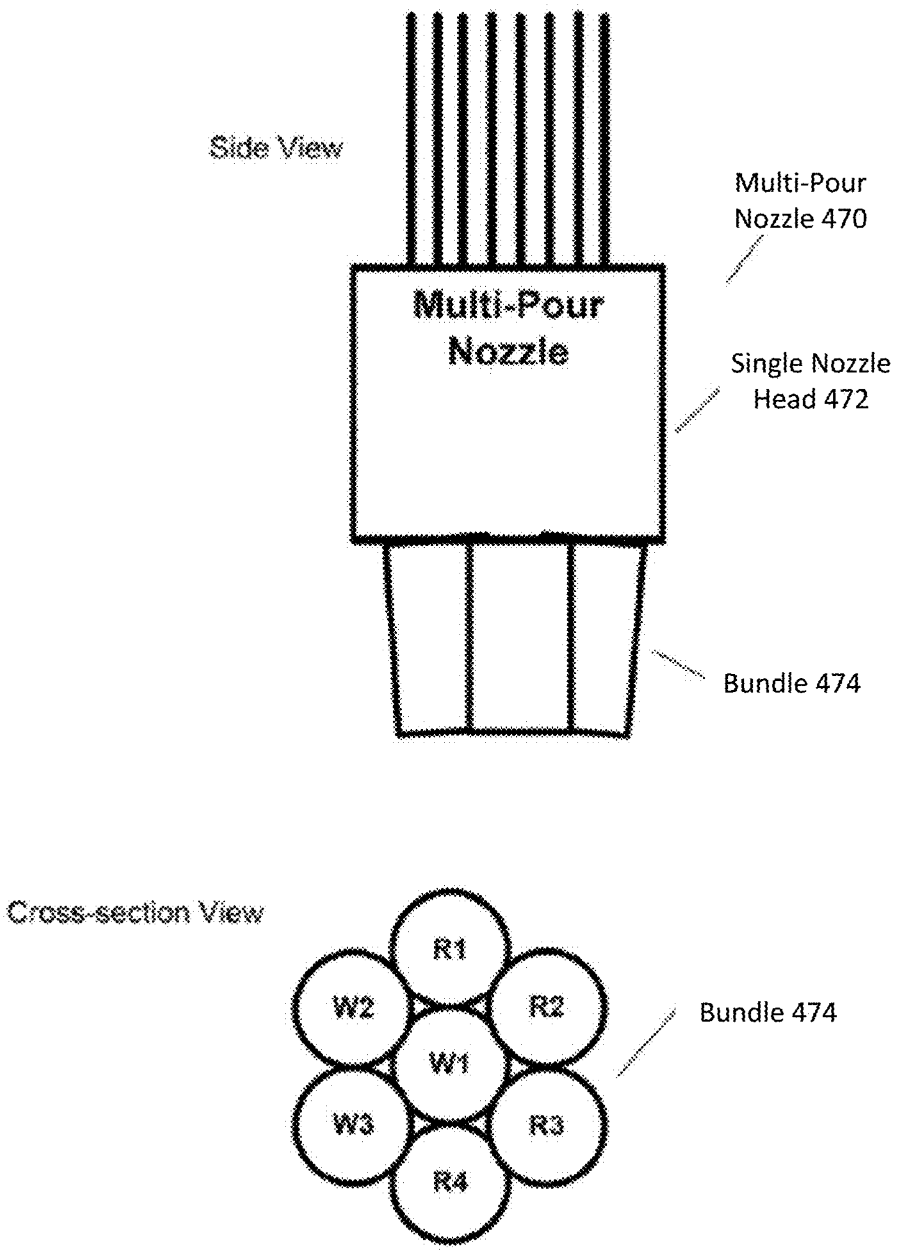
FIG. 4C is an illustrative diagram of a dispensing interface that includes a dispensing pour unit multi-pour nozzle element according to some embodiments.

Referring now to FIGS. 4A-4C, each of the various dispensing pour units that may be utilized in connection with the system 100 of FIG. 1 (such as any of the dispenser pour components 4*a* to 4-2 of FIG. 1), may comprise any apparatus, device or system suitable for dispensing beverages (e.g., wine), via pours into an appropriate container (e.g., a wine glass), when one of the dispensing functions of the system 100 is activated. For example, a dispensing pour unit may be a simple spout, a gun-type hand-operable manual dispenser (such as a dispensing pour unit 554 shown in FIG. 5B), or it may comprise a vertically elongated housing comprising an opening sized and configured to receive a wine glass therein, such that the ovine glass can be positioned beneath a pour element to ensure that the dispensed liquid enters, and remains entirely within, the wine glass during the dispensing process (such as example dispensing pour unit 400 of FIG. 4A).

Referring now to FIG. 4A, an example of a dispenser pour component (such as any of the dispenser pour components 4*a* to 4-2 of FIG. 1) is shown, in multiple views, as a dispensing pour unit 400. The dispensing pour unit 400 may be located, disposed, and/or otherwise positioned, in whole or in part in one of several dispensing pour unit ("DPU") regions A to C (as shown, by way of example only, in FIG. 4A), and which may include, but which are not limited to, one or more of the following:

A. Optional flow sensor (e.g., a flow meter) or equivalent means of sensing the quantity of liquid that has been dispensed in each metered pour. In some embodiments, the flow sensor may include an image capture device.

B. Digital images or video captured by the image capture device may be sent or stored for viewing by one or more users of the system 100 for quality control or security purposes. For example, a shift manager or owner of a restaurant may monitor a beverage dispensed or being dispensed by the dispensing interface of the system 100 to determine if the quality of the beverage is up to the standard of the restaurant. Furthermore, the shift manager or owner may determine if the quantity of wine dispensed by the system 100 when a member of the wait staff interacts with the graphical user interface of the local dispensing control system 158 and requests a glass of wine corresponds to the quantity set by the owner of the restaurant. If there is a discrepancy between the two, the system 100 may require calibration.

C. Pour/Dispense Activation (e.g., the manner in which the dispensing of the wine is initiated) may include one or more of the following:

1. Manual Control: manual control may be activated by the user after a glass is positioned within the dispensing pour unit 400 to cause the pressurized container 112 (that is coupled to the dispensing pour unit) to dispense a predefined quantity of product into the glass, which may include one or more of the following:

i. push button, switch, or equivalent manually operated control element.

ii. voice-based interface which may provide additional features such as the ability to select a specific product or mixture to be poured in dispensing pour unit embodiments in which plural dispensing conduits are connected to a single dispensing pour unit.

iii. remote control, having one, or both of the above types of controls activated implemented as an electromechanical device, or as a software application (for example, as an "App" in a mobile communication device).

2. Automatic Control: automatic control may include automatic actuation when the dispensing pour unit detects that a correct glass or container is properly placed and aligned in the dispenser bay (for example, before a glass of Pinot Noir is poured, the dispensing pour unit may need to detect that the proper wine glass is situated in the dispenser bay), enabling immediate dispensing of a predefined "pour amount" of the wine into the glass. The manner in which glass placement and positioning occur may be selected as a matter of design choice and may comprise:

i. Mechanical sensor-pressure sensor, sensing switch (e.g., roller ball switch, motion trip switch, or the like), or ii. Non-mechanical sensor-IR, ultrasonic, light-based, motion sensor, radio-frequency identification (RFID), near-field communication (NFC) or the like.

D. Available Pour Options identification-enabling identification for each dispensing pour unit, the corresponding "available to pour" product and, when applicable, available options (e.g., blended pours, carbonation, or the like), pour size control (e.g., for optionally dispensing different volume pours, such as smaller volume "tasting" pours), and may comprise, at each dispensing pour unit, an electronic display (optionally supplied with a graphical user interface), physical labels (or replaceable printed info card(s)), labeled buttons or other physical controls, or if the dispensing pour unit is operable to communicate therewith, via an App installed on a mobile device, or the like.

E. Glass Positioning/Alignment—may comprise structural and/or mechanical guides in the bottom portion of the dispenser bay to physically assist in guiding the glass or appropriate container into a proper position within the dispenser bay to receive product dispensed and/or may include visual cues to assist in positioning the glass or appropriate container, such as illustrative and/or color indicators. Optionally, sensor and/or electronic feedback features may also be included. These feedback features may include an indicator light and/or an audio tone that indicates when the glass or appropriate container is properly positioned. Additionally, a splash protection element (such as a flexible and optionally retractable flange or cover) may be provided to limit or substantially eliminate the possibility of the dispensing process causing the dispensed beverage to splash out of the glass or appropriate container.

F. Replaceable dispensing pour unit nozzles that may be utilized to enhance the product being dispensed (such as an aeration nozzle).

G. An optional light source operable to illuminate the glass or appropriate container into which the product is being dispensed during the dispensing process, such that the cessation of the illumination serves as an indicator that the dispensation has been completed (the completion of the dispensing process may also/alternately be indicated by other means, such as by an audio signal).

H. Authentication of the user identity biometrically (such as by a fingerprint sensor integrated into the pour control, or by facial or voice recognition, and/or by other ID verification means—e.g., an RFID card, or the like.), where the user may be an authorized establishment employee, or a customer pre-enrolled with an account in the biometric system that is permitted to self-dispense from a biometric verification enabled dispensing pour unit.

I. A multi-pour nozzle, such as multi-pour nozzle 470 shown in FIG. 4C, including a single nozzle "head" 472 comprising a bundle of multiple nozzle elements 474 disposed therein, to enable the dispensing pour unit (e.g., coupled to the valve 152) to dispense different beverages (for example, multiple wines selected from four different red wines R1 to R4, and three different white wines W1 to W3 of FIG. 1) from multiple corresponding beverage sources. In one example, each product source comprising a dispenser conduit, connected to a corresponding nozzle element in the bundle 474, and to a corresponding PSP system source, which, may include one of:

1. A multi-beverage single PSP system source(s) (e.g., different individual wine bags stored in the same PSP system pressurized canister), such as pressurized containers 444 and 446 shown in a multi-source dispensing arrangement 440 of FIG. 4B.

2. Multiple plural PSP system beverage sources (e.g., different individual wine bags each stored in a different pressurized container), such as a pressurized container 442 (and similar additional pressurized container (not shown) of FIG. 4B.

3. Any combination of a multi-beverage single PSP system source(s), and multiple plural PSP system beverage sources, such as the pressurized containers systems 442, 444, and 446 of FIG. 4B.

A multi-pour nozzle 470 may comprise any reasonable number of nozzle elements ranging from 2 to 9 or more.

J. Any dispensing pour unit that includes a multi pour nozzle (such as the multi-pour nozzle 470) may be equipped with "Blended Pour" functionality, enabling a wide range of wines to be blended during the dispensing process, each blended pour being configured in accordance with at least the following parameters (collectively comprising a corresponding "Blended Pour Profile"): (1) selection of number and types of wine to be blended, and (2) selection of pour volume of each wine to be blended, 1. The blended pour functionality may be implemented in dispensing pour units equipped with a multi-pour nozzle (see above). During blended pour operation, multiple selected nozzle elements are activated substantially simultaneously (e.g., to dispense each wine to be blended in accordance with a selected predetermined Blended Pour Profile), to enable beverage blends (such as wine varietal blends) to be instantaneously produced in the glass positioned in the dispenser bay of the dispensing pour unit.

2. Blended Pour Profiles may be changed periodically (e.g., nightly) by the operating establishment to reflect beverage menu items and/or specials. Blended Pour Profiles may also be custom configured by an authorized operator of a dispensing pour unit on a case by case basis, and/or by an end user (e.g., a customer), for example through a BMS system interface (e.g., 7, 7-1, 7-2 of FIG. 1) supplied by the operating establishment, or via an App installed on the customer's mobile data processing device (that may connect to the BMS control system 6), which may also provide Blended Pour Profile suggestions based on framed Bordeaux or other appellations, on various vintages and specific wines.

Figure 5A:
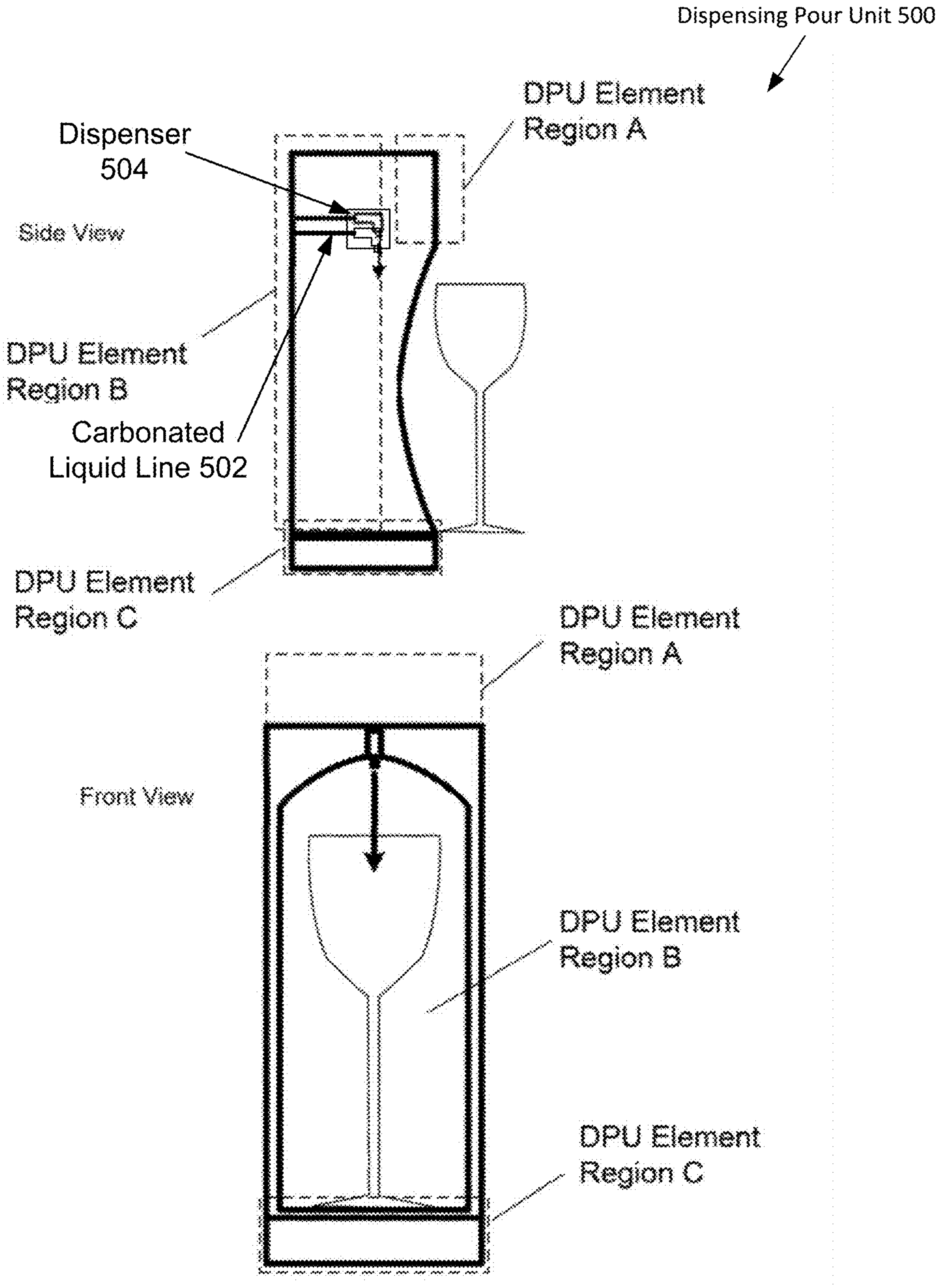
FIG. 5A is an illustrative diagram of a dispensing interface that includes a dispensing pour unit component that includes a carbonated liquid line according to some embodiments.
Figure 5B:
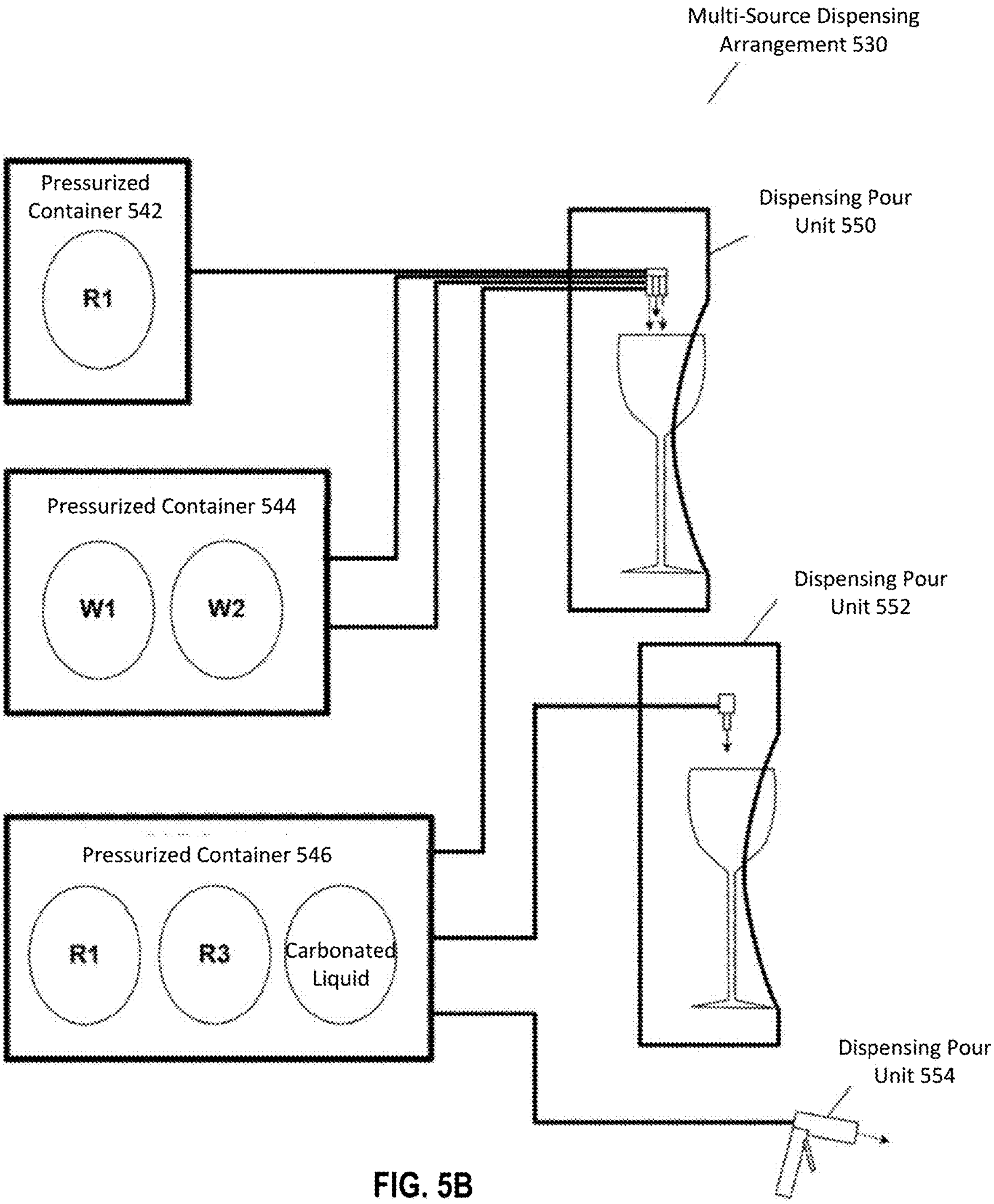
FIG. 5B is an illustrative diagram of a dispensing interface that includes multiple dispensing pour unit components and multiple beverage sources that includes a carbonated liquid line according to some embodiments.
Figure 5C:
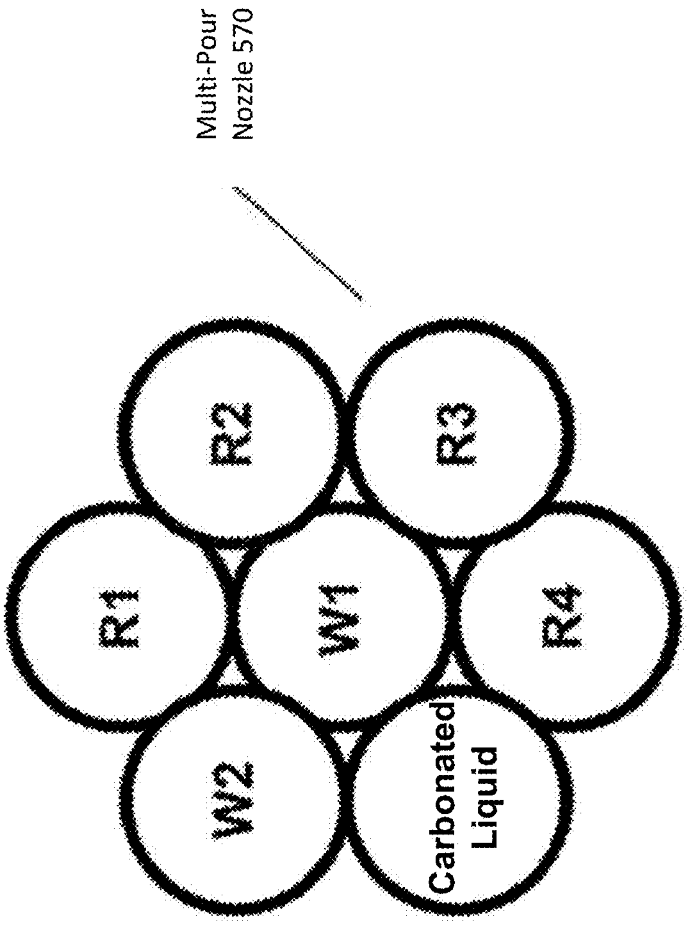
FIG. 5C is an illustrative diagram of a cross-section view of a dispensing interface that includes a multi-pour nozzle element according to some embodiments.

Referring now to FIGS. 5A-5C, each of the various dispensing pour units that may be, in various embodiments, utilized in connection with the system 100 of FIG. 1 (such as any of the dispenser pour components 4 a to 4-2 of FIG. 1), may comprise any apparatus, device or system suitable for dispensing liquids such as product (e.g., beverages wine) or other fluids (e.g., fertilizer, anti-weed solutions, detergents, anti-bug solutions, or the like). In one example where the system dispenses beverages, the system may dispense liquids via rapid metered pours, into an appropriate container (e.g., a wine glass). For example, a dispensing pour unit may be a simple spout, a gun-type hand-operable manual dispenser (such as a dispensing pour unit 554 shown in FIG. 5B), or it may comprise a vertically elongated housing comprising an opening sized and configured to receive a glass therein, such that the ovine glass can be positioned beneath a pour element to ensure that the dispensed liquid enters the glass during the dispensing process (such as dispensing pour unit 500 of FIG. 5A).

FIG. 5A is another illustrative diagram of an example embodiment of a dispensing pour unit component that includes a carbonated liquid line in some embodiments. The example of FIG. 5A may be similar to that of FIG. 4A. The example of FIG. 5A may, in some embodiments, be readily utilized as a subcomponent of the various systems of FIGS. 1-3C.

Referring now to FIG. 5A, an example embodiment of a dispenser pour component (such as any of the dispenser pour components 4 a to 4-2 of FIG. 1) is shown, in multiple views, as a dispensing pour unit 500. The dispensing pour unit 500 can be readily configured to comprise a variety of advantageous features and functions, that may be located, disposed, and/or otherwise positioned, in whole or in part in one of several dispensing pour unit ("DPU") regions A to C (as shown, by way of example, in FIG. 5A).

One difference between FIG. 5A and FIG. 4A, is that FIG. 5A includes a dispensing pour unit 500 with a carbonated liquid line 502 that runs along one or more liquid conduits to the dispenser or nozzle 504 (e.g., spigot and/or multi-spigot nozzle depicted in FIGS. 4C and 5C. The carbonated liquid line 502 may dispense carbonated water or any carbonated liquid. The carbonated water or any carbonated liquid may be dispensed by a multi-spigot nozzle, by a nozzle that is separate from another nozzle that dispenses a different beverage (e.g., to enable mixing as the two liquids pour from the nozzles into a glass or other container) or the like. It will be appreciated that there may be any number of nozzles, each dispensing any number of liquids and one capable of dispensing and/or dispensing the carbonated liquid. Each nozzle may include its own liquid conduit or tube that receives at least one beverage from the pressurized system discussed herein. In some embodiments, the carbonated liquid line 502 is coupled to a container containing carbonated water or other carbonated liquid that is inside the pressured system In some embodiments, the carbonated liquid line 502 is coupled to a container containing carbonated water or other carbonated liquid that is outside the pressured system (e.g., a liquid dispensed by at least one other nozzle may be stored in the pressured system and the carbonated liquid line 502 may receive carbonated liquid from a container outside the pressured system).

In some embodiments, the carbonated liquid line does not reach the dispenser or multi-spigot nozzle but rather adds carbonated liquid within a liquid transport conduit or other apparatus to enable mixing or combinations of liquid with the carbonated water prior to being dispensed by the nozzle(s).

In various embodiments, the carbonation module may dispense gas for carbonating a liquid stored in the pressure system (e.g., for creating carbonated beverages) as described herein. Additionally, the carbonated liquid line 502 may allow for a combination of a carbonated liquid with another liquid (e.g., for hard lemonade, soda, and/or the like). In some embodiments, the carbonation module may dispense a different gas for providing other types of beverages. For example, the carbonation module may dispense nitrogen gas for creating nitro-brews, or coffee infused with nitrogen gas. In another example, the carbonation module may dispense a pre-blended gas, "G-mix," or Guinness-mix which is composed of 75% nitrogen and 25% carbon dioxide.

Similar to the system of FIG. 4A, the system of FIG. 5A includes some or all of the properties of the dispensing pour unit 400, but are not limited to one or more of the following:

A. Available Pour Options identification-enabling identification for each dispensing pour unit, the corresponding "available to pour" wines and, when applicable, available options (e.g., blended pours, carbonation, or the like), pour size control (e.g., for optionally dispensing different volume pours, such as smaller volume "tasting" pours), and may comprise, at each dispensing pour unit, an electronic display (optionally supplied with a graphical user interface), physical labels (or replaceable printed info card(s)), labeled buttons or other physical controls, or if the dispensing pour unit is operable to communicate therewith, via an App installed on a mobile device, etc.

B. A multi-pour nozzle, such as multi-pour nozzle 470 shown in FIG. 4C, comprising a single nozzle "head" 472 comprising a bundle of multiple nozzle elements 474 disposed therein, to enable the dispensing pour unit to dispense different beverages (for example, multiple wines selected from four different red wines R1 to R4, two different white wines W1 to W2, and carbonated water) from multiple corresponding beverage sources. Each beverage source, including or not including the carbonated water source (or carbonated liquid source) may include a dispenser conduit, connected to a corresponding nozzle element in the bundle 474, and to a corresponding PSP system source, which, may comprise one of:

1. A multi-beverage single PSP system source(s) (e.g., different individual wine bags stored in the same PSP system pressurized canister), such as PSP systems 550 and 552 shown in a multi-source dispensing arrangement 530 of FIG. 4B,
2. Multiple plural PSP system beverage sources (e.g., different individual wine bags each stored in a different PSP system pressurized canister), such as a pressurized container 542 (and similar additional pressurized containers (not shown) of FIG. 5B, and
3. Any combination of single pressurized container(s), each with a single compressible liquid volume, and pressurized containers each with multiple compressible liquid volumes, such as the pressurized containers systems 542, 544, and 546 of the multi-source dispensing arrangement 530 of FIG. 5B.

FIG. 5B is another illustrative diagram of an example implementation of an arrangement of multiple dispensing pour unit components and multiple beverage sources that includes a carbonated liquid line in some embodiments. The example of FIG. 5B may be similar to that of FIG. 4B. The example of FIG. 5B may, in some embodiments, be readily utilized in the system of FIG. 1.

FIG. 5C is another illustrative diagram of an example dispensing pour unit multi-pour nozzle element that may be readily utilized as a subcomponent in the various dispensing pour unit embodiments of FIGS. 1, 4A, 4B, 5A, 5B, and 6. The example of FIG. 5C may be similar to that of FIG. 4C.

A multi-pour nozzle 570 as depicted in FIG. 5C may comprise any reasonable number of nozzle elements ranging from 2 or more. Any dispensing pour unit that comprises a multi-pour nozzle (such as the multi-pour nozzle 570) may be equipped with "Blended Pour" functionality, enabling a wide range of wines to be blended during the dispensing process, each blended pour being configured in accordance with at least the following parameters (collectively comprising a corresponding "Blended Pour Profile"): (1) selection of number and types of liquid(s) to be blended, and (2) selection of pour volume of each liquid to be blended:

A. The blended pour functionality may be implemented in dispensing pour units equipped with a multi-pour nozzle (see above). During blended pour operation, multiple selected nozzle elements are activated substantially simultaneously (e.g., to dispense each liquid to be blended in accordance with a selected predetermined Blended Pour Profile), to enable beverage blends (such as wine varietal blends) to be instantaneously produced in the glass positioned in the dispenser bay of the dispensing pour unit.

B. Blended Pour Profiles may be changed periodically (e.g., nightly) by the operating establishment, to reflect beverage menu items and/or specials. Blended Pour Profiles may also be custom configured by an authorized operator of a dispensing pour unit on a case-by-case basis, and/or by an end user (e.g., a customer), for example, through a BMS system interface (e.g., 7, 7-1, 7-2) supplied by the operating establishment, or via an App installed on the customer's mobile data processing device (that may connect to the BMS control system 6), which may also provide Blended Pour Profile suggestions (e.g., based on framed Bordeaux or other appellations, on various vintages and specific wines).

Figure 6:
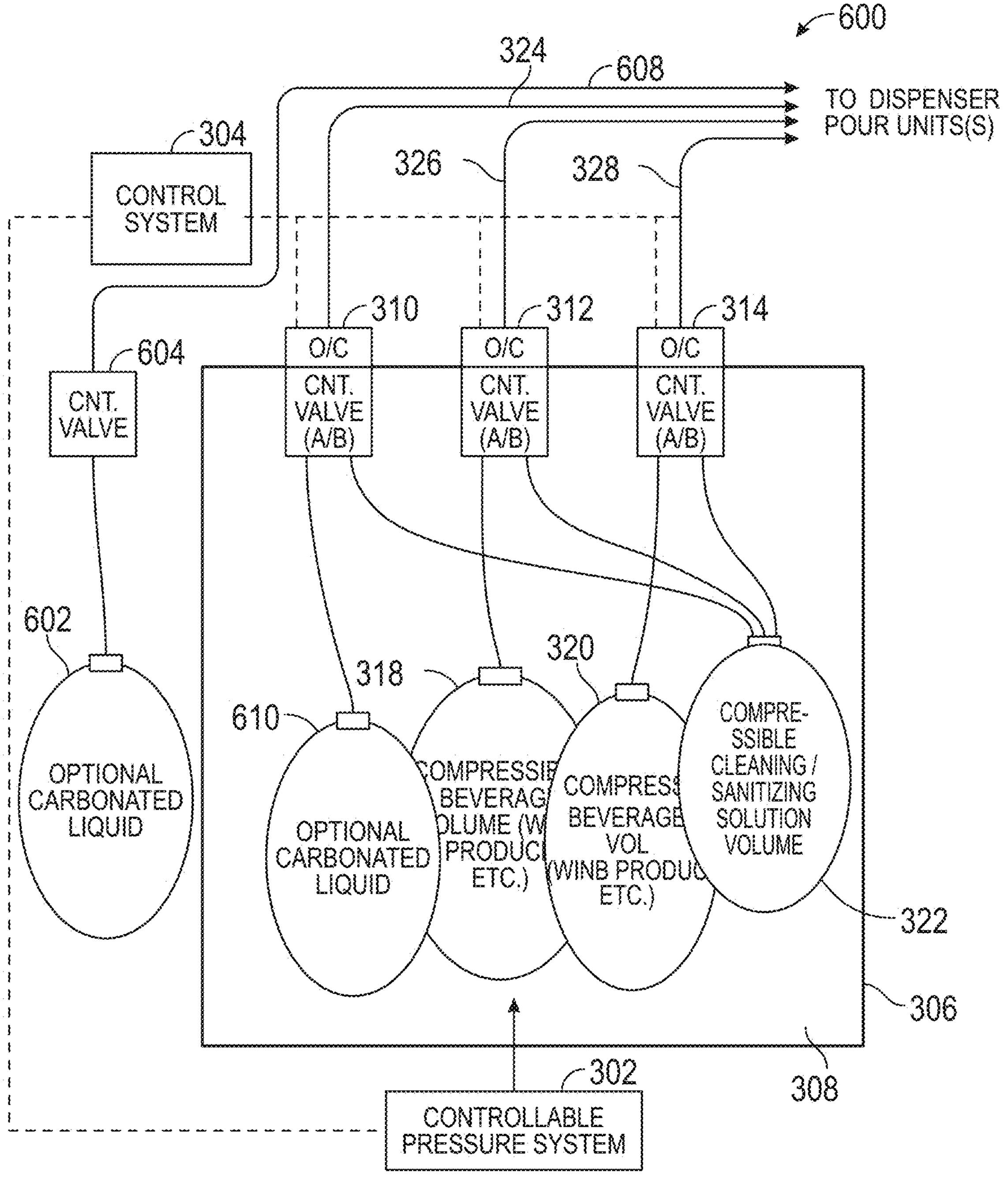
FIG. 6 is an illustrative diagram of a dispensing system capable of storing and dispensing beverages or food-like substances with an optional carbonated liquid according to some embodiments.

FIG. 6 is an illustrative diagram of an example system and method for storing and selectively dispensing beverages in some embodiments. The example of FIG. 6 may be similar to that of FIG. 3. The example of FIG. 6 may also be advantageously utilized as a component of the system and method for storing, preserving, managing, and selectively dispensing beverages of FIG. 1.

Referring now to FIG. 6, an example system and method for storing and selectively dispensing liquids, is shown as a Pressurized Liquid Storage and Dispensing ("PLSMPD") system 100. The PLSMPD system 600, is an alternate embodiment of the PLSMPD system 300 of FIG. 3 without a carbonator 330 and further including compressible container 610.

In various embodiments, the compressible container 602 may contain carbonated liquid. The compressible container 602 may be within the PLSMPD system. The controllable A/B Open/Close solenoid 604 may control flow of the carbonated liquid (e.g., carbonated water) from the compressible container 602. The control system 304 may control release of the carbonated liquid in a manner similar to the liquids in the other compressible liquid containers 610, 318, and 320. The compressible container 602 may or may not be a WinB product or any container (e.g., the compressible container 602 may be similar to the compressible liquid containers 610, 318, and 320).

It will be appreciated that the carbonated liquid may be stored in a separate container outside the pressurized system. In one example, the carbonated liquid may be stored in container 602 which is controlled by a separate control valve 604. Liquid conduit 608 may provide the carbonated liquid.

In some embodiments, the container 602 includes water that is coupled (e.g., via the liquid conduit 608) with a separate carbonator (e.g., such as carbonator 330) which may provide gas to create carbonated water. In some embodiments, carbonated water is stored separately (e.g., from the container 602 or a faucet), and the carbonator may be combined with any number of dispensing conduits to carbonate the liquid(s) stored in the compressible containers 610, 318, and 320.

Figure 7:
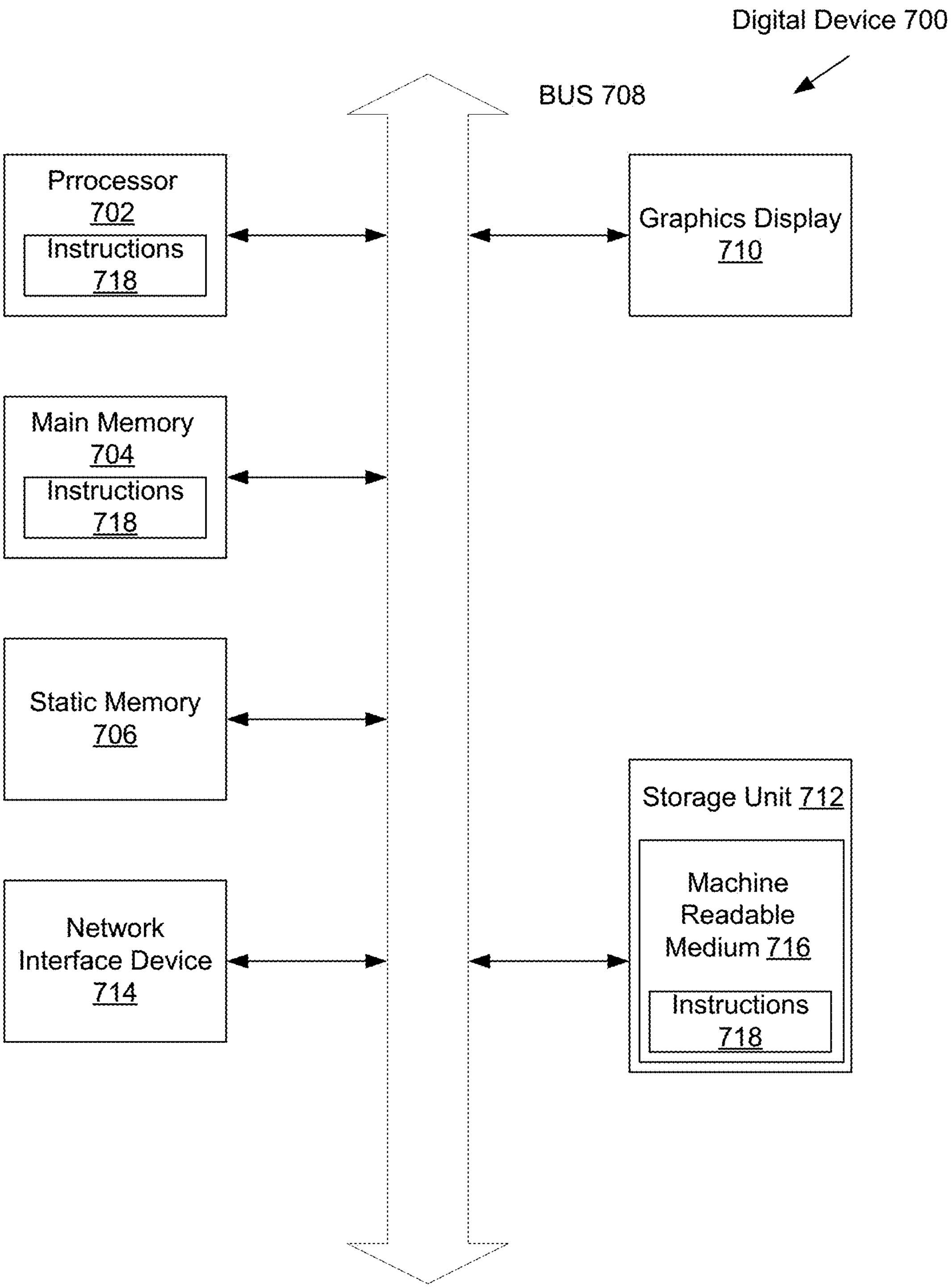
FIG. 7 is an example of a digital device in some embodiments.

FIG. 7 is a block diagram illustrating entities of an example digital device able to read instructions from a machine-readable medium and execute those instructions in a processor to provide control functions, provide interfaces, receive commands, and the like as discussed herein. Specifically, FIG. 7 shows a diagrammatic representation of a digital device in the example form of a digital device 700 within which instructions 724 (e.g., software) for causing the machine to perform any one or more of the methodologies discussed herein may be executed. In alternative embodiments, the machine operates as a standalone device or may be connected (e.g., networked) to other machines, for instance, via the Internet.

The digital device may include a processor and memory any may include a PIC, processor, raspberry PI, or the like.

The example digital device 700 includes a processor 702 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 704, and a static memory 706, which are configured to communicate with each other via a bus 708. The digital device 700 may further include a graphics display unit 710 (e.g., a plasma display panel (PDP), a liquid crystal display (LCD), a projector, or a cathode ray tube (CRT)). The digital device 700 may also include a data store 712 and a network interface device 714, which also are configured to communicate via the bus 708.

The data store 712 includes a machine-readable medium 716 on which is stored instructions 718 (e.g., software) embodying any one or more of the methodologies or functions described herein. The instructions 718 (e.g., software) may also reside, completely or at least partially, within the main memory 704 or within the processor 702 (e.g., within a processor's cache memory) during execution thereof by the digital device 700, the main memory 704 and the processor 702 also constituting machine-readable media. The instructions 718 (e.g., software) may be transmitted or received over a network (not shown) via optional network interface 714.

While machine-readable medium 716 is shown in an example embodiment to be a single medium, the term "machine-readable medium" should be taken to include a single medium or multiple media (e.g., a centralized or distributed database, or associated caches and servers) able to store instructions (e.g., instructions 718). The term "machine-readable medium" shall also be taken to include any medium that is capable of storing instructions (e.g., instructions 718) for execution by the digital device and that cause the machine to perform any one or more of the methodologies disclosed herein. The term "machine-readable medium" includes, but should not be limited to, data repositories in the form of solid-state memories, optical media, and magnetic media.

Figure 8:
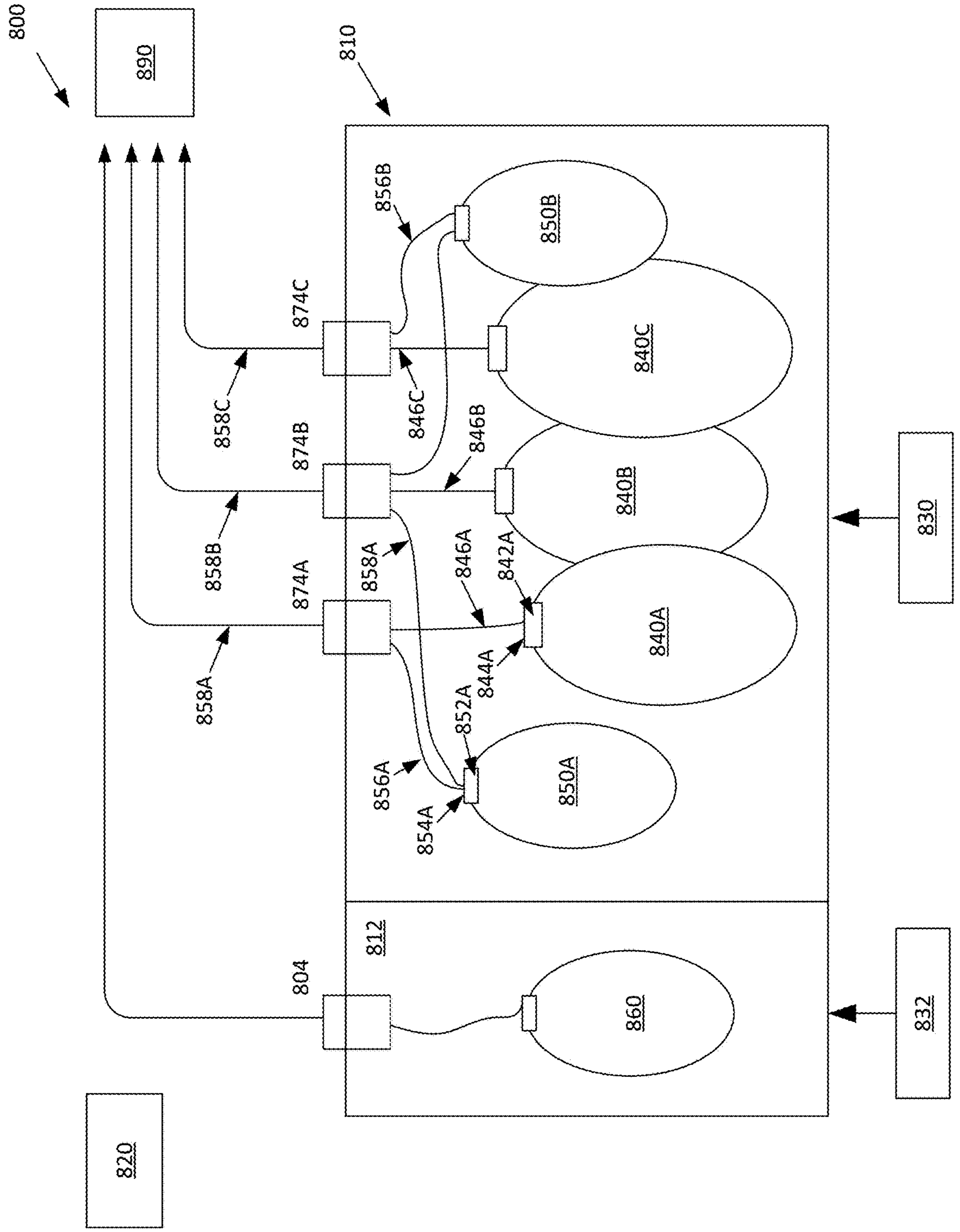
FIG. 8 is an illustrative diagram of a system capable of storing and selectively dispensing beverages or food-like substances with multiple pressurized canisters according to some embodiments.

FIG. 8 is an illustrative diagram of a system and method selectively dispensing beverages and solenoid control in some embodiments. The example of FIG. 6 may be similar to that of FIG. 3. The example of FIG. 6 may also be advantageously utilized as a component of the system and method for storing, preserving, managing, and selectively dispensing beverages of FIG. 1.

Within the pressurized container (e.g., pressurized container 810), there may be any number of compressible, beverage containers (e.g., compressible containers 840*a*, 840*b*, and 840*c*). Each of the compressible containers may contain a beverage such as wine, alcohol, and the like.

In various embodiments, one or more of the compressible containers may contain mixers, components of beverages, non-alcoholic beverages, and the like such as coffee, juice, cream, ice cream (e.g., soft serve), whipped cream, and the like. Further, in various embodiments, one or more compressible containers may contain flavorings to add to beverages and mixed drinks. Flavorings may include, for example, syrups, fruit juice (e.g., lime), creams, sauces, and the like. In some embodiments, compressible containers containing flavorings may be smaller (and contain less produce) than other compressible containers containing beverages that typically serve as a majority of a served beverage. In some embodiments, a compressible container may contain a syrup that may be combined with water, carbonated water, or other fluid to create a drink such as soda, beer, or the like.

It will be appreciated that all or part of the pressured container may include portions that are temperature controlled. For example, one or more portions of a pressured container may be chilled. In some embodiments, the entire pressured container is maintained at a single temperature. In other embodiments, different portions of the pressured container are maintained at different temperatures. For example, the internal portion of a pressured container may be divided by dividers (e.g., metal flanges) that separate one or more compressible containers from each other. Each of the divided portions of the pressured container may be temperature controlled. In one example, each of the divided portions may include a coil of a coolant (e.g., moving cold water, freon, or the like) or cold plate that may be adjusted by a temperature control. One or more of the divided portions of the pressured container may be heated or maintained at a particular heat.

A temperature control module may allow for a user to control heat or cold of any number of divided portions of the pressured container. In various embodiments, an application on a smart phone may communicate with the temperature control module to wirelessly control the temperature of any number of the divided portions of the pressured container. In various embodiments, the application on the smartphone may communicate with the temperature control module via WiFi, Bluetooth, Zigbee, or any other protocol/technique. The application may indicate a number of controllable portions of the pressured container and provide controls (e.g., control signals) to control temperature for any number of the controllable portions. In some embodiments, the user may group controllable portions together such that a single command may change the temperature for the group. The application and/or temperature control module may also allow the user to create labels or other information to identify the beverages, foods, flavorings, and the like that may be within (e.g., each contained within a separate compressible container) a section or portion of the pressured container.

In some embodiments, flavorings may be within a temperature-controlled portion of the pressured container or outside a temperature-controlled portion of the pressured container. In some embodiments, there may be a portion of the pressured container that is not temperature controlled.

Each of the compressible containers may be coupled to a different conduit. The conduit may be coupled to each of the compressible containers using a releasable coupler (e.g., releasable coupling 854*a* may be connected to a conduit). The releasable coupling may allow for the compressible container to be joined to the conduit and removed from the conduit. The releasable coupler may interface with the compressible container such that the compressible container is not damaged, does not leak when coupled, does not leak after being decoupled, and may be reused (e.g., refilled with a beverage, additive, beverage component, or food-like substance). In some embodiments, because the releasable coupler does not damage the compressible container, a compressible container may be joined to a first releasable coupler and subsequently decoupled, then coupled to a different releasable coupler connected to a different conduit within the same pressurized container for continued use.

In some embodiments, each compressible container 840*a*, 840*b*, and 840*c* may include a locking mechanism that is configured to couple with the releasable coupler. The locking mechanism may interact with the releasable coupler to enable the contents of the compressible container to enter the connected conduit. Before the releasable coupler is jointed to the compressible container's locking mechanism, the locking mechanism may keep the compressible container sealed (e.g., hermetically sealed). In some embodiments, the process of joining the releasable coupler to the locking mechanism opens the locking mechanism and the distribution of the contents of the compressible container may be controlled by the pressurized environment of the pressurized container or the valve (e.g., solenoid valve).

In some embodiments, there releasable coupler may include a mechanical flange or an actuator that forces the locking mechanism into an open state. In some embodiments, the locking mechanism may include the mechanical flange or actuator. In various embodiments, the process of coupling the releasable coupler to the locking mechanism opens the locking mechanism. The process of opening the locking mechanism may be manual or automated (e.g., opening the locking mechanism is in response to an electronic signal).

In various embodiments, the mechanical flange or an actuator may be actuated (e.g., manually or electronically) to close the locking mechanism. In various embodiments, the process of decoupling the releasable coupler from the locking mechanism closes the locking mechanism.

Each conduit may be coupled to a pressurized container interface (e.g., pressured container interfaces) and may extend through the pressurized container or be coupled to another conduit on the outside of the pressurized container.

Each conduit may be coupled to at least one solenoid valve (a "solenoid"). A solenoid valve is an electrically controlled valve. It will be appreciated that a conduit may be coupled to any valve (e.g., electrically controlled or not electrically controlled) that opens and closes. When the valve is open and the pressurized container is applying pressure to the interior of the pressurized container, a compressible container 118 coupled to the open conduit may dispense the beverage contained therein through the valve (or solenoid) to enable mixing and/or dispensing of drinks (assuming the locking mechanism on the connected compressible container is open).

The valve that is coupled to a conduit may be within the pressurized environment of the pressurized container, on the outside of the pressurized container, or at an interface between the interior of the pressurized container 810 the exterior of the pressurized container.

In various embodiments, two or more conduits (each being coupled to a different compressible container) may be coupled to a single (solenoid) valve. A solenoid valve, for example, may have three more connections (e.g., two or more input connections and one output connection). In one example, a three-way solenoid valve may be coupled to two different conduits for receiving fluids from different compressible containers. The three-way solenoid valve may also be coupled to an output port coupled to a conduit (e.g., a dispensing conduit) for dispensing and/or mixing beverages, flavorings, components, and/or food-like substances. A solenoid valve may include any number of input ports (e.g., for any number of conduits from compressible containers) and any number of output ports.

Referring now to FIG. 8, the Pressurized Liquid Storage and Dispensing ("PLSMPD") system 800 is an alternate embodiment of the PLSMPD system 100 of FIG. 2. The PLSMPD system 800 includes pressurized containers 810 and 812, a control system 820, controllable pressure systems 830 and 832, and dispensing pour units 890. In some embodiments, the pressurized container 810 includes compressible containers 840A, 840B, and 840C (individually, collectively, the compressible container 830). In some embodiments, the compressible container 840 contains liquids or beverages such as wine, concentrated caffeinated beverages such as soda or coffee, hard lemonade, soft serve and/or the like. In various embodiments, the compressible container 840 contains carbonated liquid. In some embodiments, one or more of the compressible containers 840 may be filled with beverage or food items such as custard, yogurt, ice cream, soft-serve, and the like.

In some embodiments, the pressurized container 810 includes compressible containers 850A and 850B (individually, collectively compressible container 850). The compressible container 850 may be capable of containing liquids that provide added flavors to various beverages. In some embodiments, each of the compressible containers 850A and 850B may contain chocolate flavoring, sugar syrup, fruit syrups, or coffee syrup for various types of beverages or food items. In one example, the compressible containers 850 may contain syrups or sauces for soft serve or other foods. The compressible container 840 may be larger than the compressible container 850. In some embodiments, the compressible container 850 may contain, or be filled with water, detergent, or a cleaning solution to clean or sanitize one or more conduits of the pressurized container 810. For example, if the compressible container 850A contains the cleaning solution, it may be capable of cleaning and sanitizing conduits 858A and 858B.

In some embodiments, the pressurized canister/cartridge 812 includes compressible container 860. In some embodiments, the compressible container 860 contains liquids or beverages such as wine, concentrated caffeinated beverages such as soda or coffee, hard lemonade, soft serve, and/or the like. In various embodiments, the compressible container 860 contains carbonated liquid.

In some embodiments, the pressurized container 810 includes compressible containers 850A and 850B (individually, collectively compressible container 850). The compressible container 850 may be capable of containing liquids that provide added flavors to various beverages. In some embodiments, each of the compressible containers 850A and 850B may contain chocolate flavoring, sugar syrup, fruit syrups, or coffee syrup for various types of beverages. In one example, the compressible containers 850 may contain syrups or sauces for soft serve or other foods. The compressible container 840 may be larger than the compressible container 850. In some embodiments, the compressible container 850 may contain, or be filled with water, detergent, or a cleaning solution to clean or sanitize conduits 854 and 858 of the pressurized container 810. For example, if the compressible container 850A contains the cleaning solution, it will be capable of cleaning and sanitizing conduits 854A, 856B, 858A, and 858B.

In some embodiments, the pressurized canister/cartridge 812 includes compressible container 860. In some embodiments, the compressible container 860 contains liquids or beverages such as wine, concentrated caffeinated beverages such as soda or coffee, hard lemonade, soft serve, and/or the like. In various embodiments, the compressible container 860 contains carbonated liquid.

Each of the compressible containers 840 and 850 may include a volume interface (e.g., locking mechanism) for accessing the liquid stored therein, configured for a sealed/airtight connection to a releasable coupling that, in turn, couples their corresponding connects the compressible container to a conduit. For example, the compressible container 850A includes a volume interface 852A (e.g., a nozzle or equivalent) for accessing the liquid stored therein, configured for a sealed/airtight connection to a releasable coupling 854A, that in turn couples the compressible container 840A to a conduit 846A. The conduit 846A may couple the compressible container 840A to a controllable A/B Open/Close solenoid 874A.

In some embodiments, one or more of the compressible containers contains, or is capable of containing, a cleaning solution operable for cleaning and sanitizing the conduits of the pressurized canister/cartridge. For example, the compressible container 850A may be filled with a cleaning solution operable for cleaning and sanitizing one or conduits of the pressurized container 810. The compressible container 850A may comprise a controllable 1-way diverter valve and be positioned in-line in conduit 856A. Furthermore, the conduit 856A of the compressible container 850A may be coupled to a 3-way solenoid. The 3-way solenoid valve, such as the solenoid 874A, may allow the water, detergent, or other cleaning solution to traverse from the compressible container 850A through conduit 856A to the conduit 846A of the compressible container 840A. In some embodiments, the 3-way solenoid valve may allow the cleaning solution to clean or sanitize the conduit 858A.

The PLSMPD system 800 operation may result in the cleaning solution from the compressible cleaning solution volume in the compressible container 850A passes through the same conduits, valves, and related components as the main liquid being dispensed therethrough, thus ensuring that the PLSMPD system 800 remains clean and hygienic. The protocol for activation of the cleaning function can be configured and issued by the control system 820 and can occur automatically in accordance with a predefined schedule and/or automatically after a certain number of dispensing cycles and can also be activated manually.

In various embodiments, a compressible container within a pressurized environment or a container outside the pressurized environment may contain the cleaning solution. In some embodiments, a compressible container contained within a pressurized environment may be coupled with and share any number of conduits coupled to other compressible containers. For example, a valve (e.g., solenoid) may be coupled to a vessel containing the cleaning solution as well as a compressible container containing a beverage, additive, component, or food-like substance. The valve may be controlled to occasionally open for the cleaning solution to distribute from the cleaning solution vessel (e.g., a compressible container or a container outside the pressurized environment) to the conduit and nozzle for cleaning. If the cleaning solution is within a vessel outside the pressurized environment, the cleaning solution may be pumped.

The conduit 846 may be composed of plastic (and related materials—e.g., polymers, etc.) or from a suitable metal. The diameter of the conduit for each of the compressible containers 840 and 850 may differ depending on the type of liquid stored therein. For example, if the compressible container 850B contains a sugar syrup, the diameter of a conduit 856B may be greater than the compressible container 850A, which contains a coffee syrup since, on average, sugar syrup is used more often or in greater quantities than the coffee syrup.

In some embodiments, the releasable coupling 844A or the releasable coupling 854A includes a mechanical flange or an actuator that forces the locking mechanism into an open state. In some embodiments, the locking mechanism may include the mechanical flange or actuator. The process of coupling the releasable coupler to the locking mechanism may open the locking mechanism. The process of opening the locking mechanism may be manual or automated (e.g., opening the locking mechanism is in response to an electronic signal). In various embodiments, the mechanical flange or an actuator may be actuated (e.g., manually or electronically) to close the locking mechanism. In various embodiments, the process of decoupling the releasable coupler from the locking mechanism closes the locking mechanism.

The solenoid 874 may be coupled to a dispensing controller (which may range from a solid-state electronic control to a computerized system operable to independently control multiple solenoid valves). The solenoid 874 may be controllable by a mobile device with a corresponding software application comprising a graphical user interface installed thereon. The software application may receive a request from a user of the mobile device to dispense a particular drink. The software application may send a digital signal to the solenoid 874 to selectively open or close a pathway between the compressible container 840 and the dispensing pour units 890. Conduits 858A, 858B, and 858C may couple the solenoid 874A, 874B, and 874C to the dispensing unit 890, respectively.

In some embodiments, a software application may send a digital signal to the solenoid 874 to selectively open or close a pathway between the compressible container 840 and the dispensing pour units 890. Conduits 858A, 858B, and 858C may couple the solenoid 874A, 874B, and 874C to the dispensing unit 890, respectively. The software application may be a part of the beverage management system (BMS) and/or on a remote digital device such as a smartphone, table, or the like.

The size of the solenoid valve may be different for different conduit(s). For example, if the compressible container 850B contains cream, the size of the solenoid coupled to the compressible container 850B (e.g., via a larger diameter conduit) may be larger to accommodate the fats and viscosity of the cream to assist in dispensing or mixing.

In some embodiments, the dispensing pour units 890 has some or all of the components of the dispensing pour units of FIG. 4A through 4C and FIG. 5A through 5C.

In some embodiments, each of the multiple compressible containers 840A, 840B, and 840C are coupled to solenoids 874A, 874B, and 874C via conduits 846A, 846B, and 846C, respectively. In various embodiments, one or more compressible containers may be coupled to more than one solenoid. In some embodiments, each of the multiple compressible containers 850A and 850B are coupled to only one of the solenoids 874A, 874B, and 874C. In some embodiments, each of the multiple compressible containers 850A and 850B are coupled to more than one of the solenoids 874A, 874B, and 874C. For example, the compressible container 850A is coupled to the solenoids 874A and 874B via conduits 856A and 858A, respectively.

In various embodiments, the pressurized container 810 is coupled to the controllable pressure system 830, while the pressurized canister/cartridge 812 is coupled to the controllable pressure system 832. The controllable pressure systems 830 and 832 are selected and configured to provide direct pressurization to the compressible container stored therein to generate and maintain the pressurized environment within the necessary/desired parameters.

Each of the controllable pressure systems 830 and 832 may be controllable by a mobile device with a corresponding software application comprising a graphical user interface installed thereon. The software application may be a part of the beverage management system (BMS) and/or on a remote digital device such as a smartphone, table, or the like.

The software application may receive a request from a user of the mobile device to dispense a particular drink. The software application may send a digital signal to each of the controllable pressure systems 830 and 832 to briefly increase the level of pressure in a pressurized environment within the pressurized containers 810 and 812 for all or a portion of the duration of a dispensing period to provide additional force and velocity to the liquid being expelled from the compressible container stored within the pressurized containers 810 and 812.

In some embodiments, each different beverage may be associated with a different dispensing profile (e.g., a beverage profile associated with a particular beverage). A dispensing profile may be a set of instructions for distribution of the wine, liquids, fluids, soft serve, chemicals, food-like substances, or the like (i.e., contents of one or more compressible containers within the airtight environment).

For example, a software application may include a command to serve a glass of wine. A control system may retrieve a dispensing profile based on the user's selection of beverage using the software application. The dispensing profile may identify a valve associated with a specific compressible container housing the wine, instructions to apply pressure to the pressurized environment through the pressure system, instructions to open the relevant solenoid coupled to the relevant conduit for a duration of time, and instructions to close the relevant solenoid when the distribution is complete. Although referred to as a "dispensing profile," the dispensing profile may also provide instructions for serving other liquids or foot-like substances (e.g., wine, liquids, fluids, soft serve, chemicals, food-like substances, or the like).

The dispensing profile may include instructions to apply a particular amount of pressure to the pressurized environment with enough pressure to expel the wine from the compressible container at the desired force and velocity. The amount of pressure may be based on the viscosity of the contents of the compressible container (e.g., based on the viscosity of beverage, flavoring, component, or food-like substance) being distributed as well as the size (e.g., diameter) of the conduits, interfaces, and/or releasable couplings in the flow path to dispensing or mixing. In some embodiments, particular amount of pressure may also be based on the amount of beverage or food to be served.

When a user indicates a particular beverage or food in an interface (e.g., either a local interface or an interface generated by smartphone or other mobile device), the control system may retrieve a dispensing profile related to the selection from a plurality of dispensing profiles. The control system may, using the dispensing profile, control pressure and/or solenoid valves to dispense a controlled amount of one or more different fluids or foods from any number of different compressible containers (e.g., compressible volumes). For example, if a user selects a particular coffee beverage, the control system may, using the dispensing profile, control the solenoid(s) and pressure to dispense a predetermined amount of coffee from one compressible container and predetermined amount of cream from a second compressible container. The two fluids may be mixed in a cup during dispensing (e.g., using a combination of different nozzles), within a venturi, and/or a mixing vessel.

The dispensing profile may include instructions to open a valve (e.g., a solenoid) for a particular time (i.e., a predetermined time). The amount of time may be based on the viscosity of the contents of the compressible container (e.g., the wine, liquids, fluids, soft serve, chemicals, food-like substances, or the like within the compressible container). The amount of time may also be based on size (e.g., diameter) of the conduits, interfaces, and/or releasable couplings in the flow path to dispensing or mixing. In some embodiments, the viscosity of the compressible container contents, the diameter of the flow path, and time that the valve is open may determine the amount of product (e.g., contents) that is dispensed.

In some embodiments, the dispensing profile may include different durations of time or a function of a duration of time based on the pressure to be applied within the pressurized environment (e.g., the pressure of which may also be defined by how full the compressible containers are within the pressurized container. For example, to dispense 5 ounces of a liquid from a ⅜-inch liquid transport conduit coupled to a controllable valve with a pressure of 25 pounds per square inch (psi), the controllable valve may be opened for 0.5 seconds. In some embodiments, the volume to be dispensed (e.g., the function) is calculated based on the pressure rating of the solenoid, the period of time that the solenoid is open, and the diameter of the liquid transport conduit. In some embodiments, the dispensing profile may also include instructions for a particular amount of pressure may also be based on the amount of beverage or food to be served.

As discussed herein, the dispensing profile may also include instructions to open and close one or more solenoid valves, as well as the amount of time that one or more ports of the solenoid valve should be open. The amount of time may be based on the viscosity of the beverage, flavoring, component, or food-like substance being distributed as well as the size (e.g., diameter) of the conduits, interfaces, and releasable couplings in the flow path to dispensing or mixing. The particular amount of pressure may also be based on the amount of beverage or food to be served. In some embodiments, the per-ounce pour is calculated based on the pressure rating of the solenoid, the period of time the solenoid is open, and the diameter of the liquid transport conduit.

Dispensing profiles may be created based on drink mixtures including quantities of different beverages and mixtures (e.g., components and flavorings). A dispensing profile may include instructions related to a variety of different mixtures for different sized pours (e.g., for different sized glasses). Dispensing profile may include a variety of different instructions for different amounts to be dispensed. In one example, a server may identify a particular beverage and a particular size. The control system may retrieve the dispensing profile associated with the particular beverage (from a plurality of dispensing profiles associated with other beverages) and the control system may select instructions associated with the particular size (e.g., amount of beverage to dispense). The predetermined time to keep a particular valve open may be longer for larger beverages than the predetermined time to keep a particular valve open for smaller beverages. In some embodiments, there may be different dispensing profiles for each different beverage and each different beverage size.

The dispensing profile may also include instructions for mixed drinks (e.g., drinks with different combinations of beverages, flavorings, components, and food-like substances). In one example, a user may actuate a selection using the software application (e.g., either remotely or as a part of the remote software application). The selection may trigger a processor to retrieve the dispensing profile associated with the selection. The dispensing profile may trigger pressure for one or more pressurized environments to apply pressure to two or more different compressible containers. The dispensing profile may trigger the application of pressure in a series or simultaneously. The dispensing profile may also control a solenoid valve to open to distribute the two or more beverages, flavorings, components, and food-like substances. In some embodiments, the dispensing profile may also control two or more solenoid valves to open to distribute the two or more beverages, flavorings, components, and food-like substances.

When the dispensing profile controls two or more solenoid valves to open, the dispensing profile may open each solenoid valve for a different duration of time (e.g., a different predetermined period of time). For example, an amount of flavoring may be different than the amount of a particular component that makes up the bulk of the drink. Since the amount of fluid of one component of the drink may be different than the amount of fluid for a flavoring for the same drink, the amount of time for each solenoid valve to be open may be different. In some embodiments, a control system, based on the relevant dispensing profile, may open two or more valves simultaneously (or near simultaneously) so that they dispense or transport different ingredients. The control system may close any of the valves before closing any of the other valves depending on the instructions from the dispensing profile.

A dispensing profile may also include instructions on the amount quantity to be dispensed. In some embodiments, the dispensing profile may include instructions regarding an amount of pressure and/or duration of time for solenoid control (e.g., open or closing of the solenoid). The pressure may be based in part on viscosity of a component and optionally based on conduit diameter. In some embodiments, the duration of time for solenoid control may be based on conduit diameter, size of solenoid, and/or viscosity of beverage, flavoring, or component being dispensed. In some embodiments, a recipe may have a series of different pressures applied serially as well as different solenoid control duration to enable serial or parallel dispensing of fluids for one or more beverages (e.g., mixed drinks).

For example, if a user selects a bloody mary, the system may retrieve a dispensing profile associated with a bloody mary. The dispensing profile may include instructions to open valves associated with different compressible containers dispense tomato juice, vodka, Worcestershire sauce, and Tabasco (and optionally horseradish).

In some embodiments, the dispensing profile may include instructions to apply the same pressure to distribute the components. In some embodiments, the dispensing profile may include different pressures supplied by the controllable pressure system to the pressurized container for the different components of the drink based on the ingredients (e.g., based on viscosity and diameter of the relevant conduits for dispensing). Further, the dispensing profile may include instructions to apply pressure for different durations of time depending on the different components of the drink based on the viscosity and diameter of the relevant conduits. Moreover, the dispensing profile may include different instructions to open and close different solenoid valves for different amounts of time-based on the amount of the component to be mixed or distributed (e.g., two cups of tomato juice, 2 teaspoons of Worcestershire sauce, and ½ teaspoon of Tabasco). The amount of time to open and close the relevant solenoid valves may also depend on the viscosity of the component being served, size of solenoid valve, size of conduit, amount of pressure, and the like.

In one example, a dispensing profile for a drink including coffee and cream may include instructions to control a first pressure (e.g., a certain amount of pressure) of the pressurized container for a first duration of time for serving the coffee as well as instructions to open a solenoid for a second duration of time to dispense the coffee. The same dispensing profile may include instructions to control a second pressure (e.g., a certain amount of pressure) of the pressurized container for a third duration of time for serving the cream as well as instructions to open a different solenoid for a fourth duration of time to dispense the cream. The amount of pressure applied to serve the coffee may be different than the amount of pressure to serve the cream (e.g., based on viscosity of the beverage and/or beverage component as well as diameter of the connected conduit). Similarly, the length of duration of time to open the different solenoids may be different (e.g., based on size of the solenoid and/or viscosity of the beverage or beverage component given the applied pressure). The dispensed beverage(s) and/or beverage components may be mixed in the cup/glass (e.g., by a single valve or multiple valves), within a venturi in the conduit(s), and/or in a mixing vessel which may dispense to the cup/glass after being mixed.

In some embodiments, the dispensing profile may further trigger mixing of the different beverages, flavorings, components, and food-like substances.

In some embodiments, the solenoid valve or conduit may include a measurement device to measure the amount of fluid that is passing through, thereby allowing confirmation of the accuracy of measurement or controlling the amount of component/beverage being delivered (e.g., to a dispensing unit or nozzle). There may be a different dispensing profile for different size glasses or different size servings. The system may keep open a valve until the amount of beverage/component reaches a size amount identified in the dispensing profile (e.g., based on measurement with the measurement device and/or expected flow).

The utilization of the controllable pressure systems 830 and 832 by the PLSMPD system may manage the pressurized environment in the pressurized container within desired parameters (especially as the compressible containers are depleted during PLSMPD system 800 operations) and may support the deployment and utilization of the above-described dispensing profiles by one or more dispensing systems.

In some embodiments, the controllable pressure systems 830 and 832 may be controlled by a mobile device with a corresponding software application including a graphical user interface. The software application may receive a request from a user of the mobile device to dispense a particular drink. The software application may send a digital signal to the controllable pressure systems 830 and 832 to manage the pressurized environment to dispense liquid from the corresponding pressurized canister/cartridge.

The control system 820 may control various aspects of the PLSMPD system 800. In some embodiments, the control system 820 controls various aspects of the PLSMPD system 800 (e.g., using the dispensing profile(s)), such as the amount of pressure applied to the pressurized container/cartridge, temperature, dispensing profiles, user profiles, solenoid valves, and dispense pour units.

When a user places a compressible container (such as WinB products) into the pressurized container 810, the user may provide the control system with information to identify contents of the compressible container. For example, the user may select an ingredient from a particular list of ingredients to indicate the contents of the new compressible container. In some embodiments, the user may scan a barcode, QR code, RFID code, and/or the like and provide a code identifier to the control system. The control system may identify the contents of the compressible container based on the provided code identifier. In some embodiments, the control system may identify one or more conduits and/or one or more valves that are coupled (or to be coupled) to the particular compressible container.

The control system may modify any number of dispensing profiles based on the contents of the new compressible container. For example, a bloody mary dispensing profile may be linked or associated with the new compressible container and the valve coupled to the flow path of the contents of the compressible container. As such, the control system may adjust instructions to the dispensing profile to identify the relevant valve and/or recalculate any predetermined times to keep the valve open based on the diameter of the conduits (and other components) in the flow path between the compressible container and the dispensing system (e.g., nozzles to dispense the product).

In some embodiments, a user may provide properties of the contents of the compressible container to the control system 820. Properties may include, for example, the type of compressible container contents (e.g., red wine, white wine, coffee, soft serve, or the like), and/or a viscosity of the beverage/liquid. Based on the properties, the control system may generate a new dispensing profile or may adjust any existing dispensing profiles based on the new information and the user of ingredients associated with the information provided by the user. In some embodiments, the user may provide temperature constraints of content to be served (for example, soft serve may need to be kept below a certain temperature).

In some embodiments, the control system 820 may include pre-defined recipes for beverages and food items. Each pre-defined recipe may specify an amount of each of the ingredients of the beverage or food item. In some embodiments, each pre-defined recipe may specific an order with which to add or mix the ingredients. The control system 820 may utilize the pre-defined recipe to determine parameters (e.g., to be included in a dispensing profile) such as a period of time to keep a valve associated with a compressible container containing the ingredient open. The control system 820 may determine the period of time based at least on a viscosity of the liquid contained within the compressible container, the diameter of the conduit coupled between the compressible container and the controllable valve, and the temperature of the dispensing system. One or more of these properties may affect the period of time with which the controllable valve needs to be opened to allow a sufficient measure of liquid to flow through the liquid transport conduit to make the pre-defined recipe or blending profile.

In some embodiments, the control system may utilize a pre-defined recipe to determine parameters for an amount of pressure to apply to the pressurized container/cartridge to control the controllable pressure system to dispense the ingredient.

In some embodiments, the control system 820 may selectively unlock or lock one or more valves (e.g., open or close the valves of transport conduits) of the PLSMPD system 800 by selectively activating (e.g., opening or closing) one or more solenoids, such as the solenoids 874 of FIG. 8. In some embodiments, the parameters may include an amount of time one or more solenoids of the PLSMPD system are open (e.g., selectively unlocked). In some embodiments, the parameters may include an amount of time one or more solenoids of the PLSMPD system are closed (e.g., selectively locked).

Each of the multiple compressible containers 850A and 850B may be coupled to more than one of the solenoids 874A, 874B, and 874C. For example, the compressible container 850A may be coupled to the solenoids 874A and 874B via conduits 856A and 858A, respectively. In various embodiments, the control system 820 may selectively activate one port or another of the solenoid.

In some embodiments, the PLSMPD system 800 may receive customized recipes for beverages or food items that include ingredients from one or more of the compressible containers of the pressurized containers 810 and 812. The customized recipe may specify an amount of each of the ingredients of the beverage or food item and/or an order with which to add or mix the ingredients. A user may manually create a dispensing profile based on the customized recipe. In some embodiments, the system may generate all or part of a dispensing profile based on the recipe. For example, a recipe (retrieved from a data source or customized by a user using the control system of FIG. 1) may identify an amount of different ingredients, flavorings, components, or food-like substances. The control system may convert the amounts to instructions to control dispensing from one or more different compressible containers the necessary ingredients (e.g., beverages, flavorings, components, or food-like substances as described herein). The system may store conversion information (e.g., ratios) for different ingredients based on the amount to be dispensed, average ingredient viscosity, pressure, the diameter of conduits, size of solenoids, and the like.

In some embodiments, when the PLSMPD system 800 receives a request from a user for a customized or pre-defined recipe, the control system 820 may determine if all the ingredients of the customized or pre-defined recipe are available in the PLSMPD system 800. If one or more ingredients are missing, or if there is an insufficient amount of one or more ingredients, the control system 820 may send a notification to the user (e.g., within a dispensing interface, alarm, mobile phone interface via an application, text, or email) informing the user that the recipe cannot be made. Similarly, if an ingredient runs out, the control system 820 may identify recipes or dispensing profiles that use that ingredient and provide a notification to the user (e.g., within a dispensing interface, alarm, mobile phone interface via an application, text, or email).

For the purposes of tracking inventory and anticipated service, in some embodiments, the control system 820 may track and estimate when a compressible container may need to be replaced (i.e., when the ingredient is running out or a "serve by" date of the ingredient within the compressible container is expired). In various embodiments, the control system 820 may track the consumption of beverages, flavorings, components, or food-like substances over hours, days, weeks, months, and/or seasons. The control system 820 may extrapolate based on past consumption to estimate the needs for a day, days, week, weeks, or any duration of time. The control system 820 may provide alerts or notifications (e.g., local or remote within a dispensing interface, alarm, mobile phone interface via an application, text, or email) to indicate when a compressible container needs to be refilled or replaced (or another compressible container added with additional beverages, flavorings, components, or food-like substances).

Similarly, the control system 820 may provide alerts or notifications (e.g., local or remote) to indicate when a compressible bag needs to be refilled or replaced based on extrapolating future needs based on historical consumption (or another compressible container added with additional beverages, flavorings, components, or food-like substances).

In some embodiments, the control system 820 utilizes information external to the PLSMPD system 800. For example, a PLSMPD system 800, which dispenses soft serve, may receive information from weather forecasting systems. If the PLSMPD system 800 receives information from the weather forecasting systems that a prolonged period of hot weather is forecasted for the following week, the PLSMPD system 800 may notify the user of increased potential demand for additional soft serve and other cold beverages via the display of the PLSMPD system 800 or a mobile device with a corresponding software application comprising a graphical user interface installed thereon.

The control system 820 may measure and track the number of beverages or food items being dispensed from the PLSMPD system 800. This information may be useful for the purposes of inventory tracking as well as invoicing. For example, an owner of the PLSMPD system 800 may calculate a sum of money for a lease based on the number of beverages or food items being dispensed over a period of time (e.g., to invoice lease or equipment rental based on usage).

The control system 820 may track the usage of the PLSMPD system 800 to estimate or assess when service or tune-up may be required. In some embodiments, the control system 820 may send a notification to the display of the PLSMPD system 800 or a mobile device with a corresponding software application comprising a graphical user interface installed thereon if the control system 820 determines there is a malfunction of any of the components of the PLSMPD system 800 such as the conduit, solenoid, the controllable pressure systems 830, and the like.

In some embodiments, the control system 820 may determine the temperature of one or more pressurized canisters. For example, a pressurized canister/cartridge that stores yogurt may be kept at a temperature that is different from that of a pressurized canister/cartridge which stores coffee or wine.

Figure 9A:
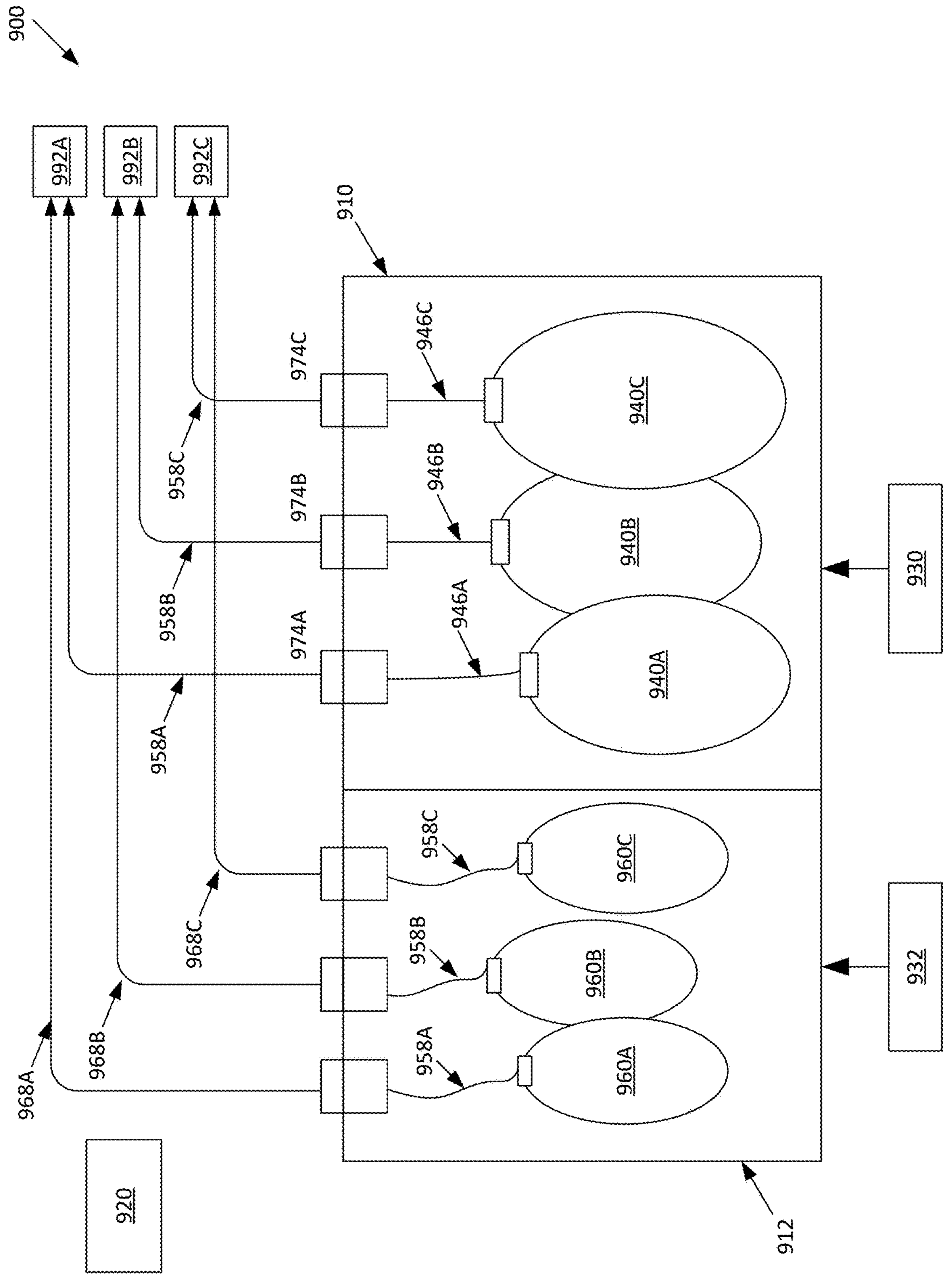
FIG. 9A is an illustrative diagram of a system capable of storing and selectively dispensing beverages or food-like substances with multiple pressurized containers according to some embodiments.

FIG. 9A is an illustrative diagram of an example system and method for storing and selectively dispensing beverages in some embodiments. The example of FIG. 9A may be similar to that of FIG. 3. The example of FIG. 9A may also be advantageously utilized as a component of the system and method for storing, preserving, managing, and selectively dispensing beverages of FIG. 1.

FIG. 9A is an illustrative diagram of a system capable of storing and selectively dispensing beverages or food-like substances with multiple pressurized containers according to some embodiments. The system 900 includes pressurized canister/pressurized container 910 and 912, a control system 920, controllable pressure systems 930 and 932, and dispensing pour units 992A, 992B, and 992C (individually, dispensing pour unit 992 collectively). The dispensing pour unit 992 may include some or all of the components of the dispensing pour units of FIG. 4A through 4C or FIG. 5A through 5C.

In some embodiments, the pressurized container/cartridge 910 includes compressible liquid containers 946A, 946B, and 946C (individually, collectively, the compressible liquid container 930). In some embodiments, the compressible liquid container 940C contains liquids or beverages such as wine, concentrated caffeinated beverages such as soda or coffee, hard lemonade, soft serve, and/or the like. In various embodiments, the compressible liquid container 940C contains carbonated liquid. In some embodiments, compressible containers which contain or are capable of containing beverages are stored within the pressurized container 910.

In various embodiments, the pressurized container/cartridge 912 includes compressible liquid containers 960A, 960B, and 960C (individually, collectively, the compressible liquid container 960). The compressible container 850 may be capable of containing liquids that provide added flavors to various beverages. In some embodiments, each of the compressible liquid containers 960A, 960B, and 960C may contain chocolate flavoring, sugar syrup, fruit syrups, or coffee syrup for various types of beverages. In one example, the compressible containers 960 may contain syrups or sauces for soft serve or other foods. The compressible liquid container 930 may be larger than the compressible liquid container 960.

Any one of the compressible liquid containers 940 and compressible liquid container 960 of the System 900 contains distilled alcohol, malt beverage, and mixed drink ingredients such as margarita mix, lemon juice, lime juice, or ginger beer. In various embodiments, the compressible liquid container 940 contains beer syrup, which is the product of removing water and alcohol from beer. Before the beer syrup may be served and consumed, beer syrup needs to be hydrated, alcoholized, and carbonated. Beer syrup is concentrated, easier to transport, and may have a longer shelf life.

In various embodiments, the pressurized container/cartridge 910 is coupled to the controllable pressure system 930, while the pressurized container/cartridge 912 is coupled to the controllable pressure system 932. The controllable pressure systems 930 and 932 are selected and configured to provide direct pressurization to the compressible container stored therein to generate and maintain the pressurized environment within the necessary/desired parameters.

Each of the compressible liquid containers 960A, 960B, and 960C may be coupled to solenoids 974A, 974B, and 974C (individually, collectively, solenoids 974) via liquid transport conduits 958A, 958B, and 958C (individually, collectively liquid transport conduits 946), respectively. Each of the solenoids 974A, 974B, and 974C may be coupled to the dispensing pour units 992A, 992B, and 992C via liquid transport conduits 958A, 958B, and 958C (individually, liquid transport conduit 958, collectively), respectively. In various embodiments, the solenoids of the pressurized container/cartridge 912 may be coupled to the dispensing pour units 992A, 992B, and 992C via liquid transport conduits 968A, 968B, and 968C (individually, liquid transport conduit 968 collectively). In some embodiments, the liquid transport conduits 958 and 968 are configured in a multi-pour nozzle, such as the multi-pour nozzle 470 of FIG. 5C. In one example, the liquid transport conduits 946 may be releasably coupled to their respectively compressible liquid container 940.

Each of the controllable pressure systems 930 and 932 may be controllable by a control system (e.g., in response to a signal received from a mobile device). The mobile device may provide a request from a user of the mobile device to dispense a particular drink. The software application on the mobile device may send a signal to the control system which may retrieve a dispensing profile from a plurality of dispensing profiles and, in response to instructions of the dispensing profile, provide digital signal to each of the controllable pressure systems 930 and 932 to briefly increase the level of pressure in a pressurized environment within the pressurized containers 910 and 912 for all or a portion of the duration of a dispensing period to provide additional force and velocity to the liquid being expelled from the compressible container stored within the pressurized container 910 and 912.

Each of the valves 974A, 974B, and 974C may be controllable by a control system (e.g., in response to a signal received from a mobile device). The mobile device may provide a request from a user of the mobile device to dispense a particular drink. The software application on the mobile device may send a signal to the control system which may retrieve a dispensing profile from a plurality of dispensing profiles and, in response to instructions of the dispensing profile, provide a digital signal to one or more of the valves 974A, 974B, and 974C to open for one or more predetermined times to enable contents of the respective compressible containers to be dispensed and/or mixed.

In various embodiments, a control system may control any number of the controllable pressure systems 930 and 932 and any number of the valves 974A, 974B, and 974C. For example, the mobile device may provide a request from a user of the mobile device to dispense a particular drink. The software application on the mobile device may send a signal to the control system which may retrieve a dispensing profile from a plurality of dispensing profiles and, in response to instructions of the dispensing profile, provide a digital signal to one or more of the controllable pressure systems 930 and 932 (to apply pressure) and any number of the valves 974A, 974B, and 974C (to open for one or more predetermined times) to enable contents of the respective compressible containers to be dispensed and/or mixed.

The utilization of the controllable pressure systems 930 and 932 by the System 900 may be operable to manage the pressurized environment in the pressurized container within desired parameters (especially as the compressible containers are depleted during System 900 operations) and supports the deployment and utilization of the above-described dispensing profiles by one or more dispensing systems. In some embodiments, the controllable pressure systems 930 and 932 may be controlled by a mobile device with a corresponding software application comprising a graphical user interface installed thereon. The software application may receive a request from a user of the mobile device to dispense a particular drink. The software application may send a digital signal to the controllable pressure systems 930 and 932 to manage the pressurized environment to dispense liquid from the corresponding pressurized container/cartridge.

Figure 9B:
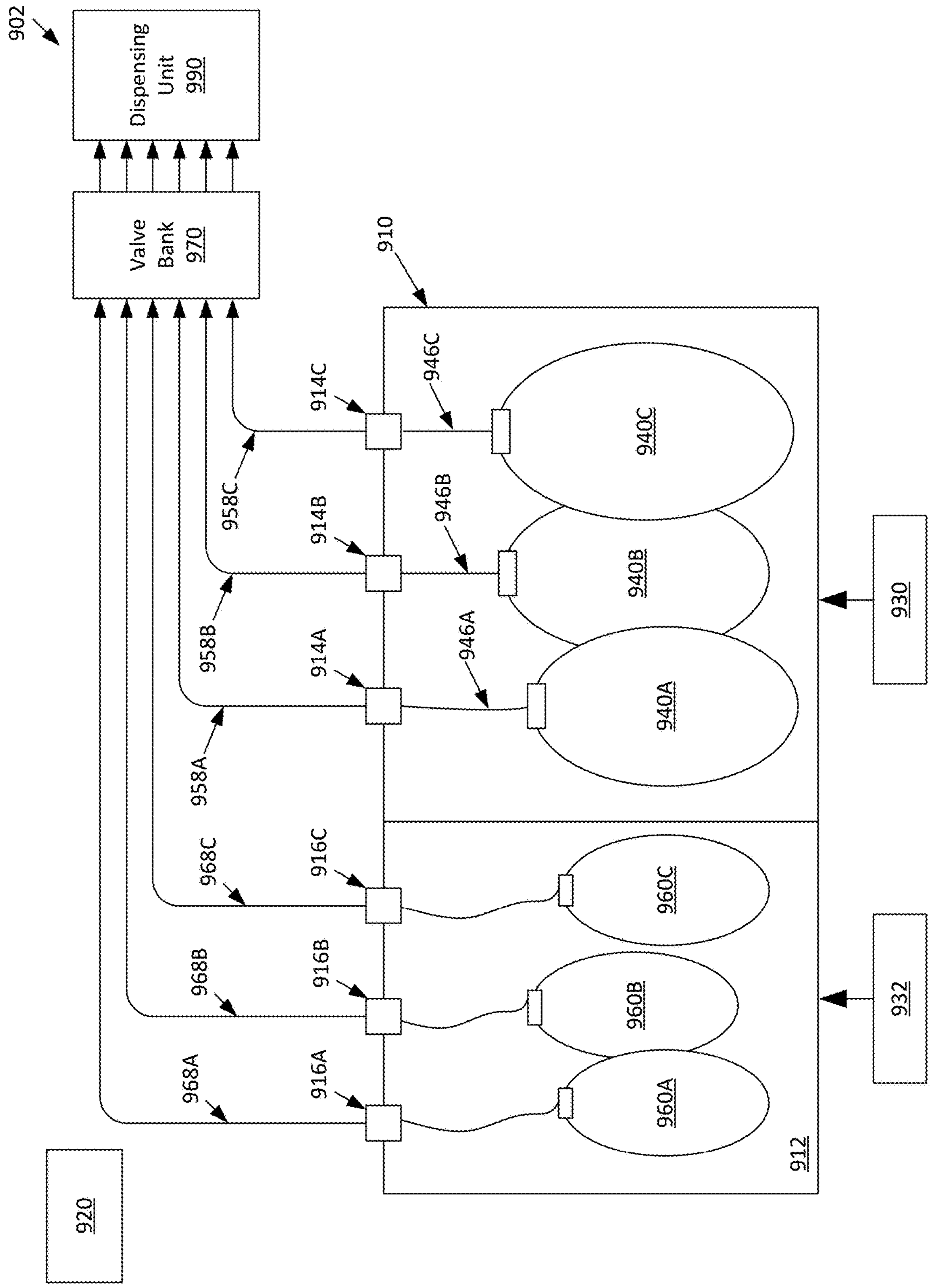
FIG. 9B is an illustrative diagram of a system capable of storing and selectively dispensing beverages or food-like substances with multiple pressurized containers and valve bank according to some embodiments.

A System 902 of FIG. 9B is another embodiment of a pressurized liquid storage and dispensing system with multiple pressurized containers and solenoid bank or valve bank according to some embodiments. The system 902 includes many of the same components of the system 900, elements with the same reference label as system 900 may have some or all of the same properties as the elements of system 900.

Similar to the System 900 of FIG. 9A, the system 902 is an embodiment of a pressurized liquid storage and dispensing system except the system 902 includes a valve bank 970 as opposed to individual or discrete solenoids such as solenoids 974A, 974B, and 974C of FIG. 9A. The valve bank 970 may comprise an array of solenoids or controllable valves. The valve bank may enable holding any number of solenoids or may include any number of solenoids.

The solenoids 974A, 974B, and 974C may be located at an interface of the pressurized container 910. The valve bank 970 may be located closer physical proximity to a dispensing unit 990. By placing the valve bank 970 closer to the dispensing unit 990, less pressure may be applied by the pressurized container 910 to push or propel liquid in dispensing conduit, through the valve bank 970 and to the dispensing unit dispensing unit 990. The solenoid 974 may include an electromechanical control component. The electromechanical control component may utilize an electrical signal, such as a control signal from the control system 920, to trigger a mechanical change, such as opening, or closing a solenoid, to enable or disable the flow of liquid in a liquid transport conduit coupled to the solenoid. In some embodiments, the control system 920 may receive the control signal to open or close the solenoid from a mobile computing device.

In one example, the control system 920 may be a local control system. The local control system may include a graphics display unit such as a touchscreen monitor. In some embodiments, the graphical user interface may include physical buttons. The touchscreen monitors and/or physical buttons may be situated or placed directly on the dispensing system. The user may interact with the graphical user interface to control one or more aspects of the dispensing system, including one or more controllable solenoids.

Dispensing conduits such as liquid transport conduits 958A, 958B, and 958C may couple the valve bank 970 to the compressible liquid containers 940A, 940B, and 940C, respectively. The controllable valves or solenoids may selectively enable or disable the flow of liquid from the compressible container 940 to the valve bank 970. The liquid transport conduit 958 may pass through volume interfaces 914A, 914B, and 914C (individually, volume interface 914 collectively) of the pressurized container 910. In some embodiments, the liquid transport conduit 958 may be releasably coupled to the volume interface 914 of the pressurized container 910. In one example, the liquid transport conduits 946 may be releasably coupled to their respectively compressible liquid container 940.

Similarly, volume interfaces 916A, 916B, and 916C (individually, volume interface 916, collectively) of the pressurized container 912 may allow the liquid transport conduits 968A, 968B, and 968C (individually, liquid transport conduit 968, collectively) to pass through it. In some embodiments, the liquid transport conduit 968 is releasably coupled to the volume interface 916 of the pressurized container 912.

Figure 9C:
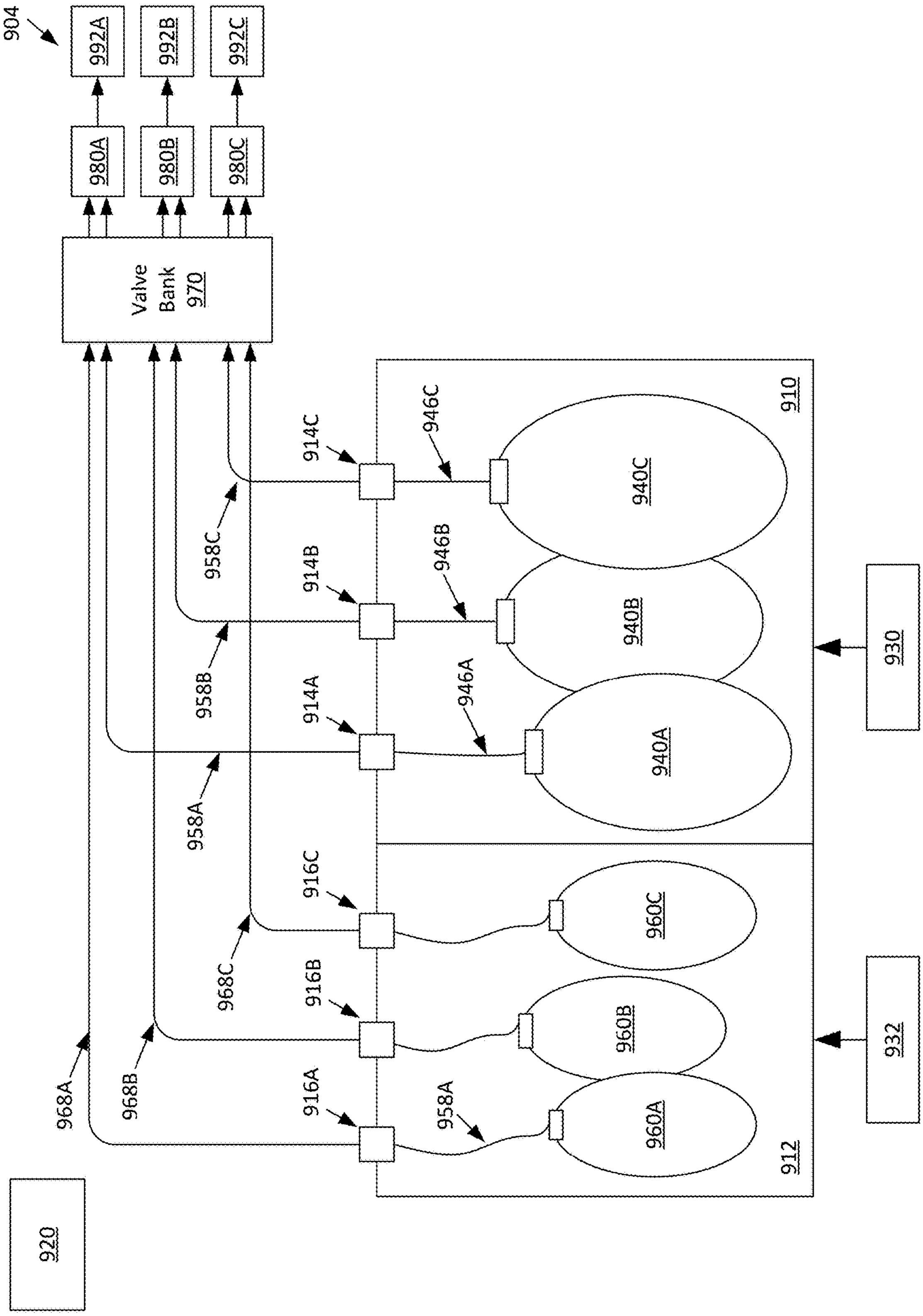
FIG. 9C is an illustrative diagram of a system capable of storing and selectively dispensing beverages or food-like substances with multiple pressurized containers according to some embodiments.

FIG. 9C is an illustrative diagram of a system capable of storing and selectively dispensing beverages or food-like substances with multiple pressurized containers according to some embodiments. System 904 of FIG. 9C is another embodiment of a pressurized liquid storage and dispensing system with multiple pressurized containers and valve bank according to some embodiments.

Similar to the system 902 of FIG. 9B, the System 904 includes the valve bank 970 as opposed to individual or discrete solenoids such as solenoids 974A, 974B, and 974C of FIG. 9A. It can be appreciated that the order of the liquid transport conduits to the multiple valves which make up the array of valves of the valve bank may be different. For example, the placement of the liquid transport conduits to the FIG. 9B corresponds to the placement of the compressible liquid containers in their respective pressurized container. In the illustrated embodiment in FIG. 9C, adjacent solenoids of the valve bank 970 may be coupled to compressible liquid containers in alternating pressurized container. For example, liquid transport conduit 968A may couple compressible liquid container 960A to a solenoid or controllable valve of the valve bank 970 and is adjacent to a solenoid which is coupled to the compressible liquid container 940A via the liquid transport conduit 958A.

The valve bank 970 may be coupled to inputs of one of a plurality of mixing mechanisms 980A, 980B, 980C (individually, mixing mechanism 980, collectively) to selectively blend the contents of the compressible liquid volumes. One or more liquids may flow to the mechanism 980 before being pumped or propelled to the dispensing pour units 992.

For example, the mixing mechanism 980A is coupled to the compressible liquid container 960A via valve bank 970, liquid transport conduit 968A through volume interface 916A. Similarly, the mixing mechanism 980A is coupled to the compressible liquid container 940A via valve bank 970, liquid transport conduit 958A through volume interface 914A. In some examples, one or more of the mixing mechanisms 980A may include venturi systems, mixing chambers, nozzles of different sizes, and/or the like.

In some embodiments, the mixing mechanism 980A is a venturi system. The venturi system may include constrictions or a change in the diameter of the transport conduit from the input ports towards a constricted or choke section of the transport conduit. The change in the diameter results in a reduction in pressure and in an increase in the velocity of the fluid or liquid flowing through the constriction. The venturi system may include two input ports and one output port. In various embodiments, the venturi system includes any number of input ports and output ports.

Each of the input and output ports of the mixing mechanism 980A may include a releasable coupling. Releasable coupling may be configured to readily form a releasable sealed connection and may include a universal adapter component, operable to enable the adaptive releasable coupling to form a secure sealed (but releasable) connection. The releasable couplings include a releasable sealed connector element operable to form a releasable connection with their respective conduit so that it can be readily disconnected if replacement or either component is necessary. The sealed connector element of the releasable couplings comprises a releasable adaptive pressurized filling that increases in strength and reliability in response to an increase in the pressure that is exerted in the dispensing system (e.g., such as a pressurized "O-Ring" fitting).

In various embodiments, the mixing mechanism 980A may be a mixing chamber. The mixing chamber includes a blending cup configured as a funnel. The funnel may be coupled to the liquid transport conduits 968A and 958A as inputs of the external mixing mechanism 450. Each of the liquid transport conduits 968A and 958A may be coupled to the valve bank 970, respectively. The funnel may include one or more mechanical components, such as a whisk to blend the liquid of fluid inputted from the liquid transport conduits 968A and 958A. In some embodiments, the mixing mechanism 980A may include a rotating component equipped with vanes or blades or an impeller. The impeller may blend or mix the liquid of fluid inputted from the liquid transport conduits 968A and 958A. An output of the mixing mechanism 980A may be a liquid transport conduit coupled to an output of the funnel.

In various embodiments, the mixing mechanisms 980 includes two or more mixing chambers, where each mixing chamber is composed of different materials and/or includes different types of mixing components.

An example of the mixing component of the mixing mechanisms 980 includes a whisking component that mixes or blends the contents of the chamber. In another example, the mixing component of the mixing mechanisms 980 includes a broad, flat, flexible blade, or paddle, which folds or churns one component of a beverage or food-like substance with another. In various embodiments, mixing mechanisms 980 includes a centrifugal mixing chamber that mixes or blends the contents of the chambers using centrifugal force.

In one example, one or more of the mixing mechanisms 980 may be directly coupled to the dispensing interface. In another example, one or more of the mixing mechanisms 980 is a part of the dispensing interface. In some embodiments, the mixing mechanism 980 includes a dispensing auger or another component capable of mixing or blending the contents of the mixing chamber and directing the contents towards a dispensing interface.

In various embodiments, one or more components of the mixing mechanisms 980 may be controlled by the control system 920. For example, the control system 920 may receive control signals from a local control system or a software application configured to control one or more aspects of the mixing mechanism 980A, including the vanes, blades, or impeller. The control system 920 may determine a period of time one or more of the solenoids or controllable valves required to dispense based on a blending profile. The blending profile indicates one or more ingredients required to produce the beverage or food-like substance. The blending profile may also include an amount for each of the ingredients required to produce the beverage or food-like substance. In some embodiments, a user of the dispensing system may interact with a graphical user interface to dispense a beverage or food-like substance based on a blending profile. In one example, the user of the dispensing system may interact with a graphical user interface to customize an existing blending profile or create a new blending profile using one or more ingredients available in the PLSMPD system. The graphical user interface may be a part of a local dispensing control system or a mobile device with a corresponding software application comprising a graphical user interface installed thereon. An example of the graphical user interface may be seen in FIG. 10A.

In some embodiments, a mixing chamber may be coupled to water, carbonated water, seltzer, a gas, or the like for cleaning the mixing chamber. The mixing chamber may also include, in some embodiments, a drain or a solenoid (e.g., controllable valve) that can drain or provide an escape for the water, carbonated water, seltzer, or gas used to flush the mixing chamber. In some embodiments, periodically (e.g., after a period of time, a predetermined number of uses of the mixing chamber, or after every use of the mixing chamber), the control system 920 may control a source (e.g., through a pump, pressure system, or both) to dispense the water, carbonated water, seltzer, or gas within the mixing chamber and to open the drain conduit (e.g., command the solenoid valve to open) to drain and/or remove the cleaning agent. In some embodiments, the drain or drain conduit may lead to a physical drain (e.g., in a sink) or a waste container that is periodically emptied.

In some embodiments, the dispensing pour units 992 has some or all of the components of the dispensing pour units of FIG. 4A through 4C and FIG. 5A through 5C.

In some embodiments, a separate container that does not reside in the pressurized environment of the airtight pressurized container may contain an ingredient, beverage, or other product (e.g., wine, liquids, fluids, soft serve, chemicals, food-like substances, or the like). The container, for example, may be a keg, soft serve device, ice cream machine, coffee machine, cream machine, or the like. In various embodiments, a conduit may extend from the separate container to the dispensing system (e.g., to a separate or shared nozzle of the dispensing interface 102) or a mixing chamber. In various embodiments, the dispensing control system 158 may control pumping or distribution of contents form the separate container.

In one example, the control system may utilize a dispensing profile that includes instructions to open one or more valves to provide one or more ingredients from any number of collapsible containers in the pressurized environment to a mixing chamber. The dispensing profile may further include instructions to control a dispensing mechanism (e.g., a pump) of the separate container to dispense contents of the separate container to the mixing chamber to mix the ingredients and contents before dispensing.

In another example, the control system may utilize a dispensing profile that includes instructions to open one or more valves to provide one or more ingredients from any number of collapsible containers in the pressurized environment to a dispenser (e.g., to any number of nozzles) as well as instructions to control a dispensing mechanism (e.g., a pump) of the separate container to dispense contents of the separate container to the nozzle to allow the ingredients and contents to combine in a glass or cup for a customer. It will be appreciated that the control system may control valves, pumps, and/or any other electromechanical device that allows dispensing or transport of ingredients and/or contents.

It will be appreciated that there may be any number of separate containers and the control system may control dispensing from any number of collapsible containers within the system 100 as well as dispensing any number of separate containers.

Figure 10A:
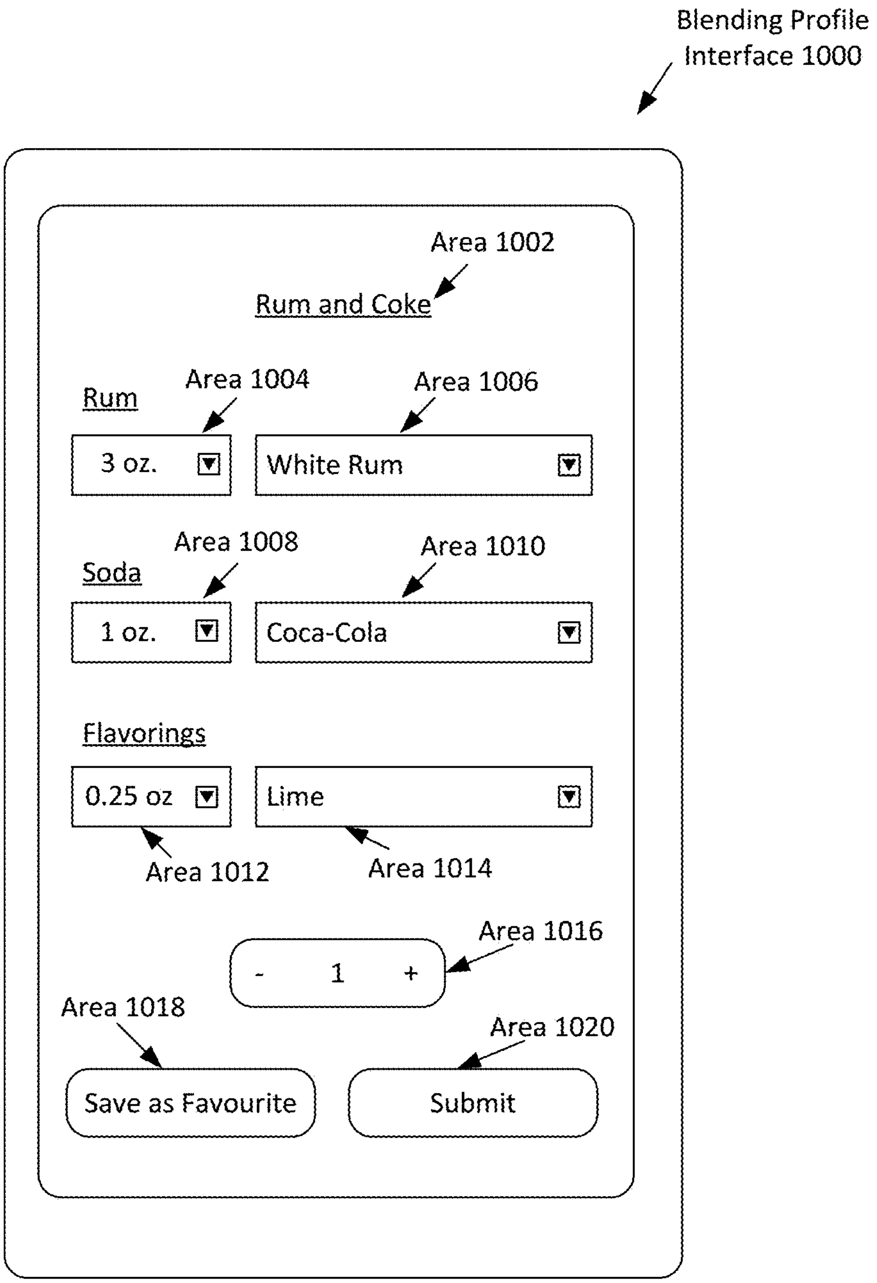
FIG. 10A is an example user interface for a dispensing system to customize a blending profile according to some embodiments.

FIG. 10A is an example user interface for a dispensing system to order a default blending profile according to some embodiments. In some embodiments, the example user interface may allow a user to customize a default blending profile. The example user interface of FIG. 10A includes a blending profile interface 1000. The blending profile interface 1000 may be provided to a graphics display of a user system, such as a mobile computing device. The user may interact with the blending profile interface 1000 to execute program/control instructions. For example, an employee of a commercial establishment or a patron of the commercial establishment may interact with the blending profile interface 1000 to remotely dispense a beverage from the dispensing system of the entertainment venue.

In some embodiments, the blending profile interface 1000 includes multiple areas, such as area 1002, which depicts a name of the beverage or food-like substance associated with the blending profile or recipe. In one example, the name of the blending profile may be customized. For example, a user of the dispensing system may rename the name of a beverage. The user of the dispensing system may be an employee of a commercial establishment. In various embodiments, the user of the dispensing system may be a mobile computing device provided by the commercial establishment to allow patrons to order beverages and foods from a tablet device or a mobile software application program made available by the commercial establishment to patrons on the patrons' mobile computing device.

The user of the dispensing system may customize a beverage by varying the amount of each ingredient used in the blending profile. For example, the blending profile interface 1000 depicts a blending profile or recipe for rum and coke. The user of the dispensing system may interact with a drop-down list in an area 1004 and change the proportionality of rum in the drink, the user may choose to increase or decrease an amount of rum in the beverage. The user of the dispensing system may interact with a drop-down list in an area 1006 to change the type of rum that the beverage uses. For example, the user may choose from a white rum, a dark rum, a spiced rum, or a "high-shelf" rum. The types of rum available in the drop-down list or menu depend on the types of rums available to the dispensing system. A change of the blending profile from a default may change the price of the beverage. For example, the default rum and coke dispensing profile may include 3 ounces (oz.) of rum and 1 oz. of coke with a dash of lime flavoring.

The user of the dispensing system may interact with area 1008 and change the proportionality of soda in the drink. The user may choose to increase or decrease the amount of soda in the beverage. An increase or decrease in the amount of soda in the beverage may change the price of the beverage. 1010, 1012, and 1014. The user of the dispensing system may interact with a drop-down list in an area 1010 to change the type of soda that may be used in the beverage. In some embodiments, the types of soda available in the drop-down list or menu depend on the types of soda available to the dispensing system. A change of the blending profile from a default may change the price of the beverage.

Similar to areas 1004 and 1006, the user of the dispensing system may interact with drop-down lists in areas 1012 and 1014 to customize and amount and type of flavoring to add to the beverage. For example, the user may choose to add 0.25 oz. of lime flavoring to the rum and coke.

The user of the dispensing system may interact with an area 1016 to change a quantity of beverages corresponding to the blending profile to submit to the dispensing system. The user may interact with area 1018 to save a customized blending profile so that it can be easily re-submitted without going through the customization steps listed above.

The user may interact with area 1020 to submit a beverage corresponding to the blending profile. In response to the user submitting the beverage corresponding to the blending profile to the dispensing system, the control system of the dispensing system may send a control signal to the dispensing system. The control system may identify one or more components of the dispensing system which require activation in order to dispense the beverage. For example, the control system may identify one or more compressible liquid volumes of the dispensing system which contains the rum, lime flavoring, and the soda syrup for the coke, and determine a period of time that each the controllable valves or solenoids coupled to the identified compressible liquid volumes should be opened for to enable an amount of rum, lime flavoring, and soda syrup, as identified in the blending profile, to the dispensing unit. In this example, the control system may identify a carbonated liquid line that may be used as a part of the beverage and determine a period of time a controllable valve or pump coupled to the carbonated liquid line should be opened or operated to enable an amount of carbonated water, as identified in the blending profile, to be dispensing unit. The period of time each of the controllable valves needs to be opened or enable to allow the liquid in the liquid transport conduit coupled to each of the controllable valves depends on many factors, including the viscosity of the liquid, a diameter of the liquid transport conduit, the temperature of the liquid, and pressure of the controllable valve.

In response to changes made to a particular blending profile, such as increasing the amount of rum, changing the type of rum, or an addition of a flavoring, the control system may send an order of a blending profile to a point-of-sale (POS) system of the commercial establishment. In some embodiments, the control system may send an order of a customized blending profile to the POS system. The POS system may receive this information and determine a cost for the customized beverage based on the variance of the amount of rum, coke, or flavoring compared to a default blending profile.

Figure 10B:
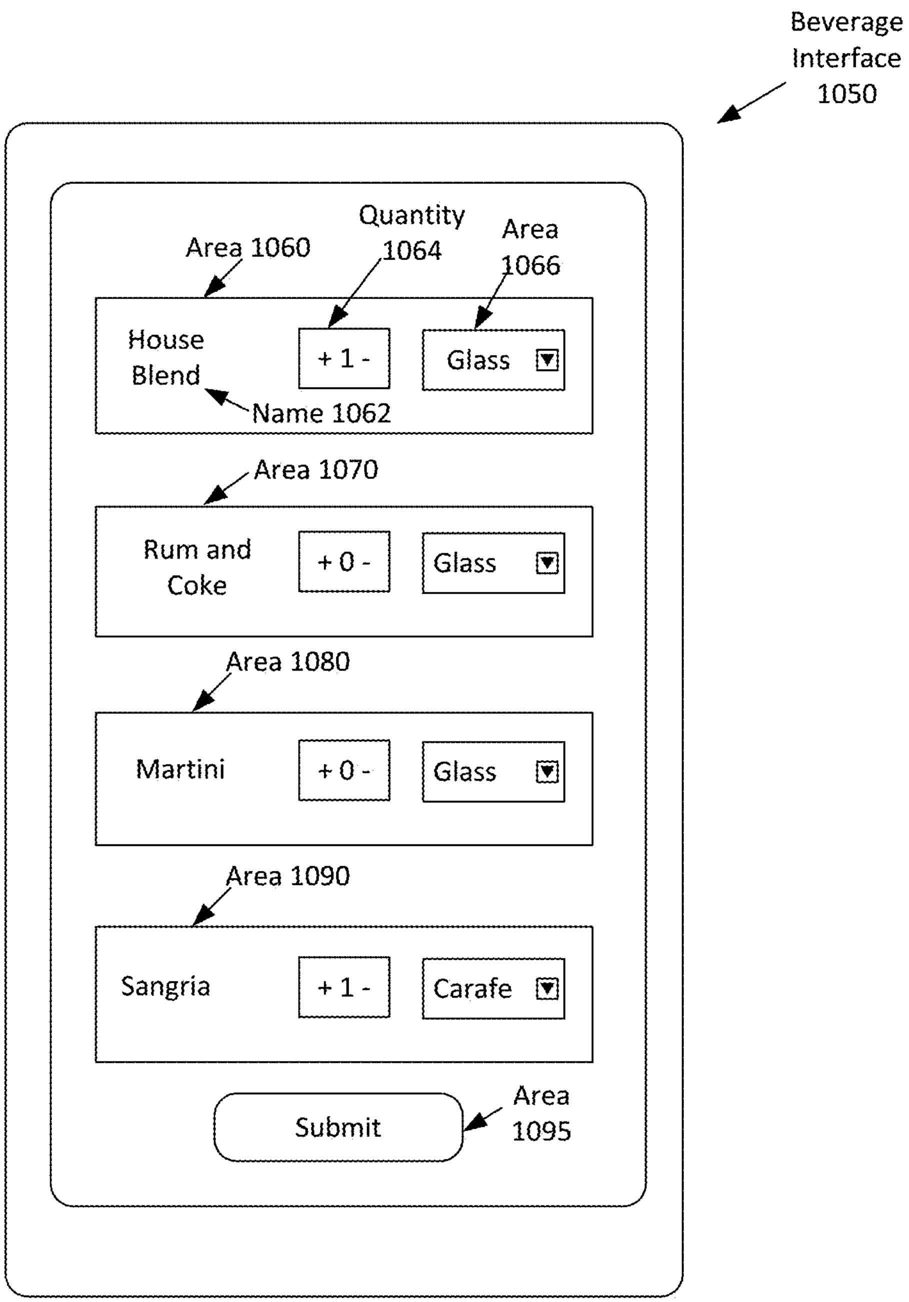
FIG. 10B is an example user interface for a dispensing system to dispense beverages based on blending profiles according to some embodiments.

FIG. 10B is an example user interface for a dispensing system to dispense beverages based on blending profiles according to some embodiments. In some embodiments, the beverage interface 1050 includes multiple areas, such as areas 1060, 1070, 1080, and 1090 which depict different types of beverages which may be chosen. Each of the areas includes multiple fields, such as area 1062, which indicates the name of the beverage, which may be customized. The user may interact with areas 1064 and 1066 to provide an indication of a quantity and a type of container. For example, a user may interact with area 1064 to choose the number of beverages. The user may interact with area 1066 to choose the type of container, such as a glass or a carafe. Once the user has made their selection, the user may interact with area 1095 of the beverage interface 1050 to submit the order. In some embodiments, the beverage interface 1050 is remotely operable to control multiple dispensing systems or pressurized containers of the entertainment venue. An interface similar to beverage interface 1050 may be utilized to remotely control a dispensing system to dispense food-like substances.

Figure 11A:
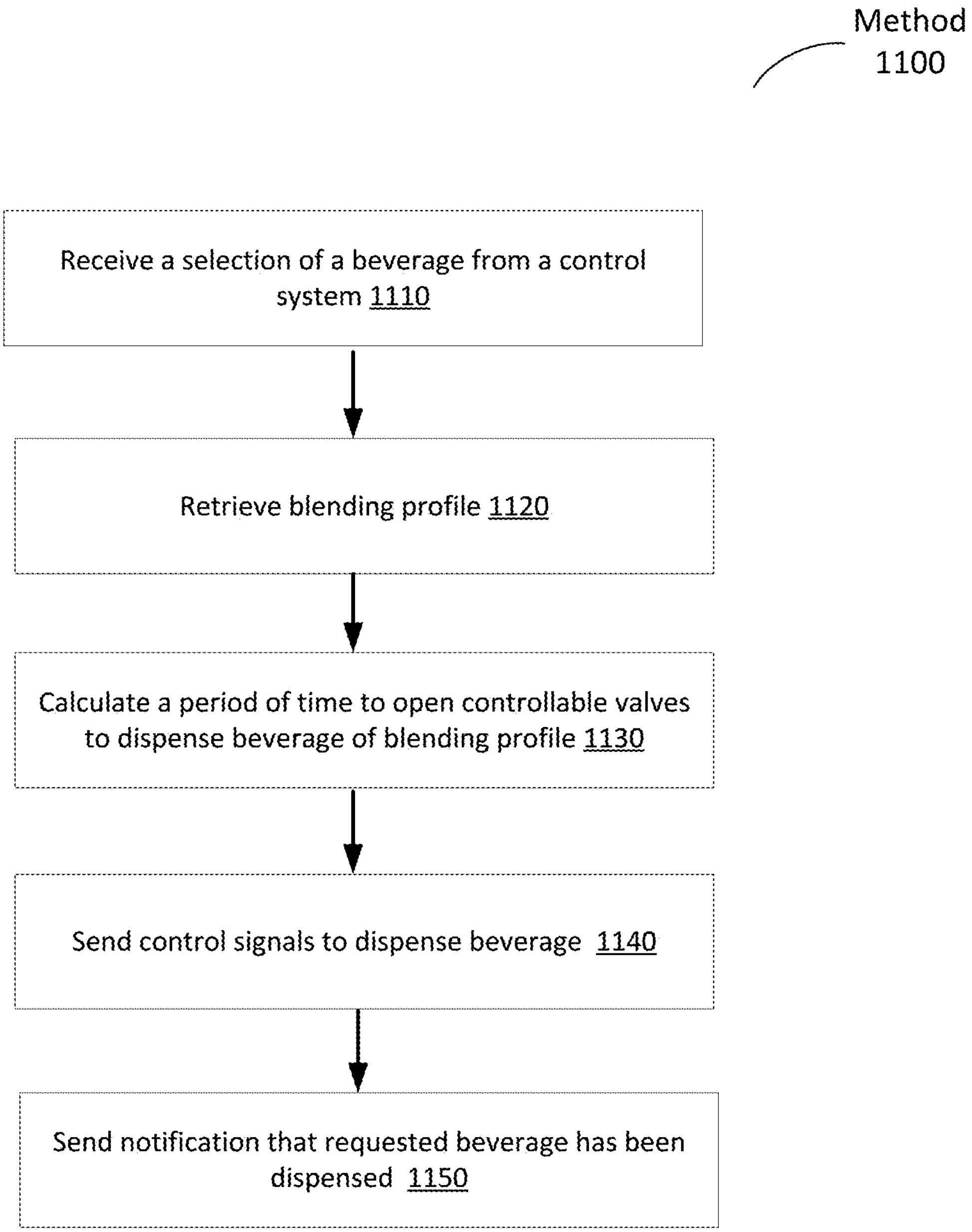
FIG. 11A is a flow chart of a method of dispensing a beverage according to some embodiments.

FIG. 11A is a flow chart of a method 1100 of dispensing a beverage according to some embodiments.

In step 1110, a control system, such as the control system 920 of FIG. 9A may receive a control signal from the user of the dispenser system 900. The user may interact with the blending profile interface 1000 of FIG. 10A or the beverage interface 1050 of FIG. 10B to submit a default blending profile or a customized blending profile. The control system 920 may receive a request from the blending profile interface to blend a particular beverage or food-like substance. For example, the control system 920 receives a control signal from the user for blending profile which corresponds to a martini that consists of 3 oz. of vodka and ½ oz. of vermouth.

In step 1120, the control system 920 may query a database of blending profiles or customized blending profiles for a recipe or blending profile matching the request. The database may be a data structure for storing information that is a part of the dispensing system and may be local to the commercial establishment. In some embodiments, the database may be stored in a cloud-based infrastructure accessible by a particular commercial establishment or accessible to some or all commercial establishments which utilize the same type of dispensing system.

Once the requested blending profile has been found in the database of blending profiles or customized blending profiles, the control system 920 may identify one or more ingredients required to produce the beverage or food-like substance. The request may also include an amount of each ingredient required to produce the beverage or food-like substance. In some embodiments, the request may include an order with which to dispense the different ingredients if necessary. If one or more ingredients are missing, or if there is an insufficient amount of one or more ingredients, the control system 920 may send a notification to the user informing the user that the recipe cannot be made. For example, the control system 920 may identify one compressible liquid container, which contains vodka, and another compressible liquid container which contains vermouth, the controllable valves coupled to the one compressible container and another compressible container.

In step 1130, the control system 920 utilizes the blending profile to determine parameters (e.g., to be included in a dispensing profile) such as a period of time that each of the controllable valves coupled to the compressible liquid volumes required to produce the beverage or food-like substance should be opened for to produce the beverage or food-like substance. The control system 920 may the period of time based on at least a viscosity of the liquid contained within the compressible container, the diameter of the conduit coupled to the compressible container and dispensing interface, temperature of the dispensing system, and pressure of the controllable valve. One or more of these properties may affect the period of time with which the controllable valve needs to be opened or enabled to allow a sufficient measure of liquid to flow through the liquid transport conduit to make the pre-defined recipe. In some embodiments, the control system 920 determines an amount of pressure to apply to the pressurized canister/cartridge by a controllable pressure system to allow liquid to be selectively dispensed through a normally locked dispensing conduit connected to the pressurized canister/cartridge. In various embodiments, properties of the compressible container may be inputted to the control system 820 using other methods such as container IDs which may comprise labels (bar codes, QR codes, or RFID tags).

For example, the control system 920 may determine one period of time to open or enable one controllable valve coupled to one compressible container which contains vodka and another period of time to open or enable another controllable valve coupled to another compressible container that contains vermouth. The control system 920 may send a control signal to the dispensing system to dispense the beverage or food-like substance. The control signals may include the above-identified one period of time and another period of time.

In step 1140, the control system 920 may send the control signal to the dispensing system to dispense the beverage or food-like substance corresponding to the requested blending profile. In some embodiments, the control signal includes electronic signals to control an electromechanical control component of the controllable valve. In one example, the control signal includes electronic signals to control the mixing mechanisms of the dispensing system. Further details regarding step 1140 may be seen in FIG. 11B. In some embodiments, the control signal includes an electronic signal to automatically dispense the beverage once the beverage is ready to be dispensed.

In step 1150, the control system 920 may send a notification (e.g., local or remote) to the user who requested the beverage or food-like substance corresponding to the requested blending profile has been dispensed.

Figure 11B:
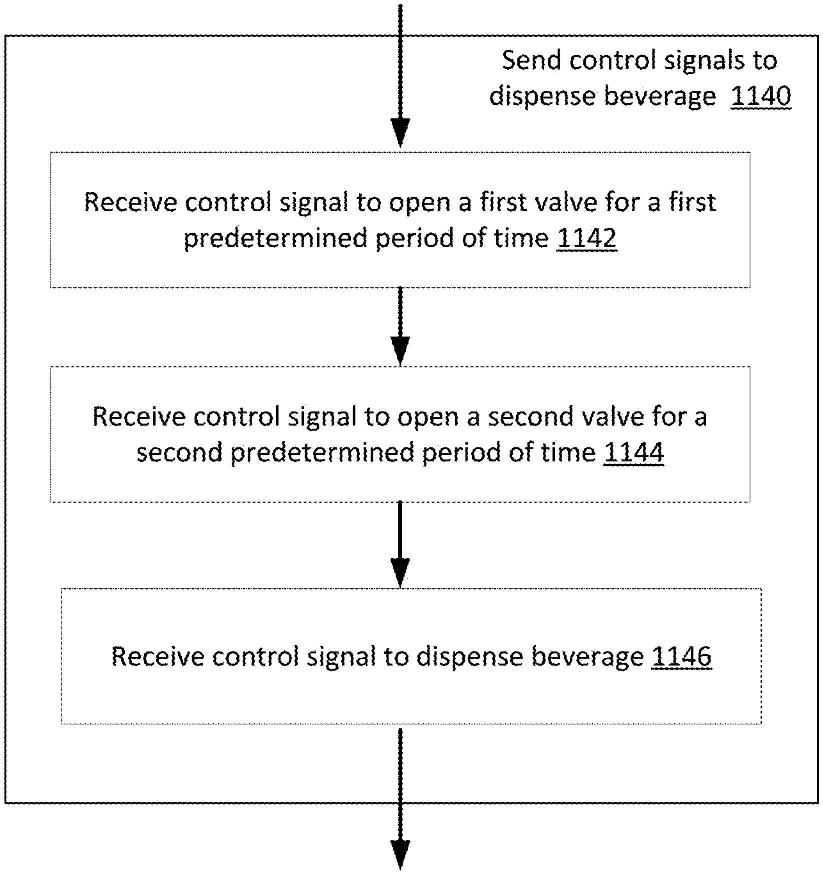
FIG. 11B is a flow chart of a particular step of the method of dispensing a beverage of FIG. 11A.

FIG. 11B is a flow chart of the step 1140 from the method 1100 of dispensing a beverage of FIG. 11A.

In step 1142, the dispensing system may receive from the control system 920 the control signal to dispense the beverage or food-like substance corresponding to the requested blending profile. For example, in step 1130, the control system 920 determines one period of time to open or enable one controllable valve coupled to one compressible container which contains vodka. The control system 920 may send an electronic signal to the electromechanical control component of the controllable valve coupled to the compressible container, which contains vodka, to open the controllable valve for the duration of the previously determined one period of time.

In step 1130, the control system 920 determines another period of time to open or enable one controllable valve coupled to one compressible container, which contains vermouth. In step 1144, control system 920 may send an electronic signal to the electromechanical control component of the controllable valve coupled to the compressible container, which contains vermouth to open the controllable valve for the duration of the previously determined another period of time.

In step 1146, the dispensing system may receive electronic signals to automatically dispense the beverage.

Thus, while there have been shown and described and pointed out example features of the system and method as applied to some embodiments thereof, it will be understood that various omissions and substitutions and changes in the form and details of the devices and methods illustrated, and in their operation, may be made by those skilled in the art without departing from the spirit of the embodiments described. For example, it is expressly intended that all combinations of those elements and/or method steps that perform substantially the same function in substantially the same way to achieve the same results are within the scope of the disclosure. It is the intention, therefore, to be limited only as indicated by the scope of the claims appended hereto.

The invention claimed is:

1. A method comprising:

receiving a control signal to dispense contents from at least one compressible liquid container, the at least one compressible liquid container being within an airtight pressurized container, the airtight pressurized container including an access component configured to enable a pressurized environment within the airtight pressurized container to be maintained within the airtight pressurized container when sealed, the access component being further configured to allow the at least one compressible liquid container to be placed within the airtight pressurized container;

in response to receiving the control signal, retrieving a first dispensing profile of a plurality of dispensing profiles, each profile of the plurality of dispensing profiles indicating two or more controllable valves and, predetermined periods of time that each of the two or more controllable valves remains open, each of the two or more controllable valves controlling transport of contents from a different compressible liquid container contained within the airtight pressurized container to a dispensing system, wherein the first dispensing profile specifies: a sequence of two or more controllable valves to be opened; and for each valve in the sequence specified by the first dispensing profile:

opening a particular controllable valve of the two or more controllable valves identified in the first dispensing profile for a particular predetermined period of time to transport contents over a first liquid transport conduit that is coupled to a particular releasable coupling and the particular controllable valve, the particular releasable coupling being configured to releasably couple to a particular volume interface of a particular compressible liquid container within the pressurized environment, wherein the particular predetermined period of time for keeping the particular controllable valve open is based on a viscosity of contents controlled by the particular controllable valve;

closing the particular controllable valve of the two or more controllable valves identified in the first dispensing profile after the particular predetermined period of time to dispense an amount of contents of the particular compressible liquid container; and mixing amounts of contents from multiple compressible liquid containers prior to dispensing.

2. The method of claim 1, wherein the first dispensing profile is customizable by a user to vary an amount of contents dispensed from each of the multiple compressible liquid containers.

3. The method of claim 1, wherein the contents from the multiple compressible liquid containers are mixed using a mixing mechanism selected from a group consisting of a mixing chamber and a venturi system.

4. The method of claim 1, further comprising generating the first dispensing profile, the first dispensing profile being associate with a particular beverage, the first dispensing profile being generated by:

identifying each compressible liquid container containing at least one ingredient for the particular beverage; and for each compressible liquid container containing at least one ingredient:

identifying a particular controllable valve, the particular controllable valve enabling contents of the particular compressible liquid container to flow from the particular compressible liquid container in the airtight pressurized container to a dispensing system; and determining a particular predetermined period of time for the particular controllable valve to be open to dispense contents of that particular compressible liquid container, the particular predetermined period of time for the particular controllable valve to be open being based on temperature of the particular ingredient contained within the particular compressible liquid container.

5. The method of claim 1, wherein the two or more controllable valves includes a first controllable valve and a second controllable valve, wherein the first dispensing profile indicates a first predetermined period of time associated with the first controllable valve and a second predetermined period of time associated with the second controllable valve, wherein in response to receiving the control signal, opening the first controllable valve for the first predetermined period of time and opening the second controllable valve for the second predetermined period of time, and closing the first controllable valve when the first predetermined period of time elapses and closing the second controllable valve when the second predetermined period of time elapses, wherein the at least one compressible liquid container being within the airtight pressurized container includes a first compressible liquid container and a second compressible liquid container, when the first controllable valve is open, pressure from within the airtight pressurized container forcing contents from the first compressible liquid container over the first liquid transport conduit through the first controllable valve towards the dispensing system, the first liquid transport conduit including a first releasable coupling coupled to a first volume interface of the first compressible liquid container to enable the contents of the first compressible liquid container to flow through the first liquid transport conduit, and when the second controllable valve is open, pressure from within the airtight pressurized container forcing contents from the second compressible liquid container over a second liquid transport conduit through the second controllable valve towards the dispensing system, the second liquid transport conduit including a second releasable coupling, the second releasable coupling being configured to releasably couple to a second volume interface of the second compressible liquid container to enable the contents of the second compressible liquid container to flow through the second liquid transport conduit.

6. The method of claim 5, wherein the opening of the first controllable valve occurs after the opening of the second controllable valve.

7. The method of claim 5, wherein the second compressible liquid container is outside the airtight pressurized container.

8. The method of claim 5, wherein the second compressible liquid container is a keg.

9. The method of claim 1, wherein the predetermined period of time for keeping the particular controllable valve open is determined based on a temperature of the contents of the particular compressible liquid container controlled by the particular controllable valve within the pressurized environment and a pressure rating of the particular controllable valve.

10. The method of claim 1, wherein the control signal is received from a mobile computing device in response to a selection of the plurality of dispensing profiles on an interface, the control signal indicating the first dispensing profile.

11. A system comprising:

an airtight pressurized container for storing at least one first compressible liquid container, the airtight pressurized container including an access component configured to enable a pressurized environment within the airtight pressurized container to be maintained within the airtight pressurized container when sealed, the access component being further configured to allow the at least one first compressible liquid container to be placed within the airtight pressurized container;

a controllable pressure system coupled to the airtight pressurized container through a pressure delivery conduit to generate the pressurized environment within the airtight pressurized container;

a first liquid transport conduit coupled to a first releasable coupling, the first releasable coupling being configured to releasably couple with a first volume interface of the at least one first compressible liquid container within the pressurized environment, the first liquid transport conduit being further coupled to a first controllable valve;

a dispensing system configured to dispense content from the at least one first compressible liquid container received through the first controllable valve; and a control system comprising a first electromechanical control component, the first electromechanical control component configured to control the first controllable valve, the control system configured to:

receive a control signal to dispense contents from the at least one first compressible liquid container, in response to receiving the control signal, retrieve a first dispensing profile of a plurality of dispensing profiles, each profile of the plurality of dispensing profiles indicating two or more controllable valves and, predetermined periods of time that each of the two or more controllable valves remains open, each of the two or more controllable valves controlling transport of contents from a different compressible liquid container contained within the airtight pressurized container to the dispensing system, wherein the first dispensing profile specifies: a sequence of the two or more controllable valves to be opened; and for each controllable valve in the sequence specified by the first dispensing profile:

open a particular controllable valve of the two or more controllable valves identified in the first dispensing profile for the particular predetermined period of time to transport contents over a first liquid transport conduit that is coupled to a particular releasable coupling and the particular controllable valve, the particular releasable coupling being configured to releasably couple to a particular volume interface of a particular compressible liquid container within the pressurized environment, wherein the predetermined period of time for keeping the particular controllable valve open is based on a viscosity of contents controlled by that valve;

close the particular controllable valve of the two or more controllable valves identified in the first dispensing profile after the particular predetermined period of time to dispense an amount of contents of the particular compressible liquid container; and mix the amounts of contents from multiple compressible liquid containers prior to dispensing.

12. The system of claim 11, wherein the first dispensing profile is customizable by a user to vary an amount of contents dispensed from each of the multiple compressible liquid containers.

13. The system of claim 12, wherein the first dispensing profile indicates the first controllable valve and a second controllable valve as well as a first predetermined period of time associated with the first controllable valve and a second predetermined period of time associated with the second controllable valve, wherein in response to receiving the control signal, opening the first controllable valve for the first predetermined period of time and opening the second controllable valve for the second predetermined period of time, and closing the first controllable valve when the first predetermined period of time elapses and closing the second controllable valve when the second predetermined period of time elapses, when the first controllable valve is open, pressure from within the airtight pressurized container forcing first contents from a first compressible liquid container over the first liquid transport conduit through the first controllable valve towards the dispensing system, the first liquid transport conduit including a first releasable coupling coupled to a first volume interface of the first compressible liquid container to enable the first contents of the first compressible liquid container to flow through the first liquid transport conduit, and when the second controllable valve is open, pressure from within the airtight pressurized container forcing second contents from a second compressible liquid container over a second liquid transport conduit through the second controllable valve towards the dispensing system, the second liquid transport conduit including a second releasable coupling coupled to a second volume interface of the first compressible liquid container to enable the second contents of the second compressible liquid container to flow through the second liquid transport conduit.

14. The system of claim 13, wherein the opening of the first controllable valve occurs after the opening of the second controllable valve.

15. The system of claim 11, wherein the contents from the multiple compressible liquid containers are mixed using a mixing mechanism selected from a group consisting of a mixing chamber and a venturi system.

16. The system of claim 11, wherein the control system is further configured to generate the first dispensing profile, the first dispensing profile being associate with a particular beverage, the control system configured to generate the first dispensing profile being by:

identifying each compressible liquid container containing at least one ingredient for the particular beverage; and for each compressible liquid container containing at least one ingredient:

identifying a particular controllable valve, the particular controllable valve enabling contents of a particular compressible liquid container of the at least one first compressible liquid container to flow from the particular compressible liquid container in the airtight pressurized container to a dispensing system; and determining a particular predetermined period of time for the particular controllable valve to be open to dispense contents of that particular compressible liquid container, the particular predetermined period of time for the particular controllable valve to be open being based on temperature of the particular ingredient contained within the particular compressible liquid container.

17. The system of claim 11, wherein the first predetermined period of time is determined based on a temperature of the contents of the first compressible liquid container within the pressurized environment and a pressure rating of the first controllable valve.

18. The system of claim 11, wherein the control signal is received from a mobile computing device in response to a selection of the plurality of dispensing profiles on an interface, the control signal indicating the first dispensing profile.

* * * * *